(12) United States Patent
Hatanaka et al.

(10) Patent No.: US 7,181,629 B1
(45) Date of Patent: Feb. 20, 2007

(54) DATA DISTRIBUTION SYSTEM AS WELL AS DATA SUPPLY DEVICE TERMINAL DEVICE AND RECORDING DEVICE FOR THE SAME

(75) Inventors: Masayuki Hatanaka, Kawasaki (JP); Jun Kamada, Kawasaki (JP); Takahisa Hatakeyama, Kawasaki (JP); Takayuki Hasebe, Kawasaki (JP); Seigou Kotani, Kawasaki (JP); Shigeki Furuta, Kawasaski (JP); Taizou Kinoshita, Kokubunji (JP); Takeaki Anazawa, Tokyo (JP); Toshiaki Hioki, Ogaki (JP); Miwa Kanamori, Ogaki (JP); Yoshihiro Hori, Gifu (JP)

(73) Assignees: Fujitsu Limited, Kawasaki (JP); Hitachi, Ltd., Tokyo (JP); Sanyo Electric Co., Ltd., Moriguchi (JP)

( * ) Notice: Subject to any disclaimer, the term of this patent is extended or adjusted under 35 U.S.C. 154(b) by 850 days.

(21) Appl. No.: 10/069,112

(22) PCT Filed: Aug. 20, 2000

(86) PCT No.: PCT/JP00/05770

§ 371 (c)(1),
(2), (4) Date: Jun. 19, 2002

(87) PCT Pub. No.: WO01/16932

PCT Pub. Date: Mar. 8, 2001

(30) Foreign Application Priority Data

Aug. 27, 1999 (JP) .................................. 11-241747
Dec. 3, 1999 (JP) .................................. 11-345229

(51) Int. Cl.
*H04L 9/32* (2006.01)
(52) U.S. Cl. ..................................... 713/194; 713/189

(58) Field of Classification Search ................ 713/189, 713/194
See application file for complete search history.

(56) References Cited

U.S. PATENT DOCUMENTS 5,124,117 A * 6/1992 Tatebayashi et al. ........ 380/281

(Continued)

FOREIGN PATENT DOCUMENTS

EP 0 561 685 A2 9/1993

(Continued)

OTHER PUBLICATIONS

Partial translation of Nikkei Electronics, No. 739, pp. 49-53, Mar. 22, 1999. See PCT search rpt, Digital Copy Right.

(Continued)

*Primary Examiner*—Nasser Moazzami
*Assistant Examiner*—Pramila Parthasarathy
(74) *Attorney, Agent, or Firm*—Westerman, Hattori, Daniels & Adrian, LLP.

(57) ABSTRACT

A memory card performs decryption processing to extract a session key from data applied from a server to a data bus over a cellular phone network. An encryption processing unit encrypts a public encryption key of memory card based on a session key, and applies the same to the server via data bus. A register receives and stores data such as a decrypted license ID and a user ID from the server, and a memory receives and stores encrypted content data applied from a data bus and encrypted with a license key.

45 Claims, 56 Drawing Sheets

U.S. PATENT DOCUMENTS 5,956,403 A * 9/1999 Lipner et al. ............... 713/181
6,189,146 B1 * 2/2001 Misra et al. ................. 717/177

FOREIGN PATENT DOCUMENTS

| JP | 55-12571 | 1/1980 |
|---|---|---|
| JP | 62-53042 | 3/1987 |
| JP | 5-174206 | 7/1993 |
| JP | 05-257816 | 10/1993 |
| JP | 8-69419 | 3/1996 |
| JP | 8-186667 | 7/1996 |
| JP | 10-106148 | 4/1998 |
| JP | 11-328033 | 11/1999 |

OTHER PUBLICATIONS

Partial translation of Nikkei Electronics, No. 728, pp. 31-32, Oct. 19, 1998. See PCT search rpt, MP3 Portable Player.
Partial translation of Nikkei Electronics, No. 731, pp. 29-30, Nov. 30, 1998. See PCT search rpt, MP3 Industry Attempting to Sweep Out.
"Ongaku Haishin, Mattanashi" *Nikkei Electronics,* No. 738, pp. 87-111, Nikkei Business Publications Inc., Mar. 8, 1999.
Japanese Office Action issued in corresponding Japanese Patent Application No. 2001-520398, Jul. 4, 2006 (mailing date).

* cited by examiner

FIG.2

| | | REFERENCE | ATTRIBUTE | CHARACTERISTICS | |
|---|---|---|---|---|---|
| ADMINISTRATION KEY INSIDE MEMORY CARD | | Kmedia(n) | PRIVATE DECRYPTION KEY | UNIQUE TO MEDIUM | A SECRET KEY UNIQUE TO TYPE OF MEMORY CARD. |
| | | Kcard(n) | PRIVATE DECRYPTION KEY | | A SECRET KEY UNIQUE TO MEMORY CARD. |
| | | KPcard(n) | PUBLIC ENCRYPTION KEY | | CORRESPONDED TO Kcard(n). Kcard(n) CAN DECRYPT DATA ENCRYPTED WITH KPcard(n). |
| ADMINISTRATION KEY OUTSIDE MEMORY CARD | | KPmedia(n) | PUBLIC ENCRYPTION KEY | UNIQUE TO MEDIUM | CORRESPONDED TO Kmedia. Kmedia CAN DECRYPT DATA ENCRYPTED WITH KPmedia. |
| | | Ks | SYMMETRIC KEY | UNIQUE TO SESSION | GENERATED FOR EVERY COMMUNICATION (E.G., ACCESS), ADMINISTRATED BY DISTRIBUTION SERVER AND CELLULAR PHONE. |
| DISTRIBUTED DATA | | Kc | SYMMETRIC KEY | LICENSE KEY | DECRYPTION KEY OF ENCRYPTED CONTENT DATA. |
| | | License-ID | INFORMATION FOR REPRODUCTION | | EX. TUNE TITLE INFORMATION, INFORMATION FOR REPRODUCTION TIME RESTRICTION |
| | | User-ID | INFORMATION FOR IDENTIFYING RECEIVER | | EX. PHONE NUMBER |
| | | Dc | CONTENT DATA | | EX. MUSIC |
| | | [Dc]Kc | ENCRYPTED CONTENT DATA | | CONTENT DATA ENCRYPTED WITH SYMMETRIC KEY Kc. |

DATA DISTRIBUTION SYSTEM AS WELL AS DATA SUPPLY DEVICE TERMINAL DEVICE AND RECORDING DEVICE FOR THE SAME

FIELD OF THE INVENTION

The present invention relates to a data distribution system for distributing information to terminals such as cellular phones, and particularly to a data distribution system, which can secure a copyright relating to copied information.

BACKGROUND OF THE INVENTION

By virtue of the progress in information communication networks and the like such as the Internet in these few years, each user can now easily access network information through individual-oriented terminals employing a cellular phone or the like.

In such information communication, information is transmitted through digital signals. It is now possible to obtain copied music and video information transmitted via the aforementioned information communication network without degradation in the audio quality and picture quality of the copy data, even in the case where an individual user performs the copy.

Thus, there is a possibility of the copyright of the copyright owner being significantly infringed unless some appropriate measures to protect copyrights are taken when any content data subject to copyright protection such as music data and image data is to be transmitted on the information communication network.

However, if copyright protection is given top priority so that distribution of content data through the disseminating digital information communication network is suppressed, the copyright owner who can essentially collect a predetermined copyright royalty for copies of a copyrighted work will also incur some disbenefit.

Instead of the distribution over the digital information communication network described above, distribution may be performed via record mediums storing digital data. In connection with the latter case, music data stored in CDs (compact disks) on the market can be freely copied in principle into magneto-optical disks (e.g., MDs) as long as the duplication is only for the personal use. However, a personal user performing digital recording or the like indirectly pays predetermined amounts in prices of the digital recording device itself and the medium as guaranty moneys to a copyright holder.

However, the music data is digital data, which does not cause deterioration of information when it is copied as digital signals from a CD to an MD. Therefore, for the copyright protection, such structures are employed that the music information cannot be copied as digital data from the recordable MD to another music data.

Under present circumstances, therefore, digital data can be freely copied from a CD to an MD, i.e., from a master of digital record medium to a slave, but cannot be copied from a recordable MD to another MD.

In view of the above, the public distribution itself of the music data and image data over the digital information communication network is restricted by the public transmission right of the copyright holder, and therefore sufficient measures must be taken for the copyright protection.

For the above case, it is naturally necessary to inhibit such an act that a user, who is not originally authorized, receives copyrighted data distributed to the public over the information communication network. Further, it is necessary to inhibit such an act that copyrighted data, which was once received by an authorized user, is further duplicated without authorization.

BRIEF SUMMARY OF THE INVENTION

An object of the invention is to provide an information distribution system for distributing copyrighted data over an information network such a cellular phone network, and particularly an information distribution system, in which only users having proper access rights can receive such information.

Another object of the invention is to provide an information distribution system, which can protect distributed copyrighted data from being duplicated without authorization from a copyright holder.

For achieving the above objects, the invention provides a data distribution system for distributing at least a license key for decrypting encrypted content data between the license key and the encrypted content data to each of terminals of a plurality of users from a content data supply device.

The content data supply device includes a first interface unit, a first session key generating unit, a session key encryption processing unit, a session key decrypting unit, a first license data encryption processing unit and a second license data encryption processing unit.

The first interface unit externally transmits data. The first session key generating unit produces a first symmetric key to be updated in response to every transmission of the license key. The session key encryption processing unit encrypts the first symmetric key with a first public encryption key, and applies the encrypted first symmetric key to the first interface unit. The session key decrypting unit decrypts a second symmetric key and a second public encryption key returned after being encrypted with the first symmetric key based on the first symmetric key to extract the second symmetric key and the second public encryption key. The first license data encryption processing unit encrypts the license key with the second public encryption key extracted by the session key decrypting unit. The second license data encryption processing unit further encrypts the output of the first license data encryption processing unit with the second symmetric key extracted by the session key decrypting unit, and supplies the encrypted output to the first interface unit.

Each terminal includes a second interface unit and a data storing unit.

The second interface unit externally transmits the data.

The data storing unit receives and stores at least the license key from the content data supply device. The first public encryption key is predetermined for the data storing unit. The data storing unit includes a first key holding unit, a first decryption processing unit, a second key holding unit, a second session key generating unit, a first encryption processing unit, a second decryption processing unit, a third key holding unit, a third decryption processing unit and a memory unit.

The first key holding unit holds a first private decryption key for decrypting the data encrypted with the first public encryption key. The first decryption processing unit receives and decrypts the first symmetric key encrypted with the first public encryption key. The second key holding unit holds the second public encryption key. The second session key generating unit produces the second symmetric key. The first encryption processing unit encrypts the second public encryption key and the second symmetric key based on the first symmetric key, and outputs the encrypted keys to the second interface unit. The second decryption processing unit receives the license key encrypted with the second symmetric key, further encrypted with the second public encryption key and applied from the second license data encryption processing unit, and decrypts the received license key based on the second symmetric key. The third key holding unit holds a second private decryption key used for decrypting the data encrypted with the second public encryption key and being unique to the data storing unit. The third decryption processing unit receives the license key encrypted with the second public encryption key, and decrypts the received license key with the second private decryption key for extraction. The memory unit stores the encrypted content data and the license key.

According to another aspect, the invention provides a data supply device for supplying at least a license key for decrypting encrypted content data between the license key and the encrypted content data to each of a plurality of user terminals provided with a data storing unit capable of storing at least the license key, and includes an interface unit, a session key generating unit, a session key encryption processing unit, a session key decrypting unit, a first license data encryption processing unit and a second license encryption processing unit.

The interface unit externally transmits data. The session key generating unit produces a first symmetric key to be updated in response to every transmission of the license key. The session key encryption processing unit encrypts the first symmetric key with a first public encryption key predetermined corresponding to the data storing unit of the user terminal, and applies the encrypted first symmetric key to the interface unit. The session key decrypting unit decrypts and extracts a second symmetric key and a second public encryption key returned after being encrypted with the first symmetric key. The first license data encryption processing unit encrypts the license key for decrypting the encrypted content data with the second public encryption key decrypted by the session key decrypting unit. The second license encryption processing unit further encrypts the output of the first license data encryption processing unit with the second symmetric key, and applies the encrypted output to the interface unit for supply to each of the terminals.

According to still another aspect, the invention provides a data supply device for supplying at least a license key for decrypting encrypted content data between the license key and the encrypted content data to a plurality of recording devices, and includes an interface unit, a first session key generating unit, a session key encryption processing unit, a session key decrypting unit, a first license data encryption processing unit and a second license encryption processing unit.

The interface unit transmits data to and from the recording device. A connecting unit can connect the interface unit and the recording device for supply of the data. The first session key generating unit produces a first symmetric key to be updated in response to every supply of the license key. The session key encryption processing unit encrypts the first symmetric key with a first public encryption key predetermined corresponding to the recording device, and applies the encrypted first symmetric key to the interface unit. The session key decrypting unit decrypts and extracts a second symmetric key and a second public encryption key applied from the recording device connected to the connecting unit after being encrypted with the first symmetric key. The first license data encryption processing unit encrypts the license key for decrypting the encrypted content data with the second public encryption key decrypted by the session key decrypting unit. The second license encryption processing unit further encrypts the output of the first license data encryption processing unit with the second symmetric key, and applies the encrypted output to the interface unit for supply to the recording device connected to the connecting unit.

According to yet another aspect, the invention provides a terminal device for receiving at least a license key for decrypting encrypted content data between the license key and the encrypted content data distributed from a data supply device, and includes a first interface unit, and a data storing unit.

The first interface unit externally transmits the data.

The data storing unit receives and stores a license key. The data storing unit includes a first key holding unit, a first decryption processing unit, a second key holding unit, a second session key generating unit, a first encryption processing unit, a second decryption processing unit, a third key holding unit, a memory unit and a third decryption processing unit.

The first key holding unit holds a first private decryption key for decrypting the data encrypted with a first public encryption key. The first decryption processing unit receives and decrypts a first symmetric key encrypted with the first public encryption key and externally input. The second key holding unit holds a second public encryption key unique to the data storing unit. The second session key generating unit produces a second symmetric key. The first encryption processing unit encrypts the second public encryption key and the second symmetric key based on the first symmetric key, and outputs the encrypted keys to the first interface unit. The second decryption processing unit receives the license key encrypted with the second public encryption key and further encrypted with the second symmetric key, and decrypts the received license key based on the second symmetric key. The third key holding unit holds a second private decryption key used for decrypting the data encrypted with the second public encryption key and being unique to the data storing unit. The storing unit receives the output of the second decryption processing unit, and stores the license key encrypted with the second public encryption key. The third decryption processing unit receives the license key encrypted with the second public encryption key stored in the memory unit, and decrypts the received license key with the second private decryption key.

According to further another aspect, the invention provides a terminal device for receiving at least a license key for decrypting encrypted content data between the license key and the encrypted content data distributed from a data supply device, and includes a first interface unit, and a data storing unit.

The first interface unit externally transmits the data.

The data storing unit receives and stores a license key. The data storing unit includes a first key holding unit, a first decryption processing unit, a second key holding unit, a second session key generating unit, a first encryption processing unit, a second decryption processing unit, a third key holding unit, a third decryption processing unit and a memory unit. The first key holding unit holds a first private decryption key for decrypting the data encrypted with a first public encryption key. The first decryption processing unit receives and decrypts a first symmetric key externally applied and encrypted with the first public encryption key. The second key holding unit holds a second public encryption key unique to the data storing unit. The second session key generating unit produces a second symmetric key. The first encryption processing unit encrypts the second public encryption key and the second symmetric key based on the first symmetric key, and outputs the encrypted keys to the first interface unit. The second decryption processing unit receives the license key encrypted with the second public encryption key and further encrypted with the second symmetric key, and decrypts the received license key based on the second symmetric key. The third key holding unit holds a second private decryption key used for decrypting the data encrypted with the second public encryption key and being unique to the data storing unit. The third decryption processing unit receives the license key encrypted with the second public encryption key, and decrypts the received license key with the second private decryption key. The memory unit receives the output of the third decryption processing unit, and stores the license key.

According to further another aspect, the invention provides a terminal device for receiving at least a license key for decrypting encrypted content data between the license key and the encrypted content data distributed from a data supply device, and includes a first interface unit, a content reproducing unit and a second interface unit.

The first interface unit transmits the data to and from the data supply device. The second interface unit connects to the data storing unit releasably attached to the terminal device.

The content reproducing unit includes a fourth key holding unit, a fourth decryption processing unit, a third session key generating unit, a second encryption processing unit, a fifth decryption processing unit and a data reproducing unit. The fourth key holding unit holds a third private decryption key used for decrypting the data encrypted with a third public encryption key. The fourth decryption processing unit decrypts and extracts the second symmetric key encrypted with the third public encryption key in the data storing unit. The third session key generating unit generates a third symmetric key. The second encryption processing unit encrypts and outputs the third symmetric key based on the second symmetric key decrypted and extracted by the fourth decryption processing unit. The fifth decryption processing unit decrypts and extracts the license key encrypted with the third symmetric key in the data storing unit. The data reproducing unit decrypts and reproduces the encrypted content data recorded in the data storing unit with the extracted license key.

According to further another aspect, the invention provides a recording device including an interface unit, a memory unit, a parallel data bus, a first key holding unit, a first decryption processing unit, a second key holding unit, a session key generating unit, a first encryption processing unit, a second decryption processing unit, a third key holding unit and a third decryption processing unit.

The interface unit externally transmits data.

The memory unit stores the data. The parallel data bus has a width of m bits (m is a natural number larger than 1 (m>1)), and transmits the data between the interface unit and the recording unit.

The interface unit includes a plurality of terminals, selecting means, first converting means and second converting means. The selecting means selects a predetermined terminal(s) of one or n in number (n is a natural number satisfying (1<n≦m)) as a terminal(s) for externally receiving data in accordance with a switching instruction for a bit width of the externally applied input data. The first converting means operates in accordance with the switching instruction to convert serial data externally applied via the selected one terminal or parallel data of an n-bit width externally applied via said n terminals into parallel data of an m-bit width, and supply the converted parallel data onto the parallel data bus. The second converting means converts the parallel data of the m-bit width applied from the parallel data bus into serial data, and externally outputs the converted serial data via predetermined one terminal among the plurality of terminals.

The first key holding unit holds a first private decryption key for decrypting data encrypted with a first public encryption key. The first decryption processing unit receives a first symmetric key encrypted with the first public encryption key, and decrypts the received first symmetric key based on the first private decryption key. The second key holding unit holds a second public encryption key. The session key generating unit generates a second symmetric key. The first encryption processing unit encrypts the second public encryption key and the second symmetric key based on the first symmetric key, and outputs the encrypted keys to the interface unit via the parallel data bus. The second encryption processing unit receives a license key encrypted with the second public encryption key, and further encrypted with the second symmetric key, and decrypts the received license key based on the second symmetric key. The third key holding unit holds a second private decryption key set uniquely to the recording device for decrypting the data encrypted with the second public encryption key. The third decryption processing unit receives the license key encrypted with the second public encryption key, and decrypts the received license key based on the second private decryption key to extract the license key. The recording unit stores the encrypted content data and the license key.

BRIEF DESCRIPTION OF THE SEVERAL VIEWS OF THE DRAWINGS

FIG. 2 collectively represents characteristics such as key data used for communication in the information distribution system shown in FIG. 1;

DETAILED DESCRIPTION OF THE INVENTION

Embodiments of the invention will now be described with reference to the drawings.

First Embodiment

[Whole Structure of System]

Figure 1:
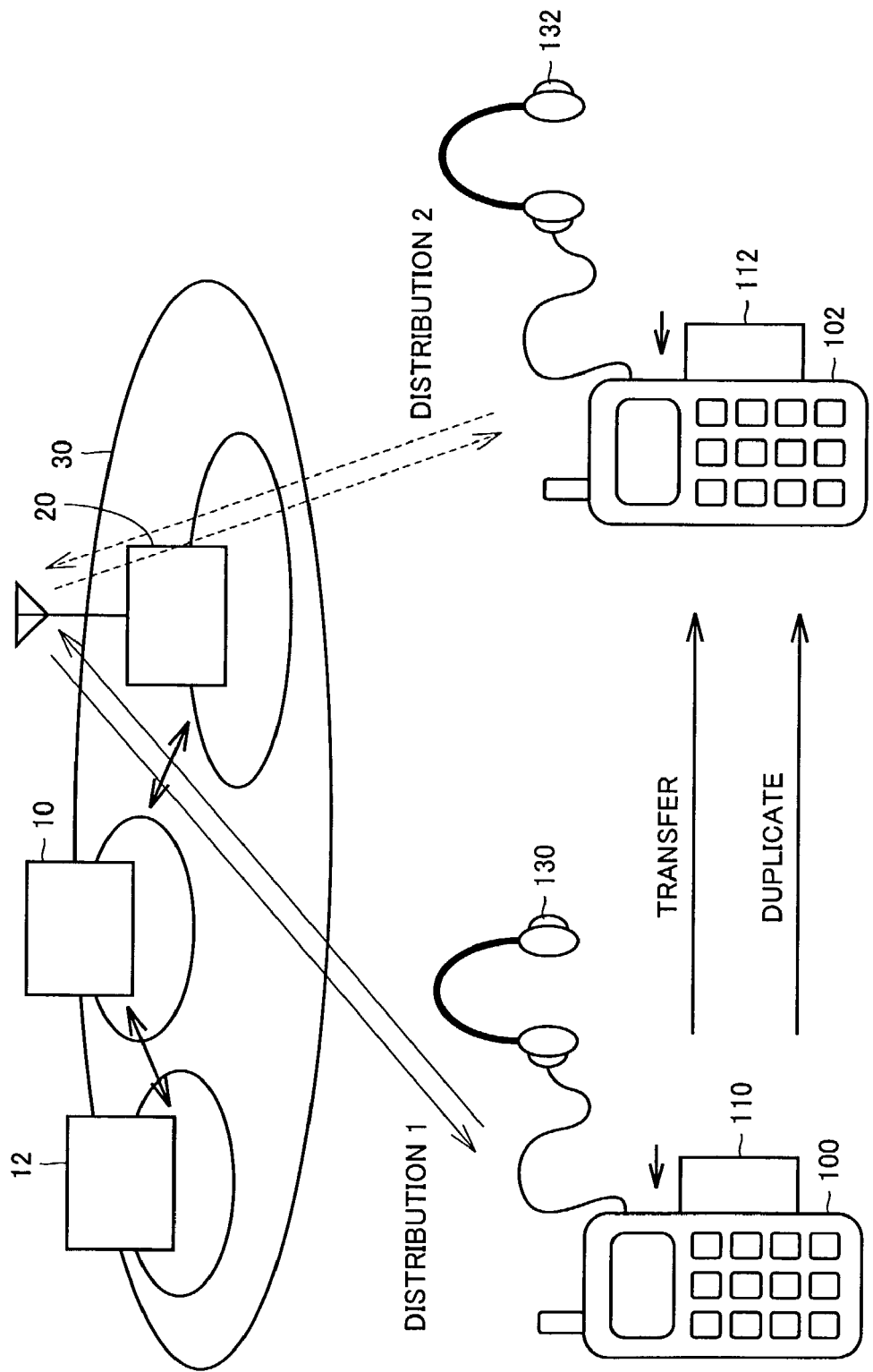
FIG. 1 conceptually and schematically shows a whole structure of an information distribution system according to the invention.

FIG. 1 conceptually shows a whole structure of an information distribution system according to the invention.

The following description will be given by way of example on a structure of a data distribution system, in which music data is distributed to users over a cellular phone network. As will be apparent from the following description, the invention is not restricted to such an example, and may be applied to other cases, in which copyrighted data (e.g., image data) other than the music data is distributed over another information communication network.

Referring to FIG. 1, a distribution server 10 administrating copyrighted music information encrypts music data (which will be referred to also as "content data" hereinafter) in a predetermined encryption scheme, and applies the data thus encrypted to a cellular phone company, which is a distribution carrier 20 for distributing information. An authentication server 12 determines whether an instrument or device accessing it for distribution of music data is a regular device or not.

Distribution carrier 20 relays over its own cellular phone network a distribution request received from each user to distribution server 10. When distribution server 10 receives the distribution request, authentication server 12 determines whether the access is made by a regular device or not. After it is confirmed that the access is made by the regular device, distribution server 10 encrypts the requested content data, and distributes it to the user's cellular phone over the cellular phone network of distribution carrier 20.

In FIG. 1, a cellular phone 100 of a cellular phone user 1 includes, e.g., a memory card 110, which is releasably attached thereto for receiving encrypted content data received by cellular phone 100, decrypting the data encrypted for this transmission, and applying the data to an audio decoding unit (not shown) in cellular phone 100.

Further, user 1 can listen to music, which is produced by reproducing such content data, via headphones 130 or the like connected to cellular phone 100.

In the following description, distribution server 10, authentication server 12 and distribution carrier 20 described above will be collectively referred to as a "music server 30".

Also, the processing of transmitting the content data from music server 30 to each cellular phone terminal or the like will be referred to as "distribution", hereinafter.

Owing to the above structure, a user other than a regular user, who purchased regular memory card (i.e., memory card 110), cannot receive and reproduce the data distributed from music server 30 without difficulty.

Further, the system may be configured as follows. By counting the times of distribution of content data, e.g., for example, one song in distribution carrier 20, the royalty, which is charged every time the user receives (downloads) content data, can be collected by distribution carrier 20 together with charges for telephone calls so that the copyright owner can ensure the royalty.

The foregoing distribution of the content data is performed over a closed system, i.e., the cellular phone network so that it is easy to take measures for the copyright protection, compared with open systems such as the Internet.

For example, a user 2 having a memory card 112 can receive content data directly from music server 30 by user's own cellular phone 102. However, such data reception may take a relatively long time if user 2 receives the content data or the like having a large information amount directly from music server 30. In connection with this, the system may be configured such that user 2 can copy the content data of user 1, who has already received it. This improves the convenience of users.

From the viewpoint of protecting right of the copyright owner, it is not allowed to provide a system configuration allowing free copying of content data.

In an example shown in FIG. 1, an operation, in which the content data itself received by user 1 as well as information required for reproducing the content data are copied for use by user 2, is referred to as "transfer" of the content data. In this case, since user 1 allows the copying of the content data together with information (reproduction information) required for the reproduction, it is necessary to disable or inhibit the reproduction of the content data by user 1 after the transfer of information. The above content data is distributed as encrypted content data, which is encrypted in a predetermined encryption scheme. As will be described later, the "reproduction information" means the information including a key, which allows decryption or decoding of the encrypted content data in accordance with the foregoing predetermined encryption scheme, and will also be referred to as a "license key", as well as license ID data, user ID data and others, which are information related to copyright protection.

In contrast to the above, an operation, in which only content data is copied while keeping an encrypted form, is referred to as "duplication" of music information.

In this case, reproduction information required for reproducing such content data is not copied for use by the terminal of user 2 so that user 2 having only the encrypted content data cannot reproduce the music. If user 2 wishes to reproduce the music, user 2 must receive the reproduction information distributed from music server 30 for allowing reproduction of the content data. In this case, however, it is merely required to receive the information for allowing the reproduction. Therefore, it takes a remarkably short telephone communication time for allowing music reproduction as compared with the case, where user 2 directly receives all the required data and information from music server 30.

For example, if cellular phones 100 and 102 are PHSs (Personal Handy Phones), a telephone conversation can be performed in a so-called transceiver mode. By using this function, information can be collectively relocated (transferred) from user 1 to user 2, and/or only the encrypted content data can be moved (duplicated).

In the structure shown in FIG. 1, the system requires the following schemes and structure for reproducing the content data, which is distributed in the encrypted form, on the user side. First, the system requires a scheme for sending an encryption key in the communication. Second, the system requires a scheme for encrypting the data itself to be distributed. Third, the system requires a structure for protecting data by preventing unauthorized copying of the distributed data.

[Structure of Encryption/Decryption Key]

FIG. 2 collectively represents characteristics of key data and others used for communication in the information distribution system shown in FIG. 1.

In the structure shown in FIG. 1, data processing in memory card 100 is administrated by private decryption key Kmedia(n) (n: natural number), a public encryption key KPcard(n) and a private decryption key Kcard(n) (n: natural number). Private decryption key Kmedia(n) includes information for individually specifying the types and others of the memory card. Public encryption key KPcard(n) is unique to the memory card. Private decryption key Kcard(n) is used for decrypting the data encrypted with public encryption key KPcard(n).

In the expressions such as "Kcard(n)" and "KPcard(n)" indicating the keys, the natural number "n" is used for identifying each memory card.

More specifically, the data encrypted with public encryption key KPcard(n) can be decrypted with private decryption key Kcard(n), which is present uniquely to each memory card. Therefore, three kinds of keys Kmedia(n), Kcard(n)

and KPcard(n) are basically used for transmitting the distributed data to and from the memory cards, as will be described later.

Further, as the encryption key for keeping the secret in external transmission of data to and from the memory card, the system uses public encryption key KPmedia(n) unique to each medium, private decryption key Kmedia(n) for decrypting data encrypted with public encryption key KPmedia(n), and a symmetric key Ks produced in music server 30 or cellular phone 100 or 102 in response to every communication (e.g., every access to music server 30).

The system may be configured such that symmetric key Ks described above is generated every time the user accesses music server 30, and the same key is used for music information without limiting the number of tunes or songs in the music information as long as the access has been performed only one time. Alternatively, different symmetric keys may be used for different tunes, respectively, and each may be set to the user for one tune.

In the following description, the unit of communication or access described above will be referred to as a "session", and symmetric key Ks will be referred to as a "session key".

Consequently, session key Ks has a value unique to each communication session, and is administrated by the distribution server and the cellular phone.

For the data to be distributed, it is assumed that a key Kc (which will be referred to as a "license key" hereinafter) for decrypting the encrypted content data is first present, and the encrypted content data is decrypted with this license key Kc. Further, an administration code for specifying the content data, license ID data License-ID including information, which relates to restriction of the times of reproduction, and others are present as the license information described above. The cellular phone holds a user ID data user-ID for identifying the receiver.

Owing to the above structure, control related to the copyright protection for the copyright owner can be performed in accordance with information contained in the license ID data. Also, by using the user ID data, control can be performed to protect the personal information of the user such as access histories of the user from a third party.

As already described, content data Dc in the distributed data is, e.g., music data, and data prepared by encrypting this content data for decryption with session key Ks is referred to as encrypted content data [Dc]Kc.

The expression "[Y]X" represents that data is prepared by converting data Y with a key X into a decodable form. The keys used in encryption processing and decryption processing may also be referred to as "keys".

[Structure of Distribution Server 10]

Figure 3:
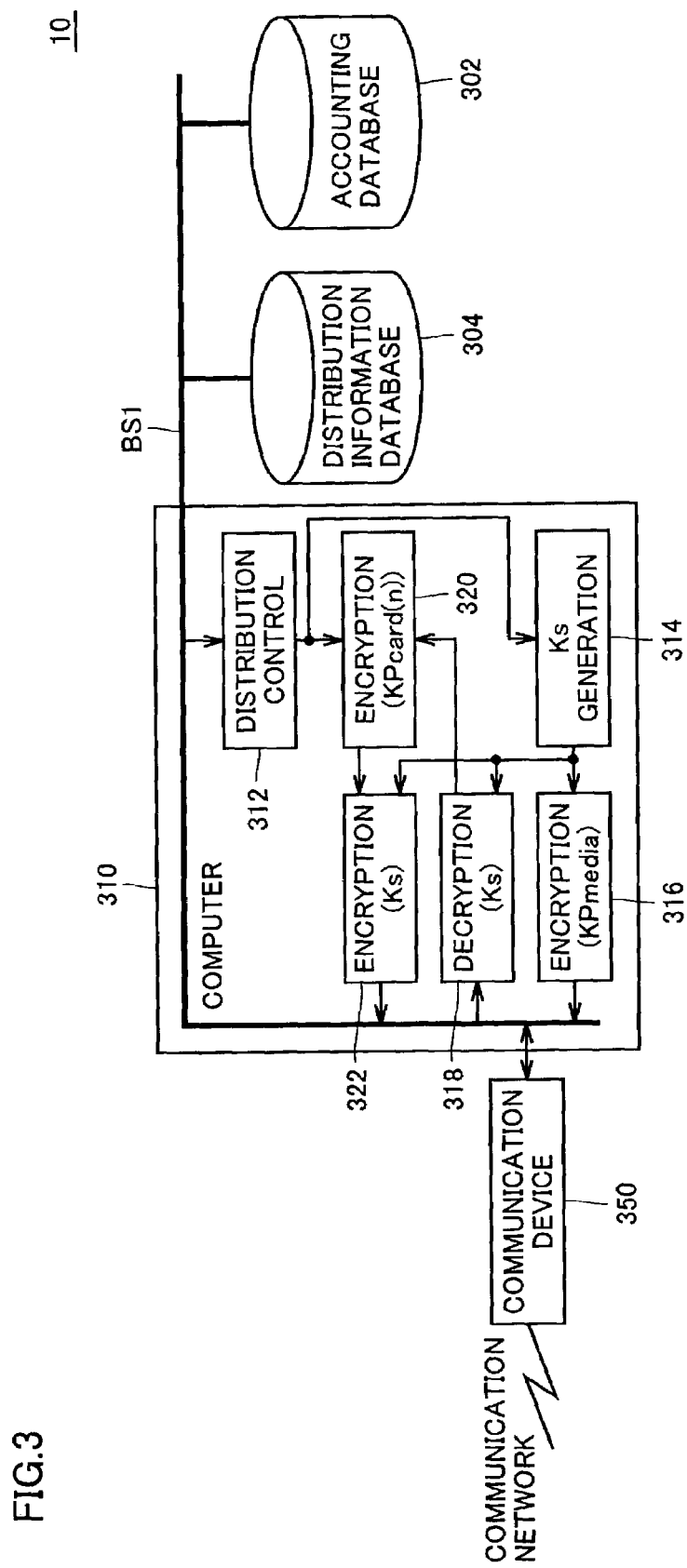
FIG. 3 is a schematic block diagram showing a structure of a distribution server 10 shown in FIG. 1.

FIG. 3 is a schematic block diagram showing a structure of distribution server 10 shown in FIG. 1. Distribution server 10 includes a distribution information database 304 for storing distribution data such as data, which is prepared by encrypting content data (music data) in a predetermined scheme, and a license ID, an accounting database 302 for storing accounting information related to the times of access to content data for each user, a data processing unit 310 for receiving data via a bus BS1 from distribution information database 304 and accounting database 302, and performing predetermined encryption processing, and a communication device 350 for transmitting data between distribution carrier 20 and data processing unit 310 over the communication network.

Data processing unit 310 includes a distribution control unit 312 for controlling an operation of data processing unit 310 in accordance with the data on data bus BS1, a session key generating unit 314 which is controlled by distribution control unit 312 to generate session key Ks, an encryption processing unit 316 which encrypts session key Ks generated by session key generating unit 314 with public encryption key KPmedia, and apply it to data bus BS1, a decryption processing unit 318 for receiving the data, which is sent after being encrypted with session key Ks in the cellular phone of each user, via communication device 350 and data bus BS1, and decrypting the received data, an encryption processing unit 320 for encrypting the data such as license key and license ID with public encryption key KPcard(n), which is extracted by decryption processing unit 318, under control of distribution control unit 312, and an encryption processing unit 322 for encrypting the output of encryption processing unit 320 with session key Ks, and applying the same to communication device 350 via data bus BS1.

[Structure of Terminal (Cellular Phone)]

Figure 4:
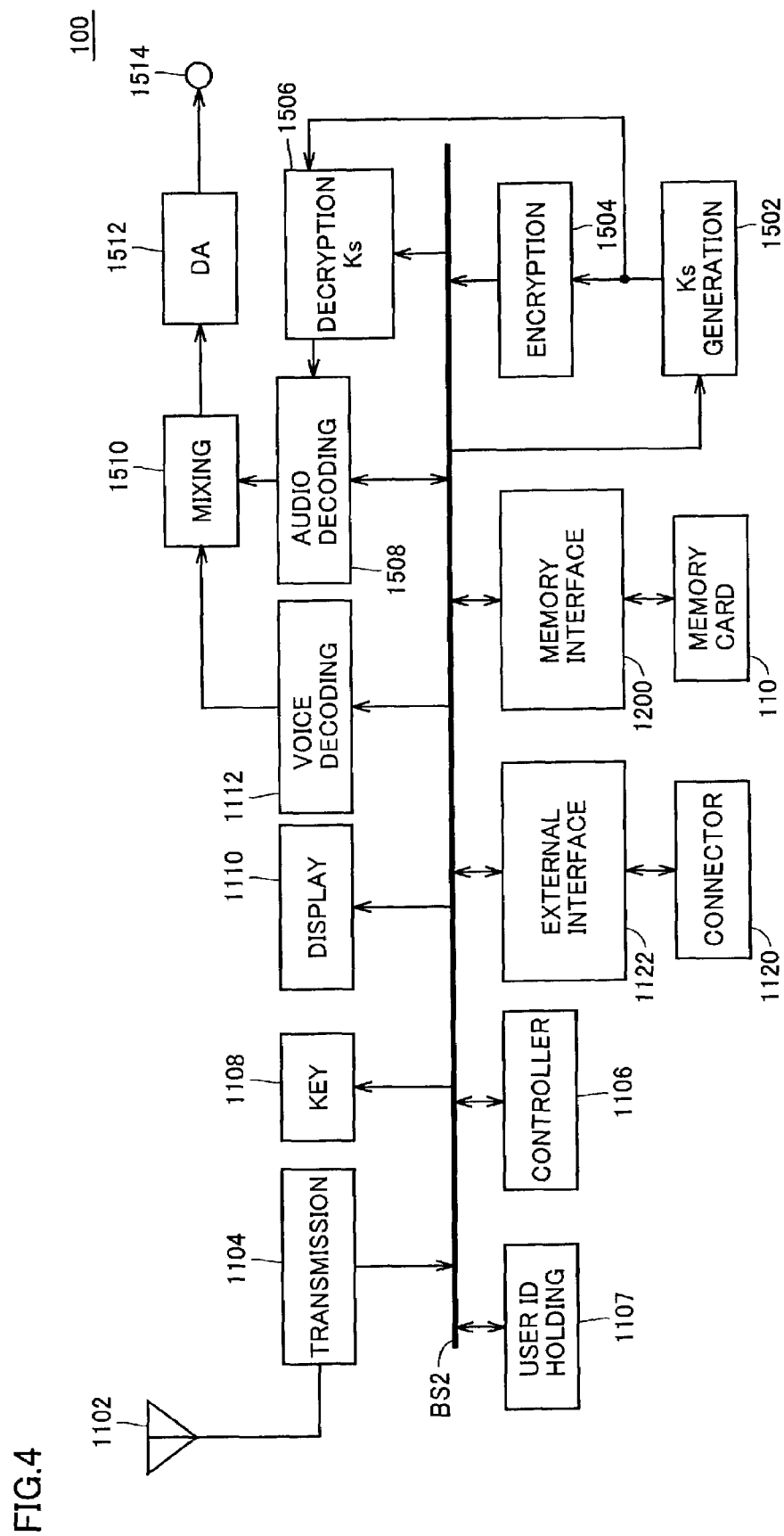
FIG. 4 is a schematic block diagram showing a structure of a cellular phone 100 shown in FIG. 1.

FIG. 4 is a schematic block diagram showing a structure of cellular phone 100 shown in FIG. 1.

Cellular phone 100 includes an antenna 1102 for receiving radio signals sent over the cellular phone network, a transmission unit 1104 for converting the signals received from antenna 1102 into baseband signals, and sending data sent from the cellular phone to antenna 1102 after modulating it, a data bus BS2 for data transmission to various portions in cellular phone 100, a controller 1106 for controlling the operation of cellular phone 100 via bus BS2, a user ID holding unit 1107 for holding user ID data User-ID for identifying the receiver, a touch key unit 1108 for externally applying an instruction to cellular phone 100, a display 1110 for applying information output from controller 1106 or the like to the user as visual information, a voice decoding unit 1112 for reproducing voice and sound based on received data applied via data bus BS2 in a normal conversation operation, a connector 1120 for externally transmitting data, and an external interface unit 1122 for converting data applied from connector 1120 into signals, which can be applied to data bus BS2, or converting data applied from data bus BS2 into signals, which can be applied to connector 1120.

The user ID data includes data such as a telephone number of the user.

Cellular phone 100 further includes releasable memory card 110 for decrypting the content data sent from music server 30, a memory interface 1200 for controlling transmission of data between memory card 110 and bus BS2, a session key generating unit 1502 for generating session key Ks, e.g., based on a random number for encrypting the data to be transmitted via data bus BS2 between memory card 110 and another portion of the cellular phone via bus BS2, an encryption processing unit 1504, which encrypts session key Ks produced by session key generating unit 1502 and applies the same to data bus BS2, a decryption processing unit 1506, which decrypts the data produced by session key generating unit 1502 and located on data bus BS2 with session key Ks for outputting the same, an audio decoding unit 1508 for receiving the output of decryption processing unit 1506, and reproducing music signals, a mixing unit 1510, which receives the output of audio decoding unit 1508 and the output of voice decoding unit 1112, and selectively outputs them in accordance with the operation mode, a digital-to-analog converter 1512, which receives and converts the output of mixing unit 1510 into analog signals for external output, and a connection terminal 1514, which receives the output of digital-to-analog converter 1512 and is configured to connect headphones 130 thereto.

For the sake of simplicity, only the blocks related to distribution of the content data according to the invention are described, and some of blocks, which are originally provided in the cellular phone for the telephone conversation function, are not described.

[Structure of Memory Card]

Figure 5:
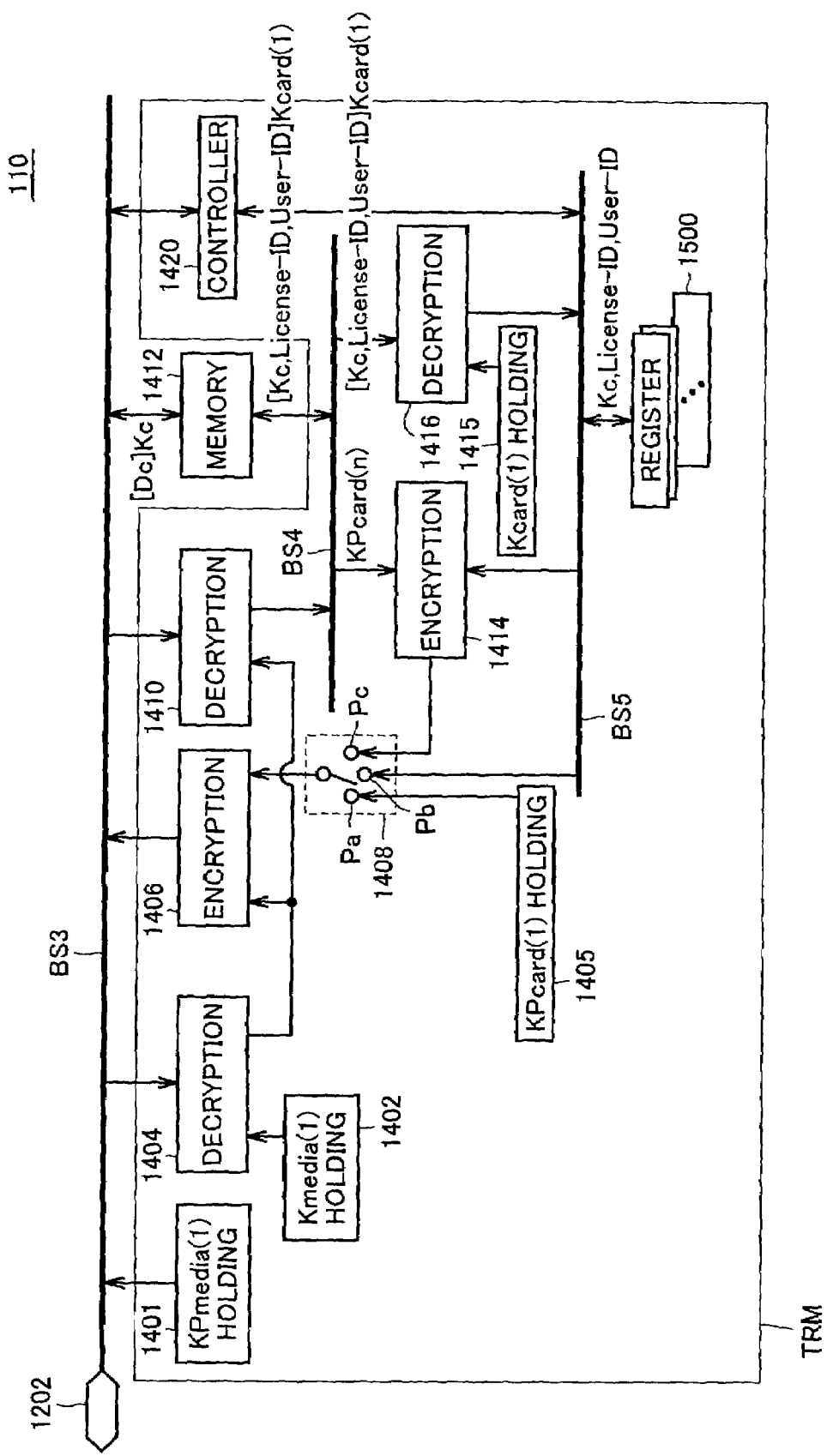
FIG. 5 is a schematic block diagram showing a structure of a memory card 110 shown in FIG. 4.

FIG. 5 is a schematic block diagram showing a structure of memory card 110 shown in FIG. 4.

In the following description, public encryption key KPmedia of memory card 110 attached to terminal 100 will be referred to as public encryption key KPmedia(1) for discrimination from public encryption key KPmedia of memory card 112 of terminal 102, which will be referred to as public encryption key KPmedia(2).

Correspondingly, a private decryption key, which can decrypt the data encrypted with public encryption key KPmedia(1), and is asymmetrical to it, will be referred to as "private decryption key Kmedia(1), and a private decryption key, which can decrypt the data encrypted with public encryption key KPmedia(2), and is asymmetrical to it, will be referred to as private decryption key Kmedia(2).

By discriminating the public encryption keys unique to the mediums from each other, appropriate operations can be performed even in such cases that multiple kinds of memory cards are used, and more generally, medium(s) other than the memory card are present as options of the system, as will be described later.

Memory card 110 includes a data bus BS3 for transmitting signals to and from memory interface 1200 via terminal 1202, a KPmedia(1) holding unit 1401 for holding public encryption key KPmedia(1), and outputting the same to data bus BS3, a Kmedia(1) holding unit 1402 for holding private decryption key Kmedia(1) corresponding to memory card 110, a decryption processing unit 1404 for extracting session key Ks by decrypting private decryption key Kmedia(1), a KPcard(1) holding unit 1405 for holding public encryption key KPcard(1), an encryption processing unit 1406 for encrypting the output of a selector switch 1408 based on session key Ks extracted from decryption processing unit 1404, and applying the same to data bus BS3, a decryption processing unit 1410 for decrypting the data on data bus BS3 with session key Ks extracted by decryption processing unit 1404, and applying it onto a data bus BS4, and a memory 1412 for storing data such as license key Kc and license ID, which are encrypted with public encryption key KPcard(n) unique to the memory card and are applied from data bus BS3, and receiving encrypted content data [Dc]Kc encrypted with license key Kc from data bus BS3 for storing the same.

Selector switch 1408 has contacts Pa, Pb and Pc. Contact Pa receives public encryption key KPcard(1) from KPcard (1) holding unit 1405. Contact Pb receives data from a data bus BS5. Contact Pc receives the output of an encryption processing unit 1414. Selector switch 1408 selectively applies the signals applied to contacts Pa, Pb and PC to encryption processing unit 1406 in accordance with the operation mode selected from the "distribution mode", "reproduction mode" and "transfer mode".

Memory card 110 further includes a Kcard(1) holding unit 1415 for holding a value of private decryption key Kcard(1), a decryption processing unit 1416 for decrypting license key Kc, license ID and others ([Kc, License]Kcard(1)), which are encrypted with public encryption key KPcard(1) and read from memory 1412, and applying them to data bus BS5, encryption processing unit 1414, which operates in the data transferring operation and others to receive public encryption key KPcard(1) of the memory card of the opposite party from decryption processing unit 1410, encrypt license key Kc, license ID and others output to data bus BS5 based on public encryption key KPcard(n) of the opposite party, and then output them to selector switch 1408, a controller 1420, which externally transmits data via data bus BS3, receives license ID data and others from data bus BS5 and controls the operation of memory card 110, and a register 1500, which can transmit data such as license ID data to and from data bus BS5.

A region surrounded by solid line in FIG. 5 is incorporated in a module TRM, which is configured such that internal data is erased and/or internal circuits are destroyed for disabling reading of data and others in circuits located within this region by a third party when memory card 110 is, e.g., externally opened without authorization.

This module is generally referred to as a "Tamper Resistance Module".

Naturally, memory 1412 may also be incorporated into module TRM. However, the structure shown in FIG. 5 can reduce a manufacturing cost because all the data held in memory 1412 is encrypted, and therefore the third party cannot reproduce music by using only the data in memory 1412 so that it is not necessary to arranged memory 1412 within the expensive tamper resistance module.

Figure 6:
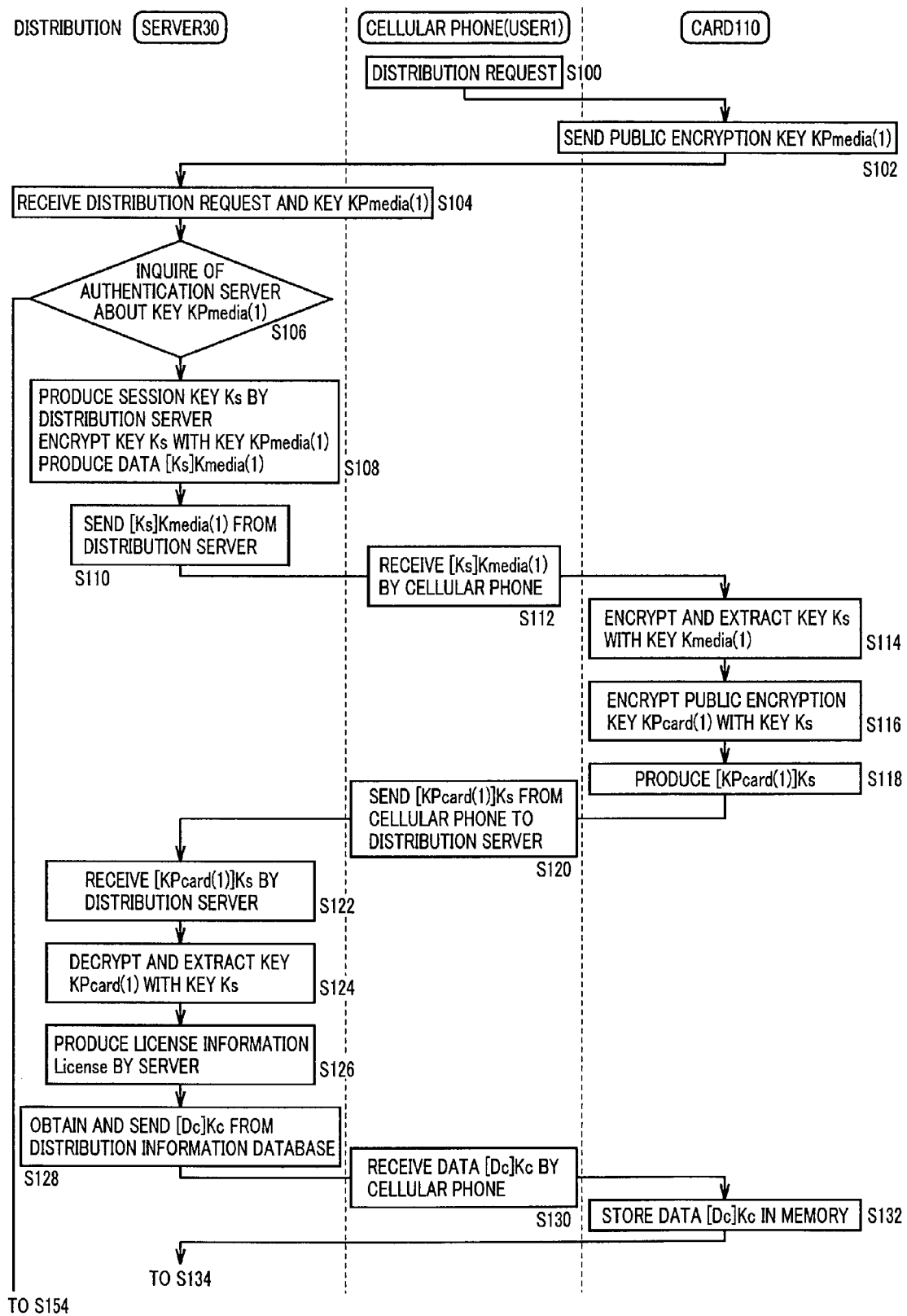
FIG. 6 is a first flowchart representing a distribution mode in the data distribution system shown in FIGS. 1 and 3–5.
Figure 7:
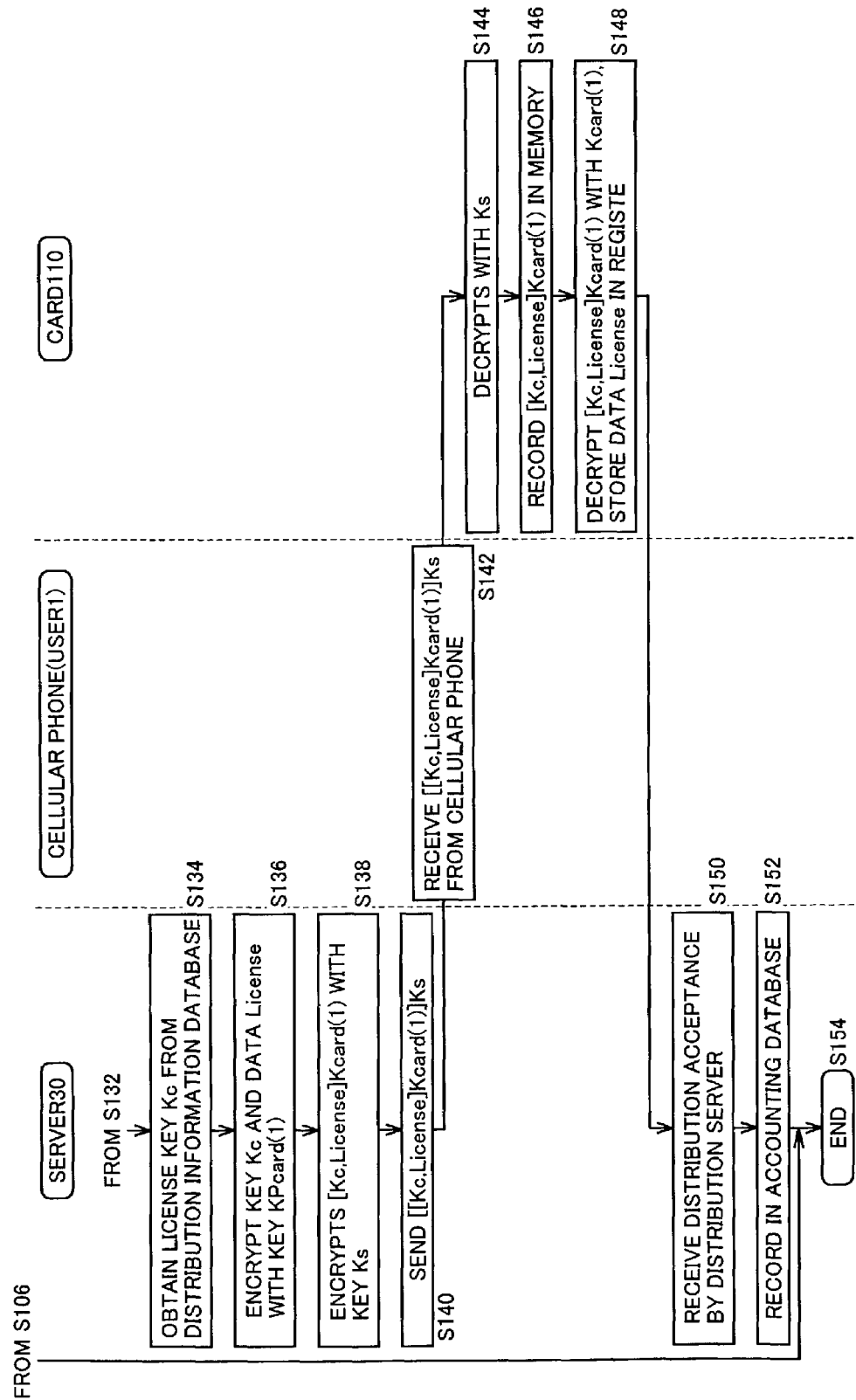
FIG. 7 is a second flowchart representing a distribution mode in the data distribution system shown in FIGS. 1 and 3–5.

FIGS. 6 and 7 are first and second flowcharts representing a distribution operation in the data distribution system shown in FIGS. 1 and 3–5.

FIGS. 6 and 7 represent the operation in the case where user 1 using memory card 110 receives music data from music server 30.

First, user 1 sends a request for distribution via cellular phone 100 by operating keys or buttons on touch key unit 1108 (step S100).

In memory card 110, public encryption key KPmedia(1) is sent from KPmedia(1) holding unit 1401 to music server 30 in response to the above distribution request (step S102).

When music server 30 receives the distribution request and public encryption key KPmedia(1) from memory card 110 (step S104), an inquiry is applied to authentication server 12 based on received public encryption key KPmedia (1) (step S106), and the processing moves to a next step. If the regular memory card is not used, the processing is terminated (step S154).

When it is determined from the inquiry that the regular memory card is used, music server 30 operates to produce session key Ks by session key generating unit 314. Further, encryption processing unit 316 in music server 30 produces encrypted session key [Ks]Kmedia(1) by encrypting session key Ks with received public encryption key KPmedia(1) (step S108).

Then, music server 30 applies encrypted session key [Ks]Kmedia(1) to data bus BS1. Communication device 350 sends encrypted session key [Ks]Kmedia(1), which is applied from encryption processing unit 316, over the communication network to memory card 110 of cellular phone 100 (step s110).

When cellular phone 100 receives encrypted session key [Ks]Kmedia(1) (step S112), decryption processing unit 1404 in memory card 110 decrypts and extracts session key Ks by decrypting the received data applied to data bus BS3 via memory interface 1200 with private decryption key Kmedia (1) (step S114).

In the subsequent distributing operation, contact Pa is closed in selector switch 1408 so that encryption processing unit 1406 encrypts public encryption key KPcard(1) (i.e., public encryption key for memory card 110) applied from KPcard(1) holding unit 1405 via contact Pa with session key Ks (step S116) to produce data [KPcard(1)]Ks (step S118).

Cellular phone 100 sends data [KPcard(1)]Ks encrypted by encryption processing unit 1406 to music server 30 (step S120).

In music server 30, communication device 350 receives data [KPcard(1)]Ks (step S122), and decryption processing unit 318 decrypts data [KPcard(1)]Ks applied to data bus BS1 with session key Ks to extract public encryption key KPcard(1) (step S124).

Then, distribution control unit 312 produces license information data License containing the license ID data and others based on the data held in distribution information database 304 and others (step S126).

Further, music server 30 obtains encrypted content data [Dc]Kc from distribution information database 304, and sends it to memory card 110 via communication device 350 (step S128).

When cellular phone 100 receives data [Dc]Kc (step S130), memory card 110 stores received data [Dc]Kc in memory 1412 as it is (step S132).

Music server 30 obtains license key Kc from distribution information database 304 (step S134), and encryption processing unit 320 encrypts license key Kc and license information data License applied from distribution control unit 312 with public encryption key KPcard(1) applied from decryption processing unit 318 (step S136).

Encryption processing unit 322 receives data [Kc, License]Kcard(1) encrypted by encryption processing unit 320, and encrypts it with session key Ks for outputting the further encrypted data to data bus BS1. Communication device 350 sends data [[Kc, License]Kcard(1)]Ks encrypted by encryption processing unit 322 to memory card 110.

When cellular phone 100 receives data [[Kc, License]Kcard(1)]Ks (step S142), decryption processing unit 1410 in memory card 110 decrypts it with session key Ks so that data [Kc, License]Kcard(1) is extracted and recorded (stored) in memory 1412 (step S146).

Further, in memory card 110, decryption processing unit 1416 controlled by controller 1420 decrypts data [Kc, License]Kcard(1) stored in memory 1412, and decrypted license information data License is stored in register 1500 (step S148).

Through the operations described above, the memory card itself can receive the distributed data after sending public encryption key KPmedia(1) to the side (music server 30) sending session key Ks, and the content data stored in memory card 110 becomes reproducible. In the following description, the state, in which the content data stored in the memory card is reproducible, may be referred to as "a state SA of memory card 110". When the content data stored in the memory card is not reproducible, this state may be referred to as "a state SB of memory card 110".

When a notice of reception is sent from memory card 110 to music server 30, and is received by music server 30 (step S150), accounting database 302 stores accounting data of user 1 (step S152), and the processing ends (step S154).

Figure 8:
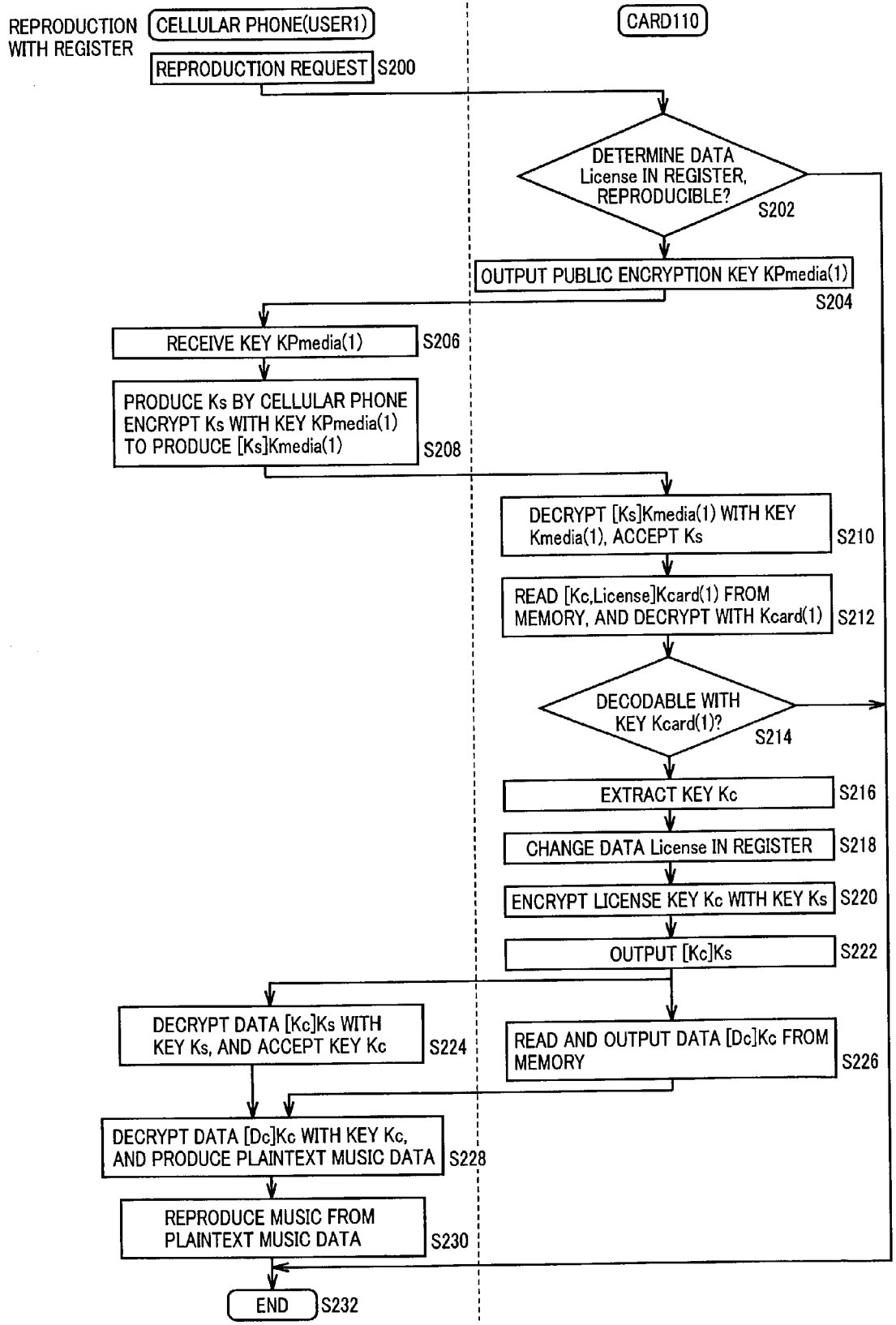
FIG. 8 is a flowchart representing processing of reproducing content data within cellular phone 100, and externally outputting it as music.

FIG. 8 is a flowchart representing reproduction processing in cellular phone 100 for decrypting the encrypted content data held in memory card 110, and externally outputting it as music.

Referring to FIG. 8, user 1 enters an instruction through touch key unit 1108 or the like of cellular phone 100 so that a reproduction request is output to memory card 110 (step S200).

In memory card 110, controller 1420 responds to this reproduction request, and determines based on license information data License held in register 1500 whether the request is made for the reproducible data (step S202). When it is determined that the requested data is reproducible, KPmedia(1) holding unit 1401 sends public encryption key KPmedia(1) to cellular phone 100 (step S204). When it is determined that the requested data is not reproducible, the processing ends (step S230).

When the requested data is reproducible, memory card 110 sends public encryption key KPmedia(1) so that cellular phone 100 receives public encryption key KPmedia(1) from memory card 110 (step S206), and operates as follows. Ks generating unit 1502 produces session key Ks, and encryption processing unit 1504 encrypts session key Ks with public encryption key KPmedia(1) to produce and send encrypted session key [Ks]KPmedia(1) to memory card 110 via data bus BS2 (step S208).

Memory card 110 receives session key Ks, which is produced and encrypted by cellular phone 100, via data bus BS2, and decrypts it with private decryption key Kmedia(1) to extract session key Ks (step S210).

Then, memory card 110 reads out encrypted data [Ks, License]Kcard(1) from memory 1412, and decryption processing unit 1416 decrypts it (step S212).

When the data read from memory 1412 is decodable with private decryption key Kcard(1) (step S214), license key Kc is extracted (step S216). When the data is not decodable, the processing ends (step S232).

When the data read from memory 1412 is decodable (step S214), data related to the times of reproduction, which is a part of license information data License in register 1500, is changed (step S218).

Then, license key Kc is encrypted with extracted session key Ks (step S220), and encrypted license key [Kc]Ks is applied to data bus BS2 (step S222).

Decryption processing unit 1506 of cellular phone 100 performs the decryption with session key Ks to obtain license key Kc (step S224).

Then, memory card 110 reads out encrypted content data [Dc]Kc from memory 1412, and applies it to data bus BS2 (step S226).

Audio decoding unit 1508 of cellular phone 100 decrypts encrypted content data [Dc]Kc with extracted license key Kc to produce plaintext music data (step S228), and reproduces music signals for applying them to mixing unit 1510 (step S230). Digital-to-analog converter 1512 receives and converts the data applied from mixing unit 1510 to output externally the reproduced music. Thereby, the processing ends (step S232).

Owing to the above structure, the memory card itself can perform the reproduction after sending public encryption key KPmedia(1) to the side (cellular phone 100) sending session key Ks.

Figure 9:
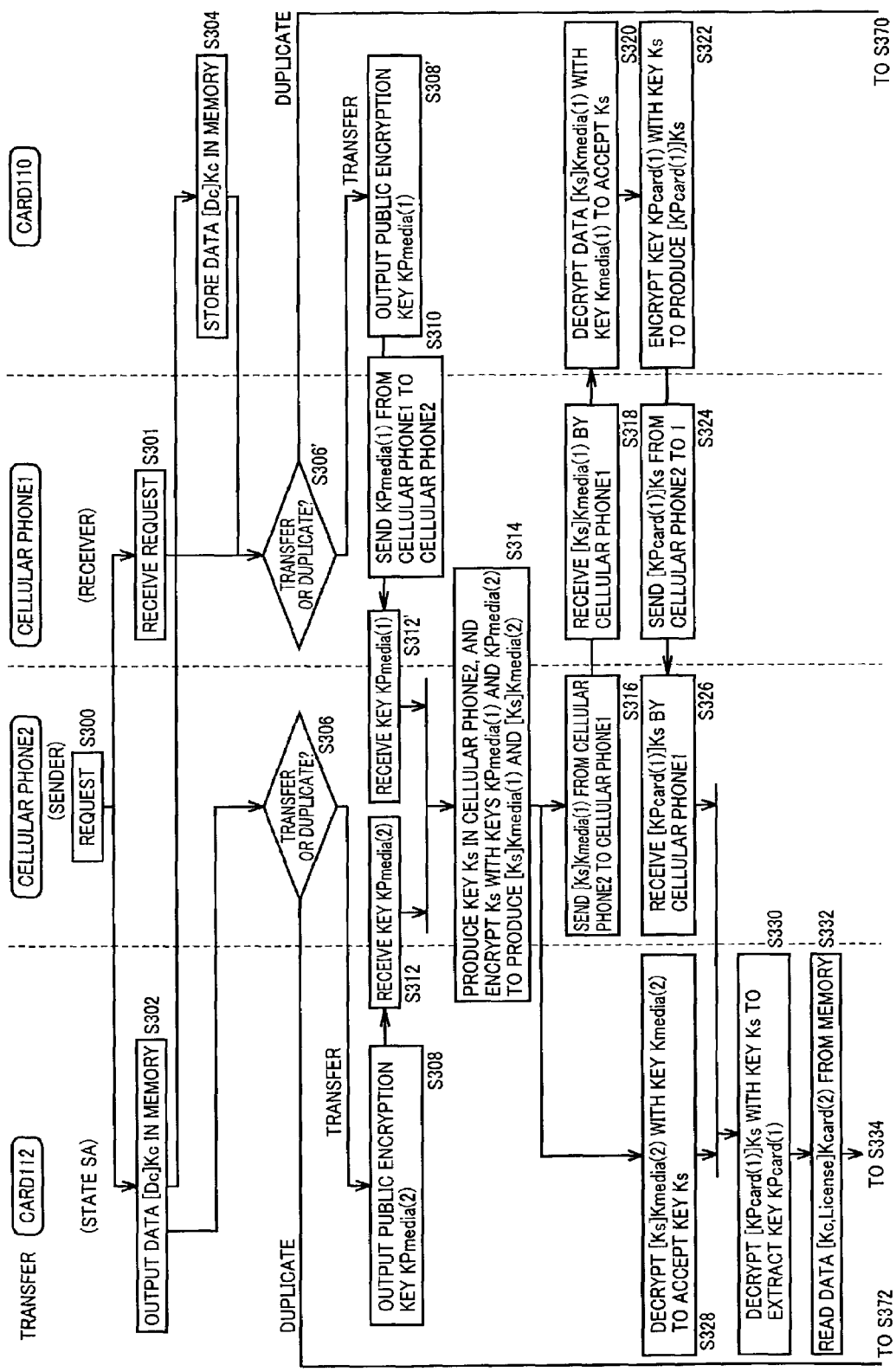
FIG. 9 is a first flowchart representing processing of transferring or duplicating content data, key data and others between two memory cards.
Figure 10:
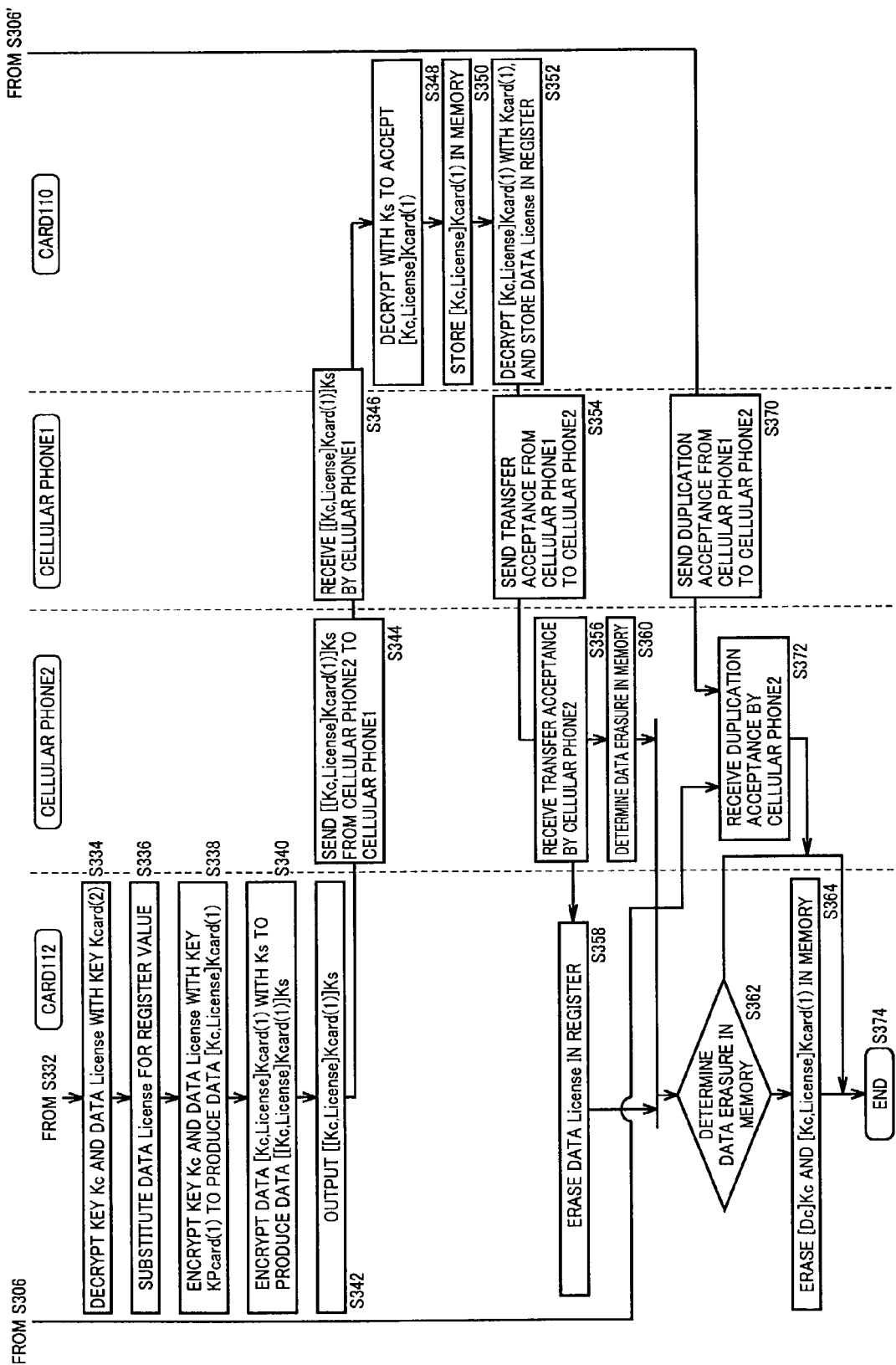
FIG. 10 is a second flowchart representing processing of transferring or duplicating content data, key data and others between two memory cards.

FIGS. 9 and 10 are first and second flowcharts representing the processing for transferring or duplicating music data, key data or the like between two memory cards.

It is assumed that cellular phone 102 is a sender, and cellular phone 100 is a receiver. It is also assumed that memory card 112 having a structure similar to that of memory card 110 is attached to cellular phone 102.

Cellular phone 102 first outputs a transfer request or a duplication request to its own memory card 112 and cellular phone 100 (step S300).

In response to this, memory card 112 reads out encrypted content data [Dc]Kc from memory 1412, and outputs it to memory card 110 (step S302). Cellular phone 100 receives the request from cellular phone 102 (step S301), and memory card 110 stores encrypted content data [Dc]Kc in memory 1412 (step S304).

Then, it is determined in cellular phones 102 and 100 whether the request applied in step S300 is a "transfer request" or a "duplication request" (steps S306 and S306'). When it is a "transfer request", memory card 112 sends a public encryption key KPmedia(2) to cellular phone 102 (step S308), and cellular phone 102 receives public encryption key KPmedia(2) (step S312). When it is a "transfer request", memory card 110 outputs public encryption key KPmedia(1) to cellular phone 100 (step S308'), and cellular phone 100 sends public encryption key KPmedia(1) to cellular phone 102 (step S310).

When cellular phone 102 receives public encryption keys KPmedia(1) and KPmedia(2) (steps S312 and S312'), session key generating circuit 1502 in cellular phone 102 produces session key Ks (step S303), and encryption processing unit 1504 encrypts session key Ks with public encryption keys KPmedia(1) and KPmedia(2) (step S314).

Cellular phone 102 transmits encrypted session key [Ks]KPmedia(2) to memory card 112 via data bus BS2, and memory card 112 operates to decrypt and extract session key Ks with private decryption key Kmedia(2) (step S328).

Further, cellular phone 102 sends encrypted session key [Ks]KPmedia(1) to cellular phone 100 (step S316). Cellular phone 100 receives encrypted session key [Ks]KPmedia(1) thus sent (step S318), and transmits it to memory card 110 so that decryption processing unit 1404 in memory card 110 decrypts encrypted session key [Ks]KPmedia(1) to accept session key Ks (step S320).

In memory card 110, session key Ks encrypts public encryption key KPcard(1) of memory card 110 with session key Ks (step S322), and encrypted data [KPcard(1)]Ks is sent from cellular phone 100 to cellular phone 102 (step S324). Cellular phone 102 receives data [KPcard(1)]Ks (step S326), and memory card 112 completes the reception of session key Ks (step S328). Subsequently, memory card 112 decrypts encrypted data [KPcard(1)]Ks sent from memory card 110 with session key Ks to extract public encryption key KPcard(1) of memory card 110 in the decrypted form (step S330).

In memory card 112, license key Kc and license information data License, which are encrypted with public encryption key KPcard(2) of memory card 112, are then read out from memory 1412 (step S332).

Then, decryption processing unit 1416 of memory card 112 decrypts license key Kc and license information data License with private decryption key Kcard(2) (step S334).

Controller 1420 in memory card 112 substitutes a value of license information data License thus decrypted for a data value in register 1500 (step S336).

Further, encryption processing unit 1414 in memory card 112 encrypts license key Kc and license information data License with public encryption key KPcard(1), which is extracted by decryption processing unit 1410, in memory card 110 (step S338).

The data encrypted by encryption processing unit 1414 in memory card 112 is further applied to encryption processing unit 1406 via selector switch 1408 having closed contact Pc, and encryption processing unit 1406 encrypts data [Kc, License]Kcard(1) with session key Ks to produce data [[Kc, License]Kcard(1)]Ks (step S340).

Subsequently, memory card 112 outputs data [[Kc, License]Kcard(1)]Ks to cellular phone 102 (step S342), and cellular phone 102 sends data [[Kc, License]Kcard(1)]Ks to cellular phone 100 (step S344).

Data [[Kc, License]Kcard(1)]Ks received cellular phone 100 (step S346) is transmitted to memory card 110, and decryption processing unit 1410 in memory card 110 decrypts encrypted data [[Kc, License]Kcard(1)]Ks to accept data [Kc, License]Kcard(1) (step S348).

In memory card 110, decryption processing unit 1410 stores the data, which is decrypted with session key Ks, in memory 1412 (step S350). Further, in memory card 110, decryption processing unit 1416 decrypts data [Kc, License]Kcard(1) based on private decryption key Kcard(1), and stores decrypted license information data License in register 1500 (step S352).

When memory card 110 completes the storing of decrypted license information data License in register 1500, memory card 110 sends a notification of the transfer acceptance to cellular phone 100, and cellular phone 100 sends a notification of transfer acceptance to cellular phone 102 (step S354).

When cellular phone 102 receives the notification of transfer acceptance from cellular phone 100, it transfers the notification to memory card 112 so that memory card 112 erases license information data License stored in register 1500 in response to reception of the notification (step S358).

In response to reception of the notification of transfer acceptance, cellular phone 102 displays a message on display 1110 for inquiring user 2 whether the user allows erasing of data stored in memory card 112 and corresponding to the transfer data stored in memory card 1412. User 2 enters a response to this message via touch key unit 1108 (step S360).

When data in register 1500 is erased (step S358), and the response to the above message is entered (step S360), controller 1420 in memory card 112 determines whether the data in memory 1412 is to be erased or not (step S362).

When there is an instruction to erase the related data in memory 1412 (step S362), controller 1420 operates to erase encrypted content data [Dc]Kc and data [Kc, License]Kcard(2) in memory 1412 (step S364), and the processing ends (step S374).

When the erasing of data in memory 1412 is not instructed (step S362), the processing ends (step S374). In this case, encrypted content data [Dc]Kc and data [Kc, License]Kcard(2) are left in memory 1412, but license information data License is not present in register 1500 so that user 2 cannot reproduce the music data unless user 2 receives the reproduction information from music server 30 again. Thus, memory card 112 enters the "state SB". In memory card 110, license key Kc and the license information data are moved in addition to the encrypted content data so that memory card 110 is in the "state SA".

When it is determined in step S306' that the "duplication request" is applied, a duplication acceptance notification is sent from cellular phone 100 to cellular phone 102 (step S370). When the duplication acceptance notification is received by cellular phone 102 (step S372), the processing ends (step S374).

Owing to the above structure, the transfer operation and the duplication operation can be performed after the memory card itself sends public encryption keys KPmedia(1) and KPmedia(2) to the side (cellular phone 100) sending session key Ks.

Second Embodiment

A data distribution system of a second embodiment differs from the data distribution system of the first embodiment in that each of the distribution server, cellular phones and memory cards is configured to produce a unique session key. More specifically, it is assumed that the distribution server or cellular phone generates session key Ks, a memory card 120 generates a session key Ks1, and a memory card 122 having substantially the same structure as memory card 120 generates a session key Ks2.

In the data distribution system of the second embodiment, each of the devices and instruments forming the system produces the session key by itself, and performs the operation for receiving data (i.e., the operation as a receiver) by sending first the session key to the opposite party (sender). The sender encrypts the session key sent from the receiver, and sends the encrypted data. The receiver decrypts the received data with the session key produced by it. The structure for performing the above operations is a distinctive feature of the second embodiment.

For achieving the above operations, a key KPp is used in the reproducing operation as an public encryption key for receiving the session key, which is produced by the memory card, on the cellular phone side, and a key Kp is used as a private decryption key for decrypting the data encrypted with public encryption key KPp.

Figure 11:
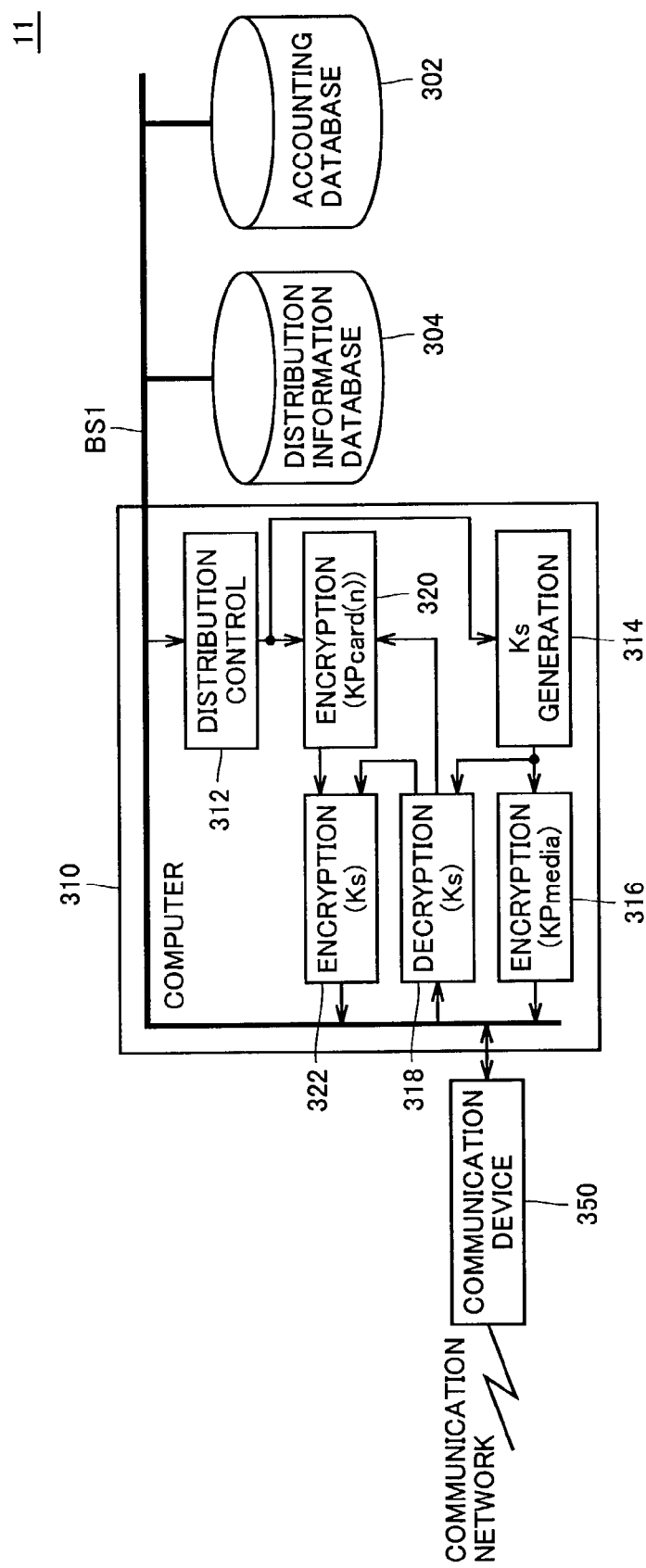
FIG. 11 is a schematic block diagram showing a structure of a music server 31 corresponding to a memory card 120 in a second embodiment.

FIG. 11 is a schematic block diagram showing a structure of a distribution server 11 corresponding to memory card 120 in the second embodiment. Distribution server 11 differs from distribution server 10 shown in FIG. 3 in that encryption processing unit 322 in data processing unit 310 further encrypts the output of encryption processing unit 320 not based on session key Ks applied from Ks generating unit 314 but based on a session key (e.g., session key Ks1), which is sent from the memory card attached to the cellular phone after being encrypted with session keys Ks1 and Ks2, and is decrypted by decryption processing unit 318 for extraction, and then applies the output thus encrypted to communication device 350 via data bus BS1.

Structures of distribution server 11 other than the above are similar to those of distribution server 10 of the first embodiment shown in FIG. 3. The same parts and portions bear the same reference numbers, and description thereof is not repeated.

Figure 12:
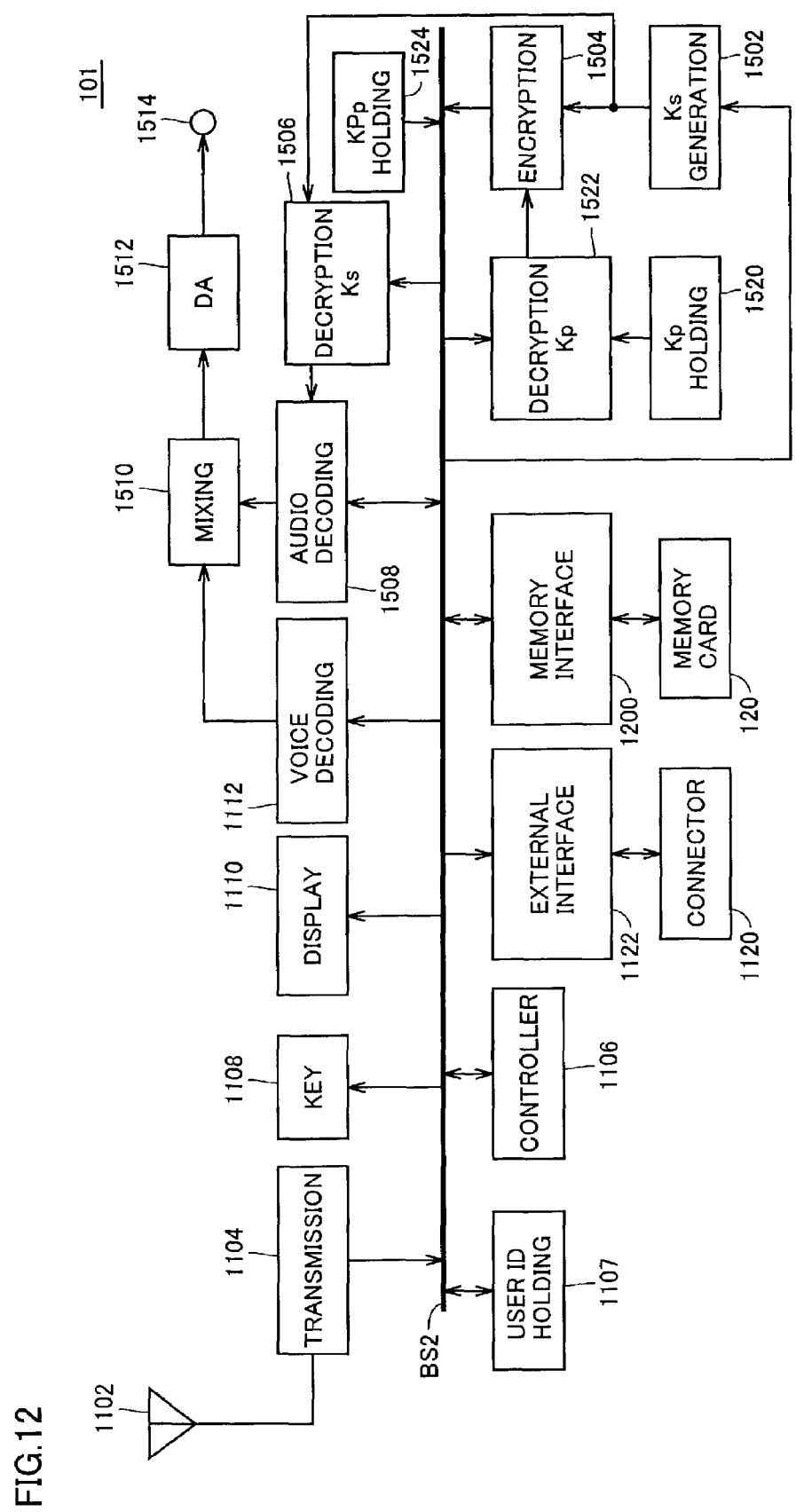
FIG. 12 is a schematic block diagram showing a structure of a cellular phone 101 in the second embodiment.

FIG. 12 is a schematic block diagram showing a structure of a cellular phone 101 in the second embodiment.

Cellular phone 101 differs from cellular phone 100 shown in FIG. 4 in that memory card 120 is attached thereto, and also differs in that cellular phone 101 includes a KPp holding unit 1524 for holding public encryption key KPp, and outputting public encryption key KPp to data bus BS2 in the reproducing operation.

Further, cellular phone 101 includes a Kp holding unit 1520 for holding private decryption key Kp, and a decryption processing unit 1522 for decrypting and extracting session key Ks1, which is encrypted with public encryption key KPp applied from memory card 120 via data bus BS2, based on private decryption key Kp applied from Kp holding unit 1520. Further, encryption processing unit 1504 encrypts its own session key Ks generated by Ks generating unit 1502 with session key Ks1 applied from decryption processing unit 1522 for outputting the same to data bus BS2.

Structures of cellular phone 101 other than the above are substantially the same as those of cellular phone 100 of the first embodiment shown in FIG. 1. The same parts and portions bear the same reference numbers, and description thereof is not repeated.

Figure 13:
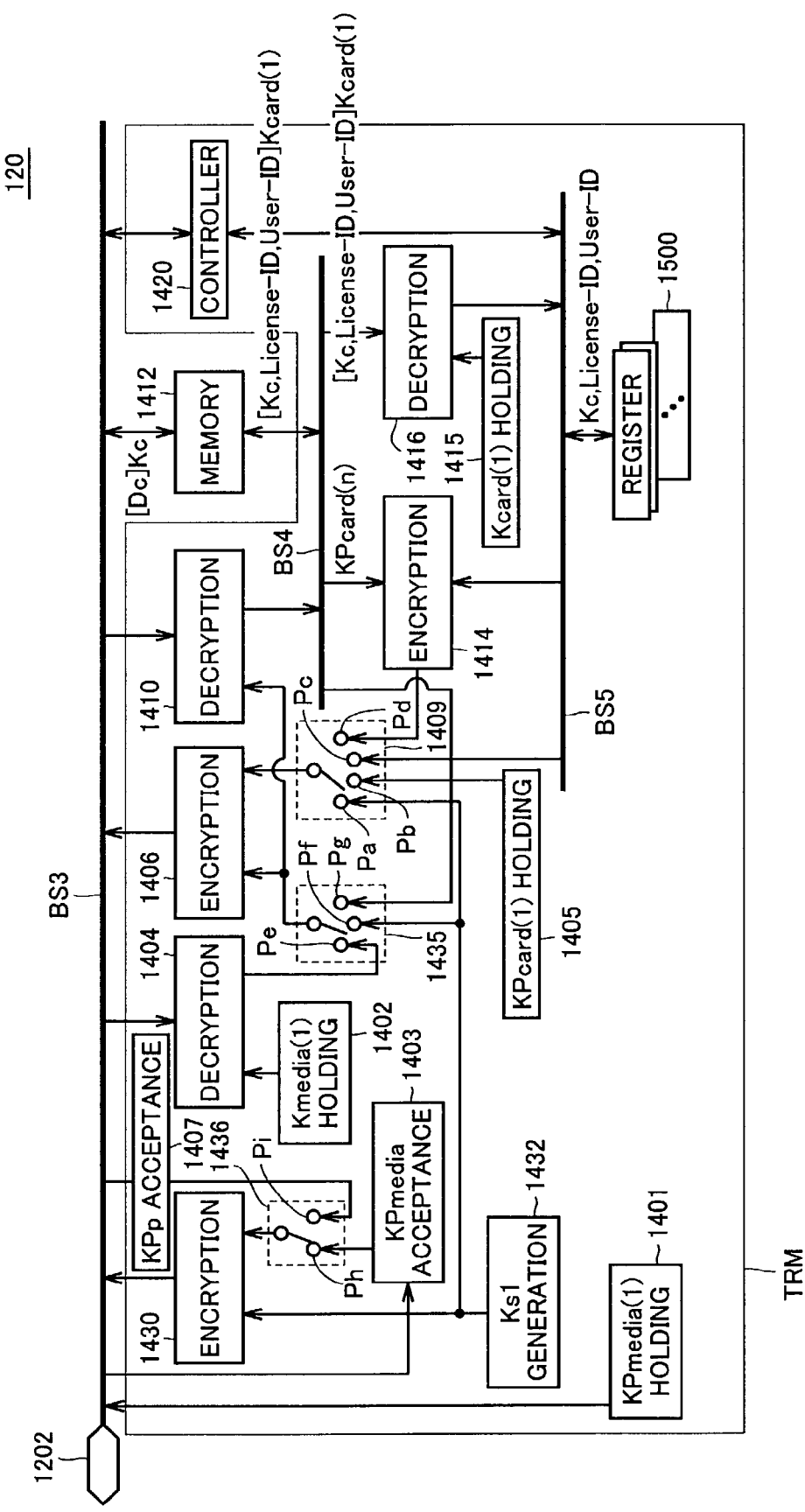
FIG. 13 is a schematic block diagram showing a structure of a memory card 120 in the second embodiment of the invention.

FIG. 13 is a schematic block diagram showing a structure of memory card 120 in the second embodiment of the invention, and corresponds to FIG. 5 showing the first embodiment.

The structure of memory card 120 differs from the structure of memory card 110 in that memory card 120 includes a session key Ks1 generating unit 1432 for generating session key Ks1 unique to memory card 120.

In addition to the above difference, memory card 120 includes an encryption processing unit 1430 for encrypting session key Ks1 produced by session key generating unit 1432, and applying the same to data bus BS3.

Corresponding to the above, memory card 120 further includes a KPp accepting unit 1407 for receiving and holding public encryption key KPp of cellular phone 101 in the reproduction mode, a KPmedia accepting unit 1403 for receiving public encryption key KPmedia(n) of the opposite party (receiver or destination) in the transfer mode, and a selector switch 1436, which receives the outputs of KPmedia accepting unit 1403 and KPp accepting unit 1407, and outputs either of them depending on the operation mode. Selector switch 1436 has contacts Pi and Ph, which are coupled to KPp accepting unit 1407 and KPmedia accepting unit 1403, respectively. Encryption processing unit 1430 applies session key Ks1 to data bus BS3 after encrypting it with public encryption key KPmedia(n) or public encryption key KPp applied from selector switch 1436.

When memory card 120 performs the distributing operation, or functions as the receiver or destination in the transfer operation, selector switch 1436 is not used. In the reproducing operation, selector switch 1436 closes contact Pi. When memory card 120 functions as the sender in the transfer operation, contact Ph is closed.

Memory card 120 further includes a selector switch 1435, which has contacts Pe, Pf and Pg for receiving session key Ks of the music server applied from decryption processing unit 1404, the output of Ks1 generating unit 1432 and session key Ks of cellular phone 101 applied from data bus BS4, and selectively outputs them in accordance with the operation mode. Contact Pe is coupled to the output of decryption processing unit 1404, contact Pf is coupled to the output of Ks1 generating unit 1432, and contact Pg is coupled to data bus BS4. Accordingly, encryption processing unit 1406 and decryption processing unit 1410 perform the encryption and decryption based on the key applied from selector switch 1435, respectively.

Selector switch 1435 closes contact Pe when session key Ks1 is to be extracted from music server 31 in the distribution operation. When encrypted license key license key Kc and encrypted license information data applied from music server 31 are to be decrypted with session key Ks1 in the distribution operation, selector switch 1435 closes contact Pf. Selector switch 1435 closes contact Pf when decryption is performed in the reproducing operation, and closes contact Pg when encryption is performed in the reproducing operation. When selector switch 1435 is on the sender side in the transfer operation and decryption is to be performed, selector switch 1435 closes contact Pf. When selector switch 1435 is on the sender side in the transfer operation and encryption is to be performed, selector switch 1435 closes contact Pg. When selector switch 1435 is on the receiver side in the transfer operation and the session key is to be received from the sender, selector switch 1435 closes contact Pe. When selector switch 1435 is on the receiver side in the transfer operation, and license key Kc and license information data License are to be received, selector switch 1435 closes contact Pf.

Memory card 120 further includes a selector switch 1409 instead of selector switch 1408. Selector switch 1409 has contacts Pa, Pb, Pc and Pd, and receives session key Ks1 of its memory card 120 applied from Ks1 generating unit 1432, the output of KPcard holding unit 1405, license key Kc applied from data bus BS5, and license key Kc and license information data License, which are applied from encryption processing unit 1414 and are encrypted with public encryption key KPcard(n) of the opposite party, and selectively outputs them in accordance with the operation mode.

Contact Pa is coupled to the output of Ks1 generating unit 1432, and contact Pb is coupled to the output of KPcard(1) holding unit 1405. Also, contacts Pc and Pd are coupled to data bus BS5 and the output of encryption processing unit 1414, respectively. Therefore, encryption processing unit 1406 encrypts the various kinds of data applied from selector switch 1409.

More specifically, when selector switch 1409 is on the receiver side in the distribution mode, and public encryption key KPcard(1) and session key Ks1 of its memory card 120 are to be sent to music server 31, selector switch 1409 successively closes contacts Pb and Pa. In the reproduction mode, selector switch 1409 closes contact Pc. When selector switch 1409 is on the sender side in the transfer mode, it closes contact Pd. When selector switch 1409 is on the receiver side in the transfer mode, and public encryption key KPcard(1) and session key Ks1 of its memory card 120 are to be sent, selector switch 1409 successively closes contacts Pb and Pa.

Figure 14:
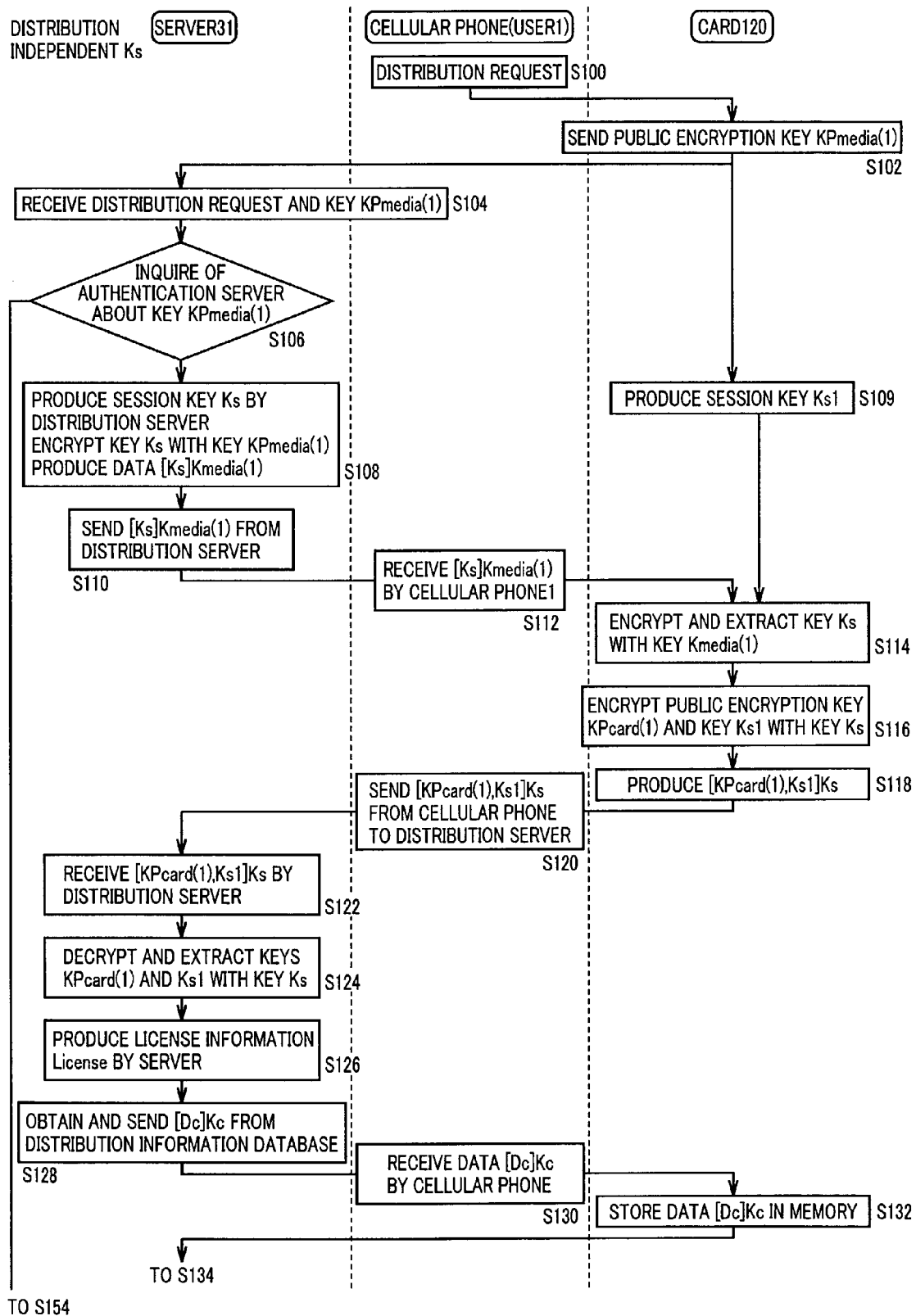
FIG. 14 is a first flowchart representing a distribution mode using memory card 120 shown in FIG. 13.
Figure 15:
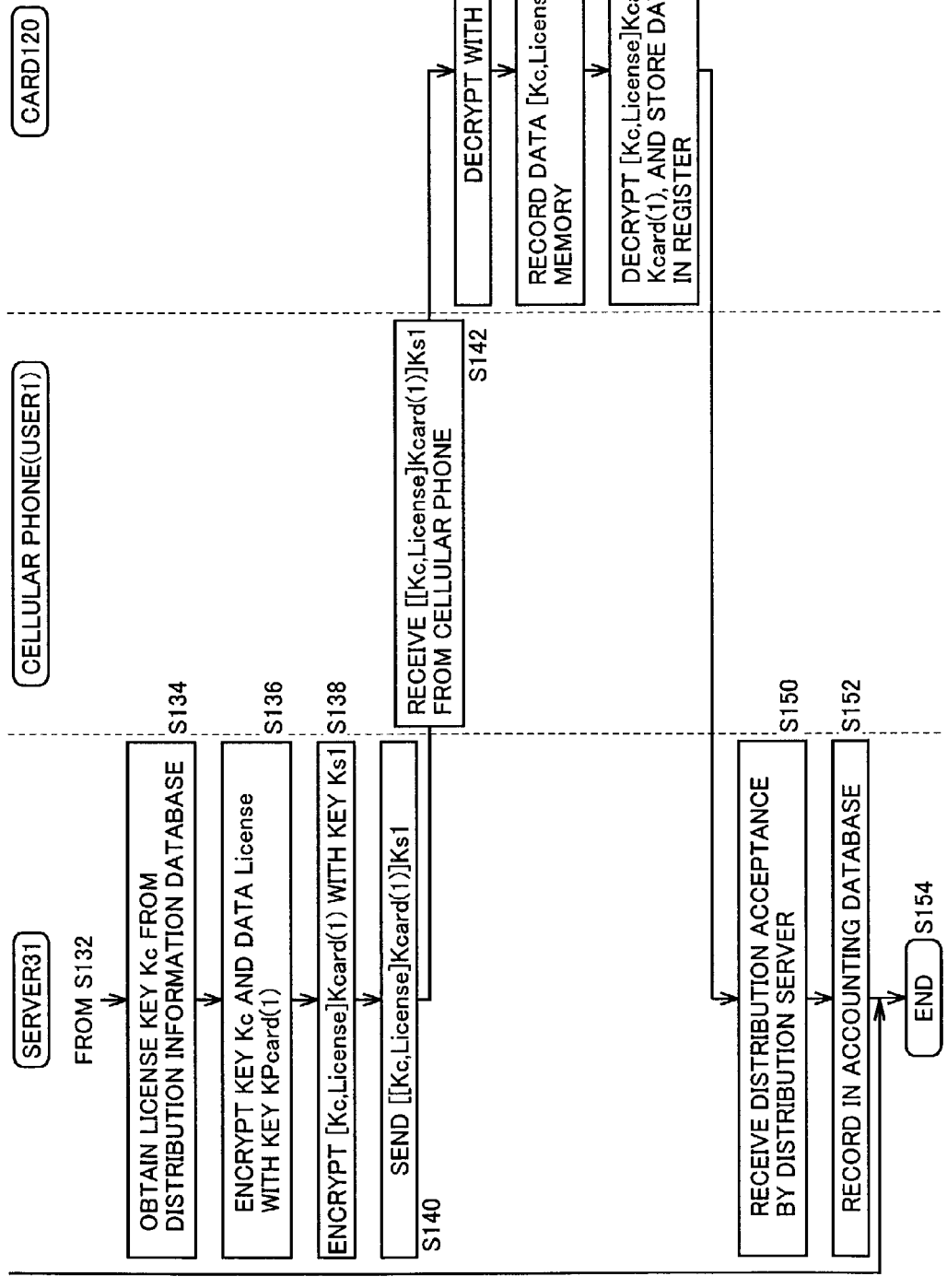
FIG. 15 is a second flowchart representing the distribution mode using memory card 120 shown in FIG. 13.

FIGS. 14 and 15 are first and second flowcharts representing the distribution mode using memory card 120 shown in FIG. 13.

FIGS. 14 and 15 represent operations, in which the system is in the distribution mode, and user 1 uses memory card 120 for receiving the music data distributed from music server 31.

First, user 1 requests the distribution via cellular phone 101, e.g., by operating keys or buttons on touch key unit 1108 (step S100).

In response to this distribution request, KPmedia(1) holding unit 1401 in memory card 120 sends public encryption key KPmedia(1) to music server 31 (step S102). Further, Ks1 generating unit 1432 in memory card 120 produces session key Ks1 (step S109).

In music server 31, when the distribution request and public encryption key KPmedia(1) are received from memory card 120 (step S104), inquiry is applied to authentication server 12 based on received public encryption key KPmedia(1) (step S106), and next processing moves to the next step when the access is performed with the regular memory card. If a regular memory card is not used, the processing ends (step S154).

When it is determined by the inquiry that a regular memory card is used, session key generating unit 314 produces session key Ks in music server 31. Further, encryption processing unit 316 in music server 31 encrypts session key Ks with received public encryption key KPmedia(1) to produce encrypted session key [Ks]Kmedia(1) (step S108).

Then, music server 31 applies encrypted session key [Ks]Kmedia(1) to data bus BS1. Communication device 350 sends encrypted session key [Ks]Kmedia(1) received from encryption processing unit 316 to memory card 120 of cellular phone 101 over the communication network (step S110).

When cellular phone 101 receives encrypted session key [Ks]Kmedia(1) (step S112), decryption processing unit 1404 in memory card 120 decrypts the data applied to data bus BS3 via memory interface 1200 with encrypted session key [Ks]Kmedia(1) so that session key Ks is decrypted and extracted (step S114).

In the distribution mode, selector switch 1409 is in the state for successively closing contacts Pa and Pb so that encryption processing unit 1406 encrypts session key Ks1 applied from session key generating unit 1432 via contact Pa as well as public encryption key KPcard(1) (i.e., public encryption key for memory card 120) applied from KPcard(1) holding unit 1405 via contact Pb with session key Ks (step S116), and thereby produces data [KPcard(1), Ks1]Ks (step S118).

Cellular phone 101 sends data [KPcard(1), Ks1]Ks encrypted by encryption processing unit 1406 to music server 31 (step S120).

In music server 31, communication device 350 receives data [KPcard(1), Ks1]Ks (step S122), and decryption processing unit 318 decrypts data [KPcard(1), Ks1]Ks applied to data bus BS1 with session key Ks to extract public encryption key KPcard(1) and session key Ks1 in the decrypted form (step S124).

Then, distribution control unit 312 produces license information data License including license ID data and others based on the data held in distribution information database 304 and others (step S126).

Further, music server 31 obtains encrypted content data [Dc]Kc from distribution information database 304, and sends it to memory card 120 via communication device 350 (step S128).

When cellular phone 101 receives encrypted content data [Dc]Kc (step S130), memory card 120 stores encrypted content data [Dc]Kc thus received in memory 1412 as it is (step S132).

Music server 31 obtains license key Kc from distribution information database 304 (step S134), and encryption processing unit 320 encrypts license key Kc and license information data License applied from distribution control unit 312 with public encryption key KPcard(1) applied from decryption processing unit 318 (step S136).

Encryption processing unit 322 receives data [Kc, License]Kcard(1) encrypted by encryption processing unit 320, and applies it to data bus BS after encrypting the data with session key Ks1 applied from memory card 120. Communication device 350 sends data [[Kc, License]Kcard(1)]Ks1 encrypted with encryption processing unit 322 to memory card 120.

When cellular phone 101 receives data [[Kc, License]Kcard(1)]Ks1 (step S142), decryption processing unit 1410 in memory card 120 decrypts it with session key Ks1 applied from Ks1 generating unit 1432 via contact Pf so that data [Kc, License]Kcard(1) is extracted and stored in memory 1412 (step S146).

In memory card 120, decryption processing unit 1416 decrypts data [Kc, License]Kcard(1) stored in memory 1412 under the control of controller 1420, and stores decrypted license information data License in register 1500 (step S148).

Through the above operations, memory card 120 can receive the distributed data after memory card 120 itself sends public encryption key KPmedia(1) and session key Ks1 to the sender side (music server 31) of the encrypted content data, and thereby memory card 120 can enter the state, in which the music information can be reproduced.

Further, memory card 120 sends a notification of distribution acceptance to music server 31. When music server 31 receives this distribution acceptance notification (step S150), accounting database 302 stores accounting data of user 1 (step S152), and the processing ends (step S154).

Figure 16:
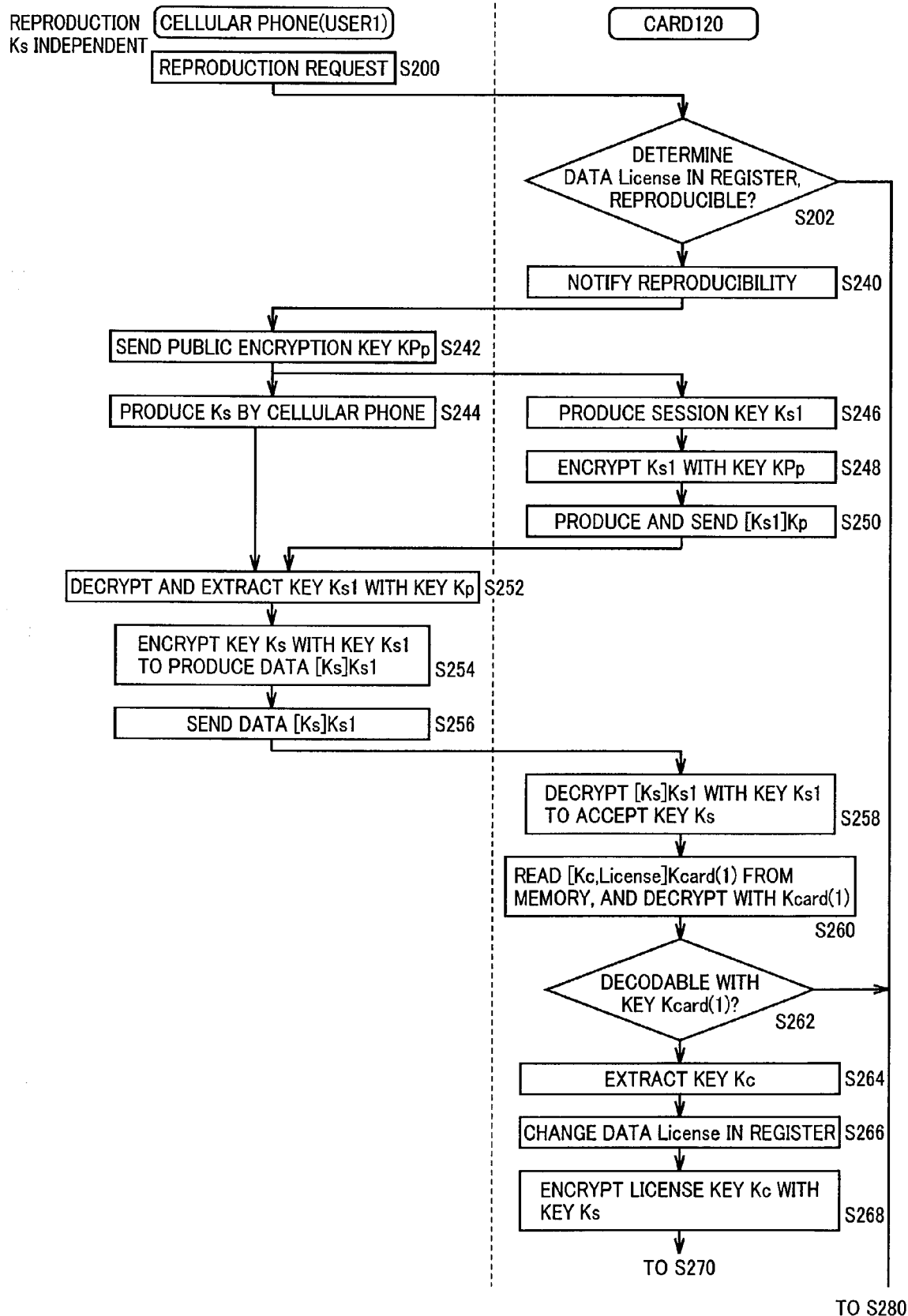
FIG. 16 is a first flowchart representing reproduction processing of reproducing content data within cellular phone 101, and externally outputting it as music.
Figure 17:
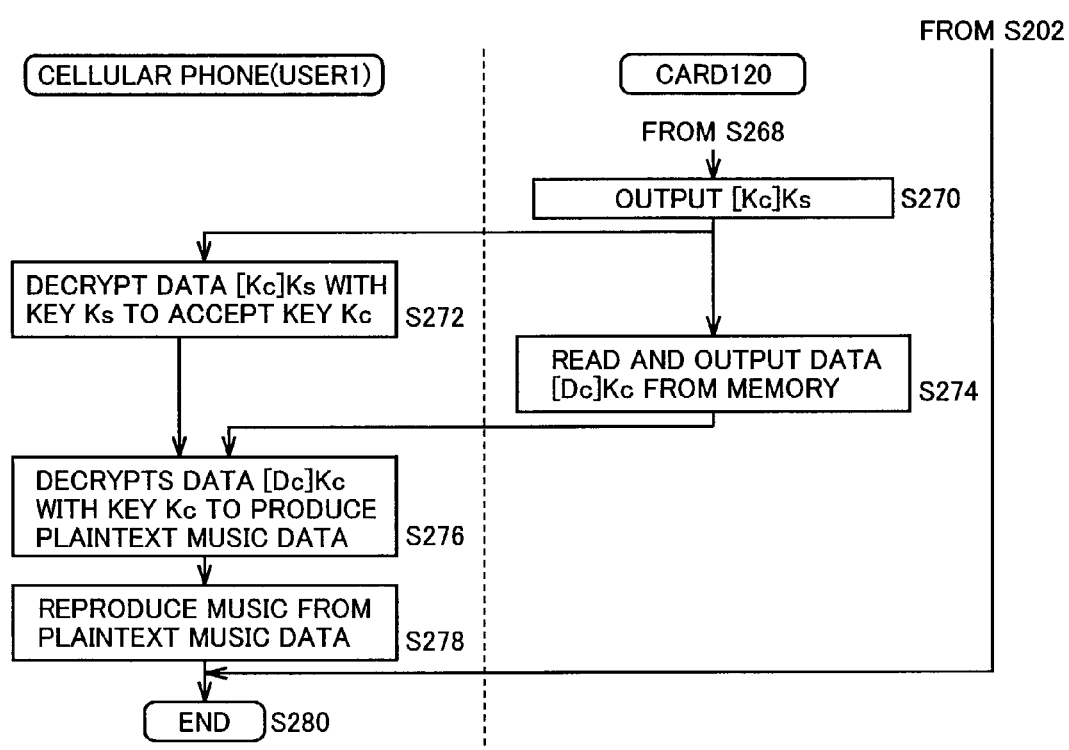
FIG. 17 is a second flowchart representing reproduction processing of reproducing content data within cellular phone 101, and externally outputting it as music.

FIGS. 16 and 17 are first and second flowcharts representing the reproduction mode of cellular phone 101, in which the encrypted content data held by memory card 120 is decrypted for externally outputting the content data (i.e., music data) as music.

Referring to FIGS. 16 and 17, user 1 applies a reproduction request entered by user 1 via touch key unit 1108 or the like of the cellular phone to memory card 120 (step S200).

In response to this reproduction request, controller 1420 in memory card 120 determines based on the license information data License held in register 1500 whether the request is applied for the reproducible data or not (step S202). When it is determined that the requested data is reproducible, a notification that the data is reproducible is sent to cellular phone 101 (step S240). When it is not reproducible, the processing ends (step S280).

When memory card 120 determines that the requested data is reproducible, and sends the notification that the data is reproducible, cellular phone 101 sends public encryption key KPp to memory card 120 (step S242), and Ks generating unit 1502 produces session key Ks (step S244).

Also, memory card 120 produces session key Ks1 (step S240). Memory card 120 encrypts session key Ks1 with public encryption key KPp received from cellular phone 101 via data bus BS2 (step S248), and sends encrypted session key [Ks1]Kp thus prepared to cellular phone 101 (step S250).

When cellular phone 101 receives encrypted session key [Ks1]Kp from memory card 120, decryption processing unit 1522 in cellular phone 101 decrypts it with private decryption key Kp to extract session key Ks1 prepared by memory card 120 (step S252). Then, encryption processing unit 1504 in cellular phone 101 encrypts session key Ks prepared by cellular phone 101 with session key Ks1 to produce encrypted session key [Ks]Ks1 (step S254), and sends encrypted session key [Ks]Ks1 thus prepared to memory card 120 (step S256).

Memory card 120 receives encrypted session key [Ks]Ks1 produced by cellular phone 101 via data bus BS2, and decrypts it with session key Ks1 for extracting session key Ks produced by cellular phone 101 (step S258).

Then, memory card 120 reads out encrypted data [Kc, License]Kcard(1) from memory 1412, and decryption processing unit 1416 decrypts it (step S260).

When the data read from memory 1412 is decodable with private decryption key Kcard(1) (S262), license key Kc is extracted (step S264). If not decodable, the processing ends (step S280).

When the data read from memory 1412 is decodable, processing is performed to change the data, which is contained in license information data License in register 1500, and is related to the reproduction times (step S266).

In memory card 120, encryption processing unit 1406 then encrypts license key Kc with extracted session key Ks (step S268), and applies encrypted license key [Kc]Ks to data bus BS2 (step S270).

Decryption processing unit 1506 in cellular phone 101 performs the decryption with session key Ks to obtain license key Kc.

Then, memory card 120 reads out encrypted content data [Dc]Kc from memory 1412, and applies it to data bus BS2 (step S274).

Audio decoding unit 1508 in cellular phone 101 decrypts encrypted content data [Dc]Kc with extracted license key Kc to produce plaintext content data (step S276), and reproduces music signals for applying them to mixing unit 1510 (step S276). Digital-to-analog converter 1512 receives and converts the music signals applied from mixing unit 1510 for externally outputting the reproduced music, and then the processing ends (step S232).

Owing to the above structures, the memory card itself and the cellular phone itself produce session keys Ks1 and Ks, respectively, and the reproduction can be performed after the encrypted data is transmitted using these keys.

Figure 18:
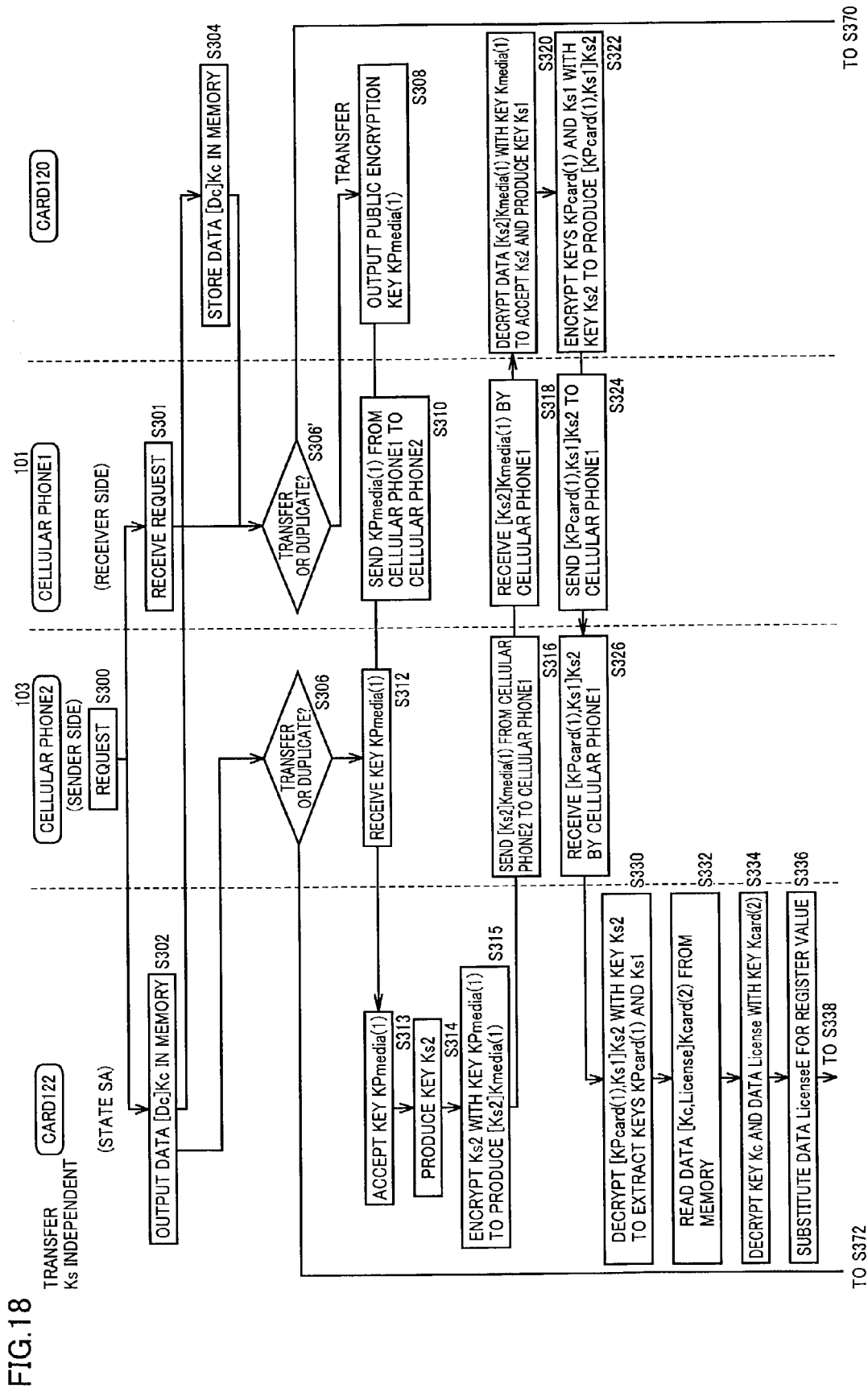
FIG. 18 is a first flowchart representing processing of transferring or duplicating content data, key data and others between two memory cards.
Figure 19:
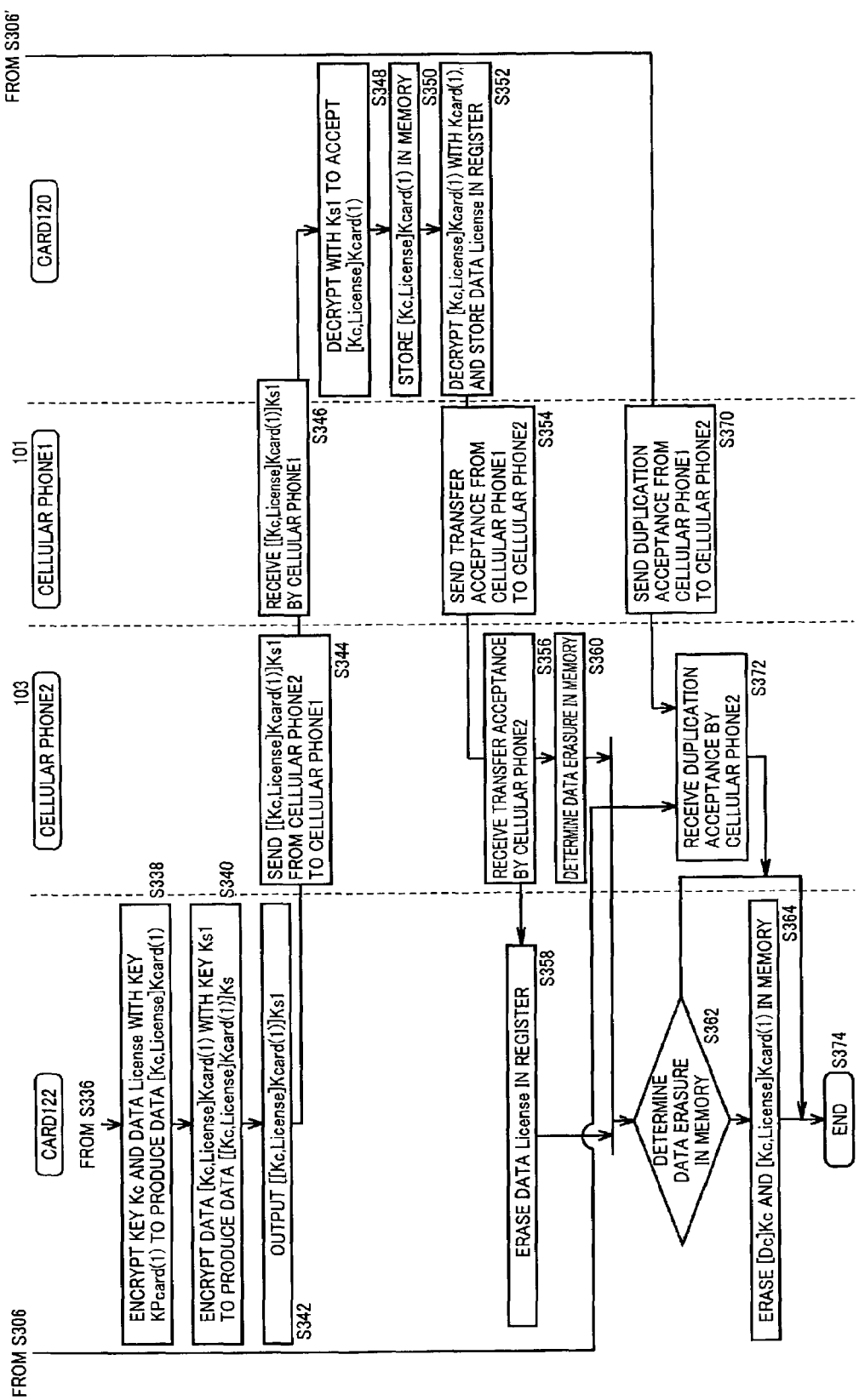
FIG. 19 is a second flowchart representing processing of transferring or duplicating content data, key data and others between two memory cards.

FIGS. 18 and 19 are first and second flowcharts representing the processing of transferring or duplicating the content data, key data and others between two memory cards, respectively.

It is assumed that a cellular phone 103 having substantially the same structure as cellular phone 101 is on the sender side, and cellular phone 101 is on the receiver side. Memory card 122 having substantially the same structure as memory card 120 is likewise attached to cellular phone 103.

Cellular phone 103 first outputs a transfer request or a duplication request to memory card 122 attached thereto and cellular phone 101 (step S300).

In response to this, memory card 122 reads out encrypted content data [Dc]Kc from memory 1412, and outputs it to memory card 120 (step S302). Cellular phone 101 receives the request from cellular phone 103 (step S301), and memory card 120 operates to store encrypted content data [Dc]Kc in memory 1412 (step S304).

In cellular phones 103 and 101, it is then determined whether the request applied in step S300 is a "transfer request" or a "duplication request" (steps S306 and S306'). When it is a "transfer request", memory card 120 outputs public encryption key KPmedia(1) to cellular phone 101 (step S308), and cellular phone 101 sends public encryption key KPmedia(1) to cellular phone 103 (step S310).

When cellular phone 103 receives public encryption key KPmedia(1) (step S312), and transfers it to memory card 122 (step S313), Ks2 generating circuit 1432 of memory card 122 produces session key Ks2 (step S314), and encryption processing unit 1430 encrypts session key Ks2 with public encryption key KPmedia(1) (step S315).

Cellular phone 103 sends encrypted session key [Ks2]KPmedia(1) to cellular phone 101 (step S316). Cellular phone 101 receives encrypted session key [Ks2]KPmedia(1) (step S318), and transmits it to memory card 120. In memory card 120, decryption processing unit 1404 decrypts encrypted session key [Ks2]KPmedia(1), and session key generating unit 1432 produces session key Ks1 to be used in memory card 120 (step S320).

In memory card 120, public encryption key KPcard(1) and session key Ks1 of memory card 120 are encrypted with session key Ks2 (step S322), and encrypted data [KPcard(1), Ks1]Ks2 is sent from cellular phone 101 to cellular phone 103 (step S324). Cellular phone 103 receives data [KPcard (1), Ks1]Ks2 (step S326), and transfers it to memory card 122.

In memory card 122, decryption processing unit 1410 decrypts encrypted data [KPcard(1), Ks1]Ks2 sent from memory card 120 with session key Ks2, and extracts public encryption key KPcard(1) and session key Ks1 of memory card 120 in the decoded form (step S330).

In memory card 122, encrypted data [Kc, License]Kcard (2), which corresponds to license key Kc and license information data License, and is encrypted with public encryption key KPcard(2) of memory card 22, is then read out from memory 1412 (step S332).

Then, decryption processing unit 1416 of memory card 122 decrypts data [Kc, License]Kcard(2) with private decryption key Kcard(2) (step S334).

Controller 1420 of memory card 122 substitutes the value of license information data License thus decrypted for the data value in register 1500 (step S336).

Encryption processing unit 1414 in memory card 122 encrypts license key Kc and license information data License with public encryption key KPcard(1) in memory card 120 extracted by decryption processing unit 1410 (step S338).

The data encrypted by encryption processing unit 1414 in memory card 122 is applied to encryption processing unit 1406 via selector switch 1409 having closed contact Pd, and encryption processing unit 1406 in memory card 122 encrypts data [Kc, License]Kcard(1) with session key Ks1 to produce data [[Kc, License]Kcard(1)]Ks1 (step S340).

Then, memory card 122 outputs data [[Kc, License]Kcard(1)]Ks1 to cellular phone 103 (step S342), and cellular phone 103 sends data [[Kc, License]Kcard(1)]Ks1 to cellular phone 101 (step S344).

Data [[Kc, License]Kcard(1)]Ks1 is received by cellular phone 101 (step S346), and is transmitted to memory card 120, in which decryption processing unit 1410 decrypts encrypted data [[Kc, License]Kcard(1)]Ks1, and accepts data [Kc, License]Kcard(1) (step S348).

In memory card 120, data [Kc, License]Kcard(1) decrypted by decryption processing unit 1410 with session key Ks1 is stored in memory 1412 (step S350). In memory card 120, decryption processing unit 1416 decrypts data [Kc, License]Kcard(1) based on private decryption key Kcard(1), and register 1500 stores license information data License thus decrypted (step S352).

Subsequent processing performed by memory cards 120 and 122 in either of the transfer mode and the duplication mode are substantially the same as the processing by memory cards 110, 112 and others of the first embodiment already described with reference to FIGS. 9 and 10, and therefore description thereof is not repeated.

Owing to the above structures, the operations in the transfer mode can be performed after producing the session key by each of the memory cards on the sender and receiver sides.

Accordingly, license key Kc of data transmitted on the data bus and others as well as the key for encrypting license information data License are unique to every session and every instrument or device. This can further improve the security of transmission of license key Kc and license information data License.

Owing to the above structures, the transfer of data from memory card 122 to memory card 120 can be performed without using a cellular phone terminal having session key generating circuit 1502 already described, and more specifically, can be performed by the memory cards and the interface devices connected to the memory cards. This further improves the convenience of users.

In the transfer operation, the data included in license information data for restricting the times of reproduction is set in such a manner that the license information data recorded in memory 1412 is changed into the license information data bearing the number of reproduction times, which was corrected by register 1500 in response to every reproduction. Even when the content data is transferred between the memory cards, the above manner can prevent such a situation that the reproduction times of the content data exceed the times restricted and determined at the time of distribution.

Third Embodiment

A data distribution system of a third embodiment has such a distinctive feature that the user does not receive encrypted content data distributed from a distribution carrier, i.e., a cellular phone company, but receives encrypted content data from a content data vending machine disposed, e.g., on a street.

Figure 20:
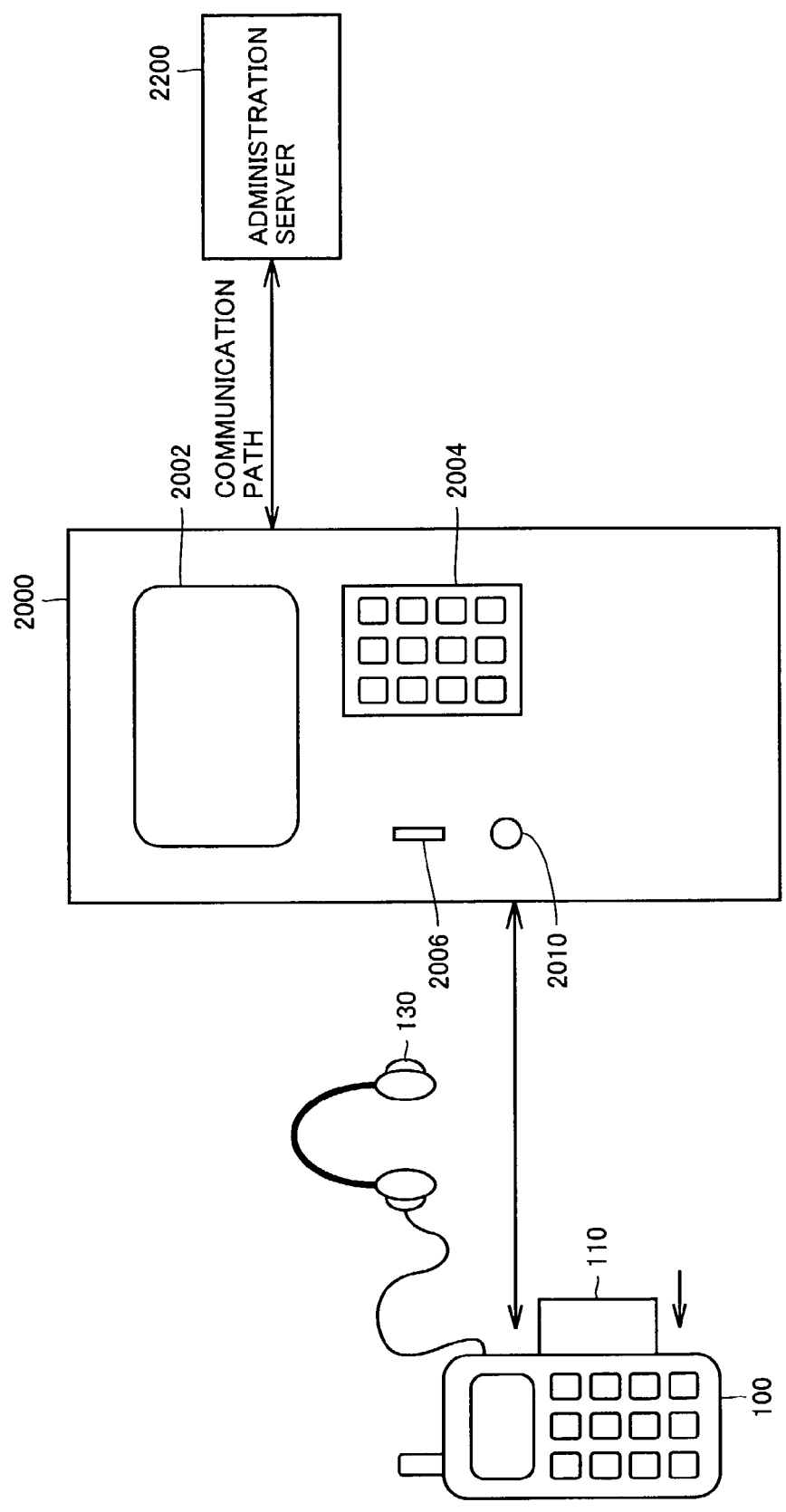
FIG. 20 conceptually shows a structure of a data distribution system of a third embodiment.

FIG. 20 conceptually shows a structure of the data distribution system of the third embodiment. Since cellular phone 100 and memory card 110 have substantially the same structures as cellular phone 100 and memory card 110 in the first embodiment already described, description thereof is not repeated.

Referring to FIG. 20, a content data vending machine 2000 includes a display 2002 for providing guidance and others on distribution to users, a keyboard 2004 for entering an instruction by a user, a coin slot 2006 and an external connector 2010 for transmitting data to and from cellular phone 100 via connector 1120. Content data vending machine 2000 is connected to an administration server 2200 for administrating a sales record and others over a cellular phone network or the like.

Figure 21:
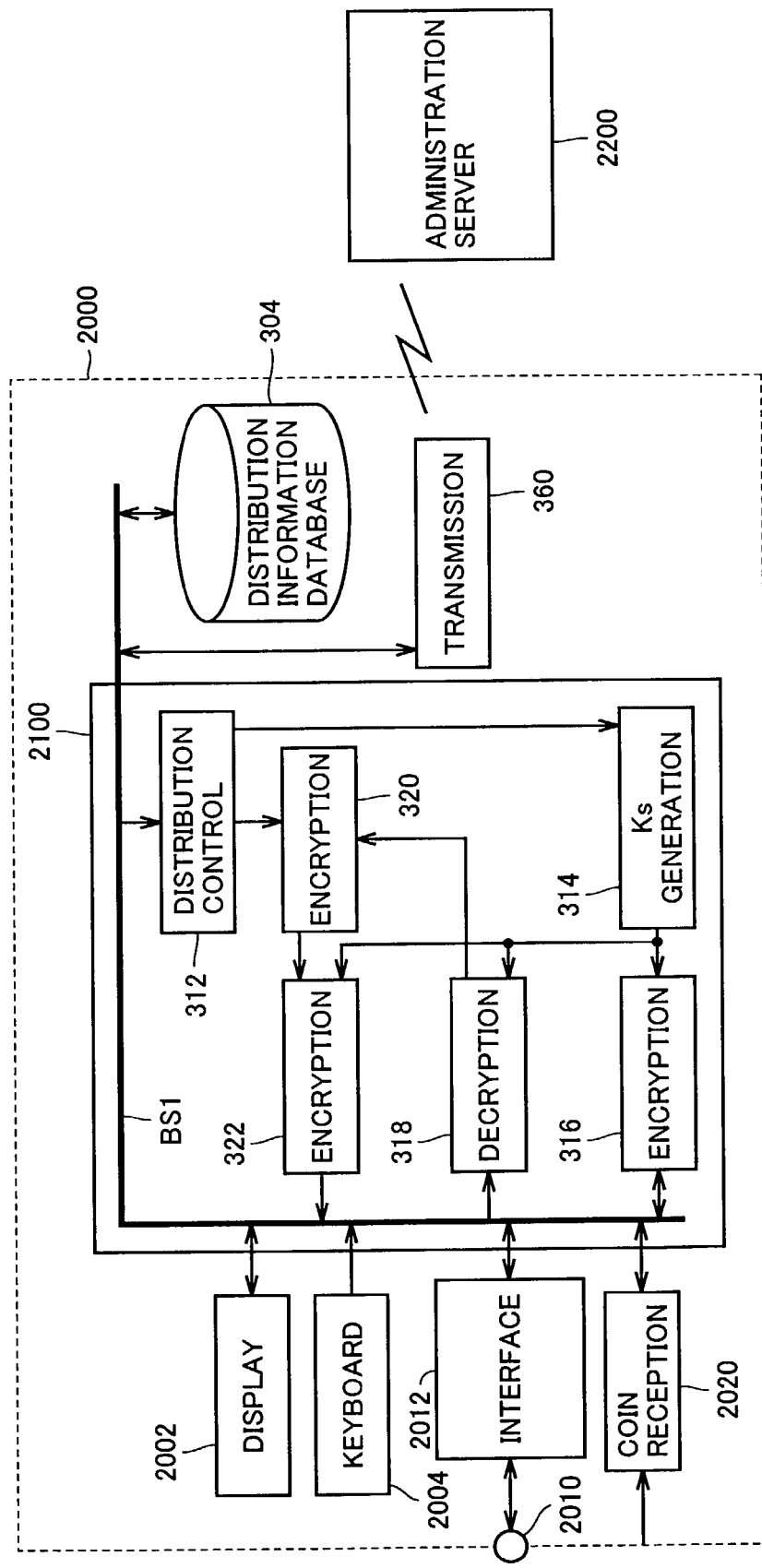
FIG. 21 is a schematic block diagram showing a structure of a content data vending machine 2000 in the third embodiment.

FIG. 21 is a schematic block diagram showing a structure of content data vending machine 2000 of the third embodiment. As already described, content data vending machine 2000 includes display 2002, keyboard 2004, a coin receiver 2020 for receiving coins or the like dropped through slot 2006, external connector 2010, an interface unit 2012 arranged between connector 2010 and the data bus, distribution information database 304 for holding data, which is prepared by encrypting the content data (music data) in a predetermined scheme, and distribution information such as license information data and others, a communication device 360 for transmitting information to and from administration server 2200, and a data processing unit 2100, which receives data from distribution information database 304 and administration server 2200 via data bus BS1, and encrypts the data in a predetermined scheme.

Similarly to the first embodiment, data processing unit 2100 is internally provided with distribution control unit 312 for controlling the operation of data processing unit 2100 in accordance with data on data bus BS1, session key generating unit 314 for generating session key Ks under the control of distribution control unit 312, encryption processing unit 316 for encrypting session key Ks produced by session key generating unit 314 with public encryption key KPmedia(n) unique to the card medium, and applying the same to data bus BS1, decryption processing unit 318 for receiving and decrypting the data, which is applied via data bus BS1 from connector 2010 after being encrypted with session key Ks in the cellular phone of the user, encryption processing unit 320 for encrypting the license information data with public encryption key KPcard(n) extracted by decryption processing unit 318 under control of distribution control unit 312, and encryption processing unit 322 for further encrypting the output of encryption processing unit 320 with session key Ks, and applying it to connector 2010 via data bus BS1.

Figure 22:
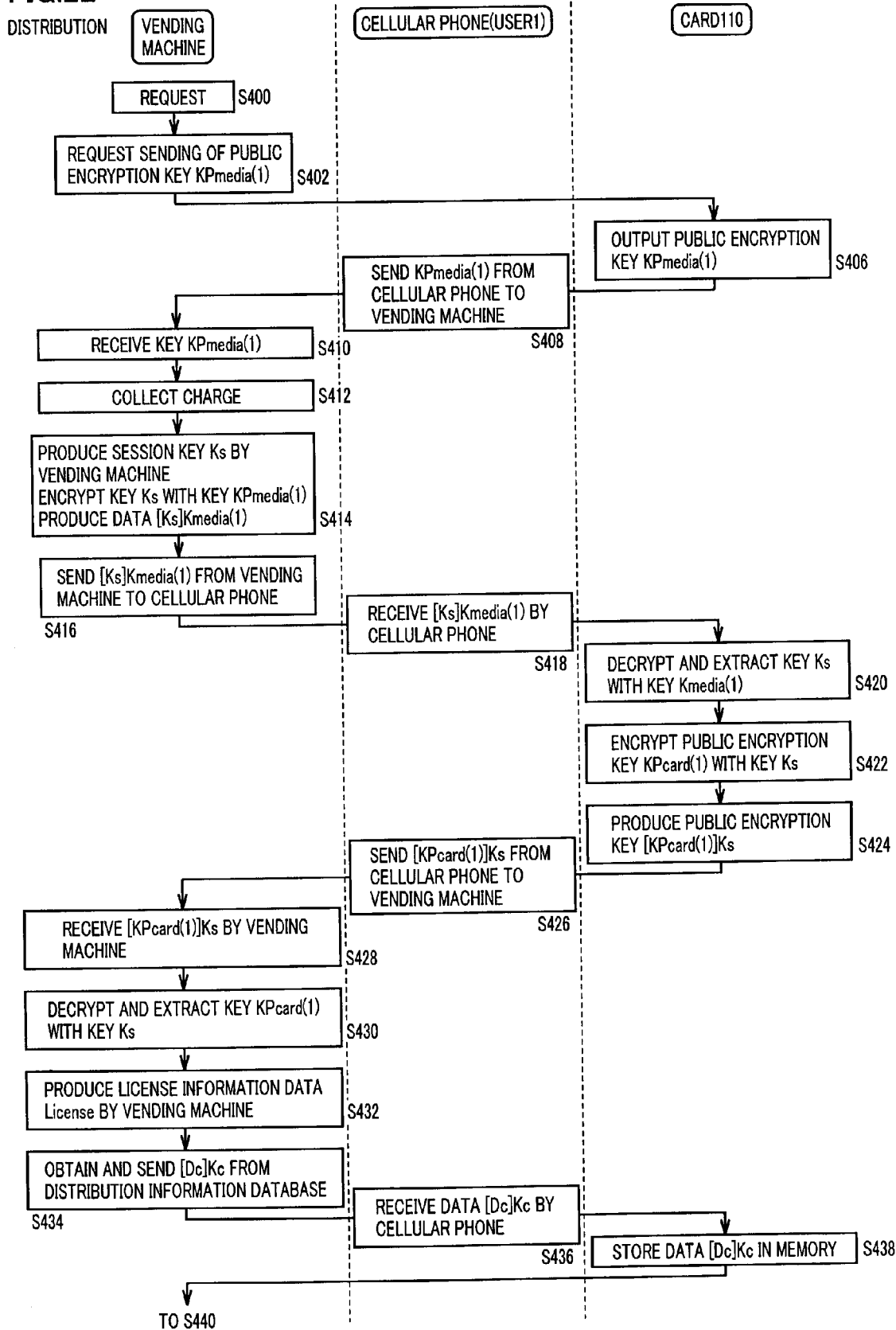
FIG. 22 is a first flowchart representing a distribution mode in the data distribution system shown in FIGS. 20 and 21.
Figure 23:
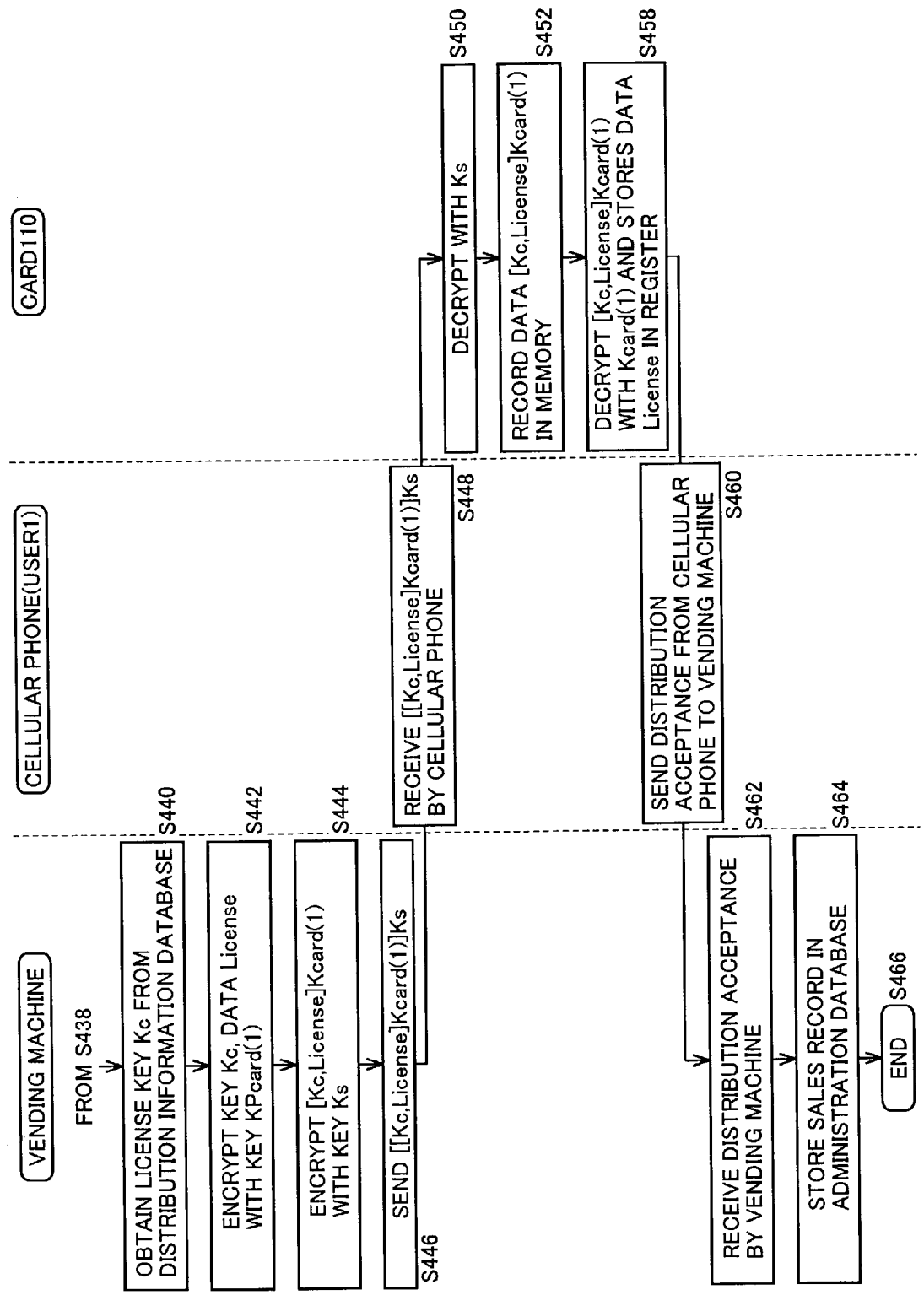
FIG. 23 is a second flowchart representing the distribution mode in the data distribution system shown in FIGS. 20 and 21.

FIGS. 22 and 23 are first and second flowcharts representing the distribution mode of the distribution system already described with reference to FIGS. 20 and 21.

FIGS. 22 and 23 represent operations, in which user 1 uses memory card 110, and receives the music data distributed from content data vending machine 2000.

First, user 1 applies a distribution request via keys, buttons or the like on keyboard 2004 of content data vending machine 2000 (step S400). Content data vending machine 2000 outputs a request for sending public encryption key KPmedia(1) to memory card 110 (step S402).

In memory card 110, KPmedia(1) holding unit 1401 outputs public encryption key KPmedia(1) to cellular phone 100 in response to the above request for sending public encryption key KPmedia(1) (step S406).

When cellular phone 100 sends public encryption key KPmedia(1) to content data vending machine 2000 (step S408), and content data vending machine 2000 receives public encryption key KPmedia(1) transferred from memory card 110 (step S410), display 2002 displays a message or the like requesting coin dropping, and the charge is collected (step S412). Then, session key generating unit 314 in content data vending machine 2000 produces session key Ks. In content data vending machine 2000, encryption processing unit 316 encrypts session key Ks with received public encryption key KPmedia(1) to produce encrypted session key [Ks]Kmedia(1) (step S414).

Then, content data vending machine 2000 applies encrypted session key [Ks]Kmedia(1) to data bus BS1, and outputs it from connector 2010 (step S516). Cellular phone 100 receives encrypted session key [Ks]Kmedia(1), and transfers it to memory card 110 (step S418).

In memory card 110, decryption processing unit 1404 decrypts encrypted session key [Ks]Kmedia(1), which is applied via interface 1200 to data bus BS3, with private decryption key Kmedia(1) to extract session key Ks in the decrypted form (step S420).

In the distribution mode, contact Pa is closed in selector switch 1408. Therefore, encryption processing unit 1406 then encrypts public encryption key KPcard(1) applied from KPcard(1) holding unit 1405 via contact Pa with session key Ks (step S422) to produce data [KPcard(1)]Ks (step S424).

Cellular phone 100 sends data [KPcard(1)]Ks encrypted by encryption processing unit 1406 to content data vending machine 2000 (step S426).

In content data vending machine 2000, data [KPcard(1)]Ks is received via connector 2010 (step S428), and decryption processing unit 318 decrypts data [KPcard(1)]Ks applied to data bus BS1 with session key Ks to extract public encryption key KPcard(1) in the decrypted form (step S430).

Then, distribution control unit 312 produces license information data License containing license ID data and others based on the data held in distribution information database 304 and others (step S432).

Content data vending machine 2000 obtains encrypted content data [Dc]Kc from distribution information database 304, and sends it to cellular phone 100 via connector 2010 (step S434).

When cellular phone 100 receives encrypted content data [Dc]Kc (step S436), memory card 110 stores encrypted content data [Dc]Kc thus received in memory 1412 as it is (step S438).

Content data vending machine 2000 obtains license key Kc from distribution information database 304 (step S440), and encryption processing unit 320 encrypts license key Kc and license information data License sent from distribution control unit 312 with public encryption key KPcard(1) applied from decryption processing unit 318 (step S442).

Encryption processing unit 322 receives data [Kc, License]Kcard(1) encrypted by encryption processing unit 320, and further encrypts it with session key Ks to apply data [[Kc, License]Kcard(1)]Ks to data bus BS1 so that data [[Kc, License]Kcard(1)]Ks thus encrypted by encryption processing unit 322 is sent to memory card 110 (step S446).

When cellular phone 100 receives data [[Kc, License]Kcard(1)]Ks (step S448), decryption processing unit 1410 in memory card 110 decrypts it with session key Ks to extract and store data [Kc, License]Kcard(1) in memory 1412 (step S452).

In memory card 110, decryption processing unit 1416 controlled by controller 1420 decrypts data [Kc, License]Kcard(1) stored in memory 1412, and stores decrypted license information data License in register 1500 (step S458).

By the operations described above, the memory card can receive the distributed data after the memory card itself sends public encryption key KPmedia(1) to the side sending session key Ks (i.e., content data vending machine 2000), and can enter the state, in which the music can be produced from the encrypted content data stored in memory card 110.

Further, memory card 110 sends a notification of the distribution acceptance to content data vending machine 2000 via cellular phone 100 (step S460). When content data vending machine 2000 receives this notification of distribution acceptance (step S462), a sales record is sent to the administration server (step S464), and the processing ends (step S466).

Owing to the above structure, the user can receive the encrypted and distributed music data and others more easily.

Modification of the Third Embodiment

In the data distribution system of the third embodiment, memory card 110 is configured to receive the encrypted content data distributed by content data vending machine 2000 via cellular phone 100.

In the structure of content data vending machine 2000 shown in FIG. 21, however, connector 2010 may be replaced with a memory slot for interface to memory card 110. Thereby, the data can be directly transmitted between memory card 110 and content data vending machine 2000 without interposing cellular phone 100 therebetween.

Figure 24:
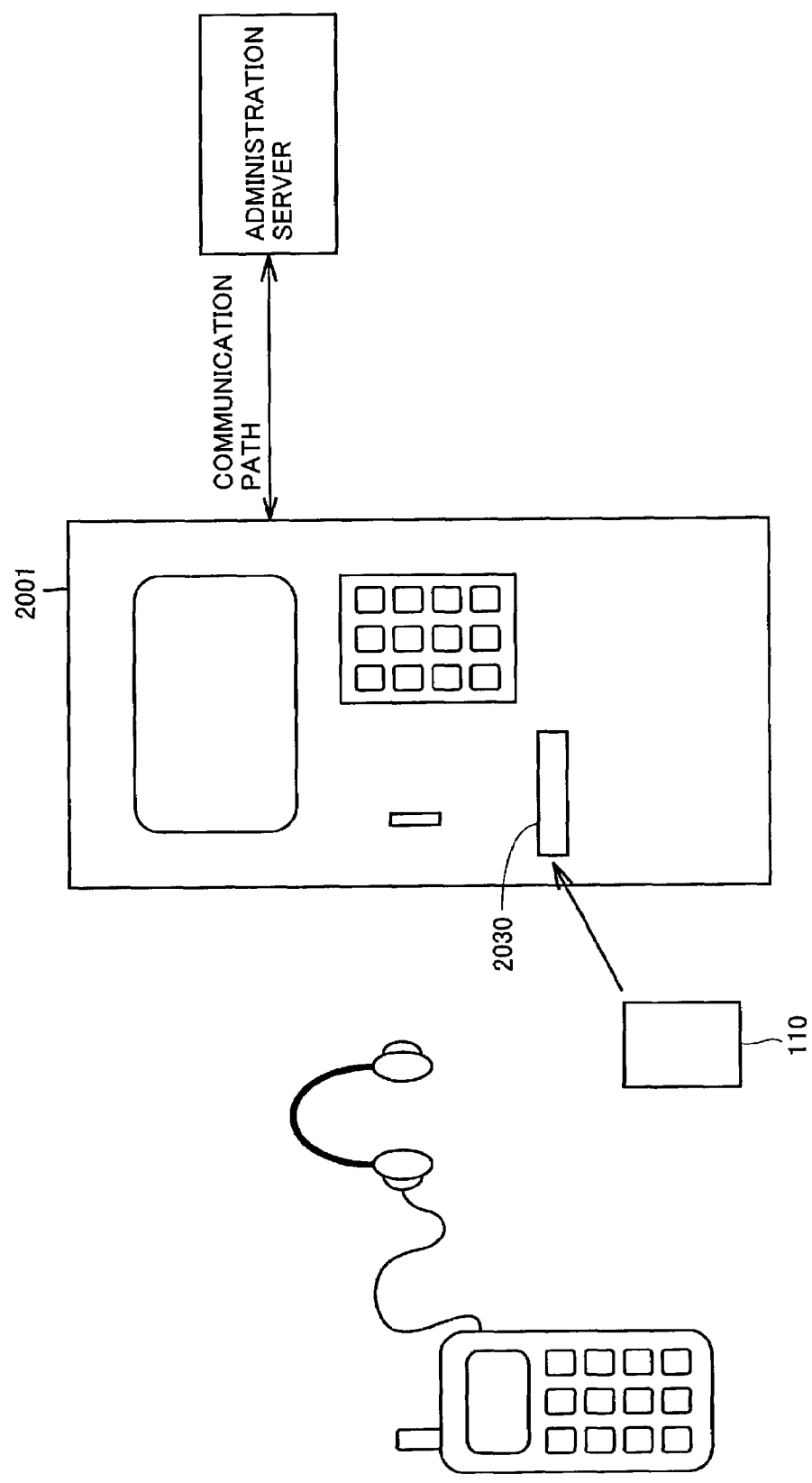
FIG. 24 conceptually shows a structure of a content data vending machine 2001 in a modification of the third embodiment.

FIG. 24 conceptually shows a structure of content data vending machine of such a modification of the third embodiment. Content data vending machine 2000 of this modification differs from content data vending machine 2000 of the third embodiment shown in FIG. 20 in that a card slot 2030 for receiving a memory card is employed instead of external connector 2010, and the card in card slot 2030 can transmit data to and from data bus BS1 via interface portion 2012.

Figure 25:
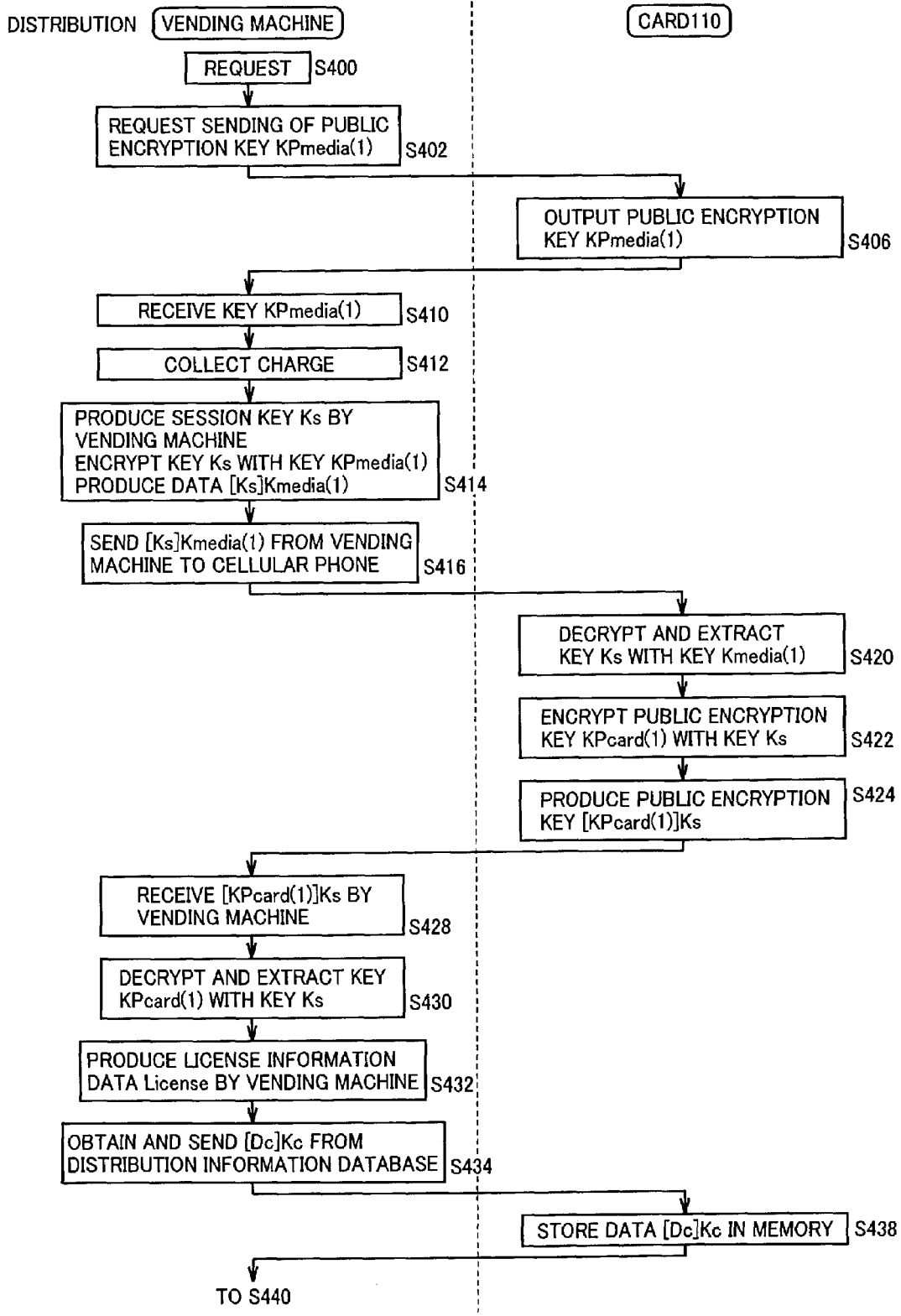
FIG. 25 is a first flowchart representing a distribution mode of a data distribution system in the modification of the third embodiment.
Figure 26:
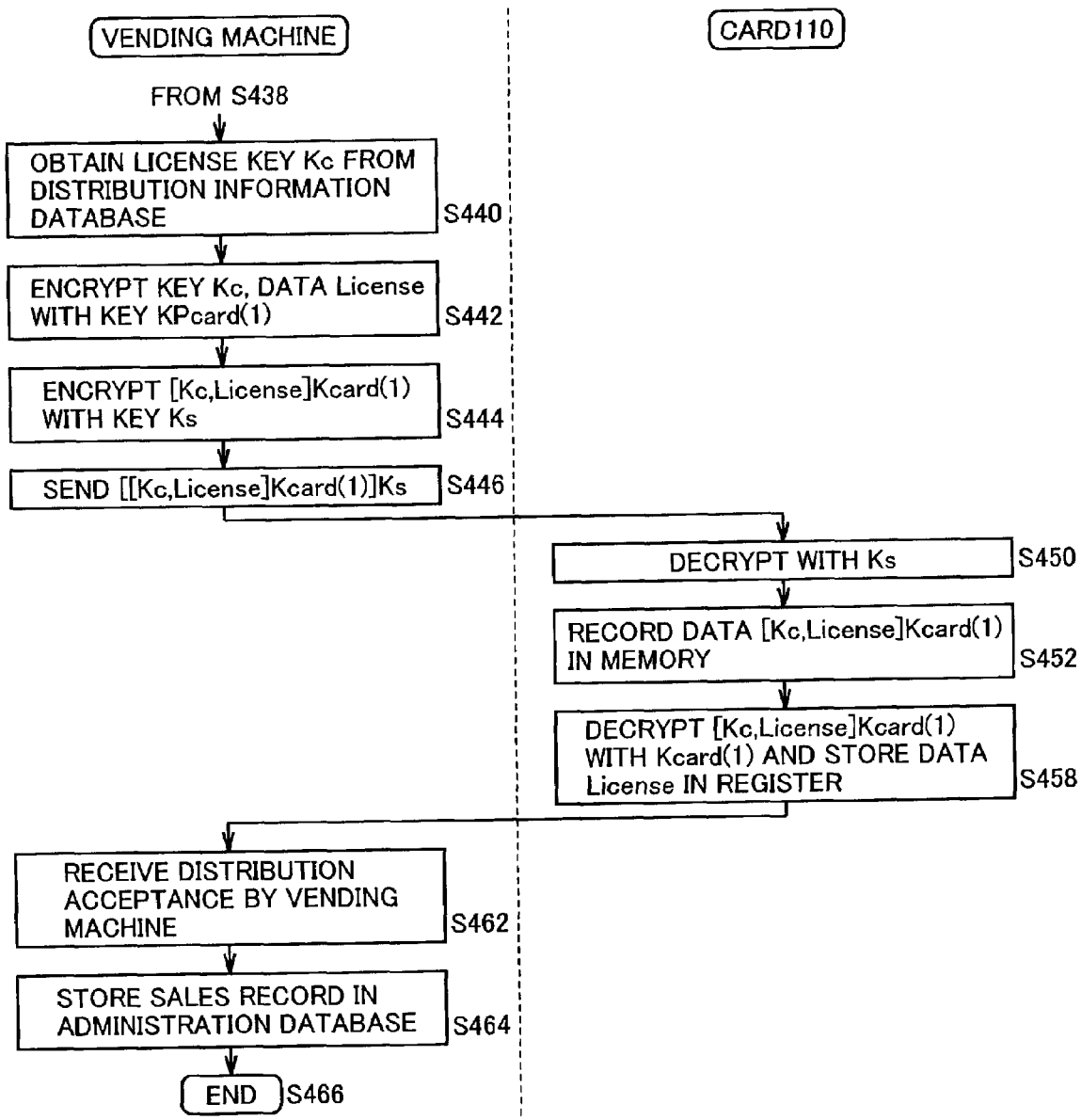
FIG. 26 is a second flowchart representing the distribution mode in the data distribution system in the modification of the third embodiment.

FIGS. 25 and 26 are first and second flowcharts representing the distribution mode in the data distribution system of the modification of the third embodiment.

The processing in the distribution mode shown in FIGS. 25 and 26 are the same as that in the distribution mode of the third embodiment shown in FIGS. 22 and 23 except for that data transmission is performed between memory card 110 and content data vending machine 2001 without interposing cellular phone 100. Therefore, the same steps and operations bear the same reference characters, and description thereof is not repeated.

Owing to the above structures and operations, the user can receive more easily the encrypted music data and others distributed thereto.

Further, the memory card can operate independently to receive and store the distributed content data in the encrypted form. This increases a range, from which a circuit or a unit for content data reproduction is selected, and therefore further improves the convenience of users.

Fourth Embodiment

Figure 27:
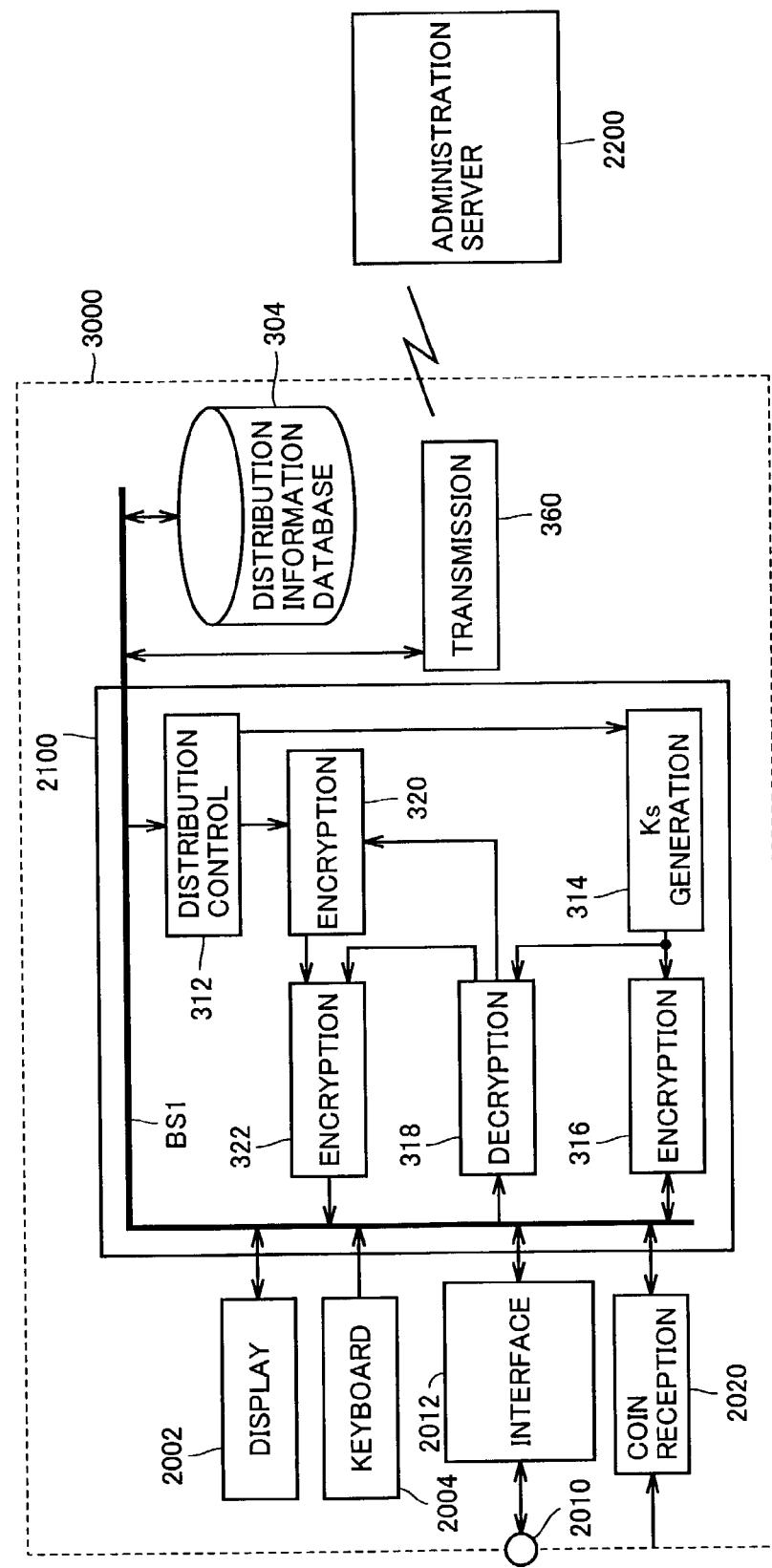
FIG. 27 is a schematic block diagram showing a structure of a content data vending machine 3000 in a fourth embodiment.

FIG. 27 is a schematic block diagram showing a structure of a content data vending machine 3000 of a fourth embodiment. The structure of content data vending machine 3000 of the fourth embodiment differs from that of content data vending machine 2000 shown in FIG. 21 in that memory card 120 of the second embodiment can be used, and cellular phone 101 is used as the terminal. Corresponding to this, encryption processing unit 322 in data processing unit 2100 further encrypts the output of encryption processing unit 320 not based on session key Ks applied from Ks generating unit 314 but based on the session key (e.g., session key Ks1), which is sent from the memory card attached to the cellular phone after being encrypted with session key Ks, and is decrypted by decryption processing unit 318, and applies the output thus encrypted to interface unit 2012 and connector 2010 via data bus BS1.

Structures of content data vending machine 3000 other than the above are substantially the same as those of content data vending machine 2000 of the third embodiment shown in FIG. 21. The same portions bear the same reference numbers, and description thereof is not repeated.

Since cellular phone 101 and memory card 110 have substantially the same structure as those in the second embodiment, description thereof is not repeated.

Figure 28:
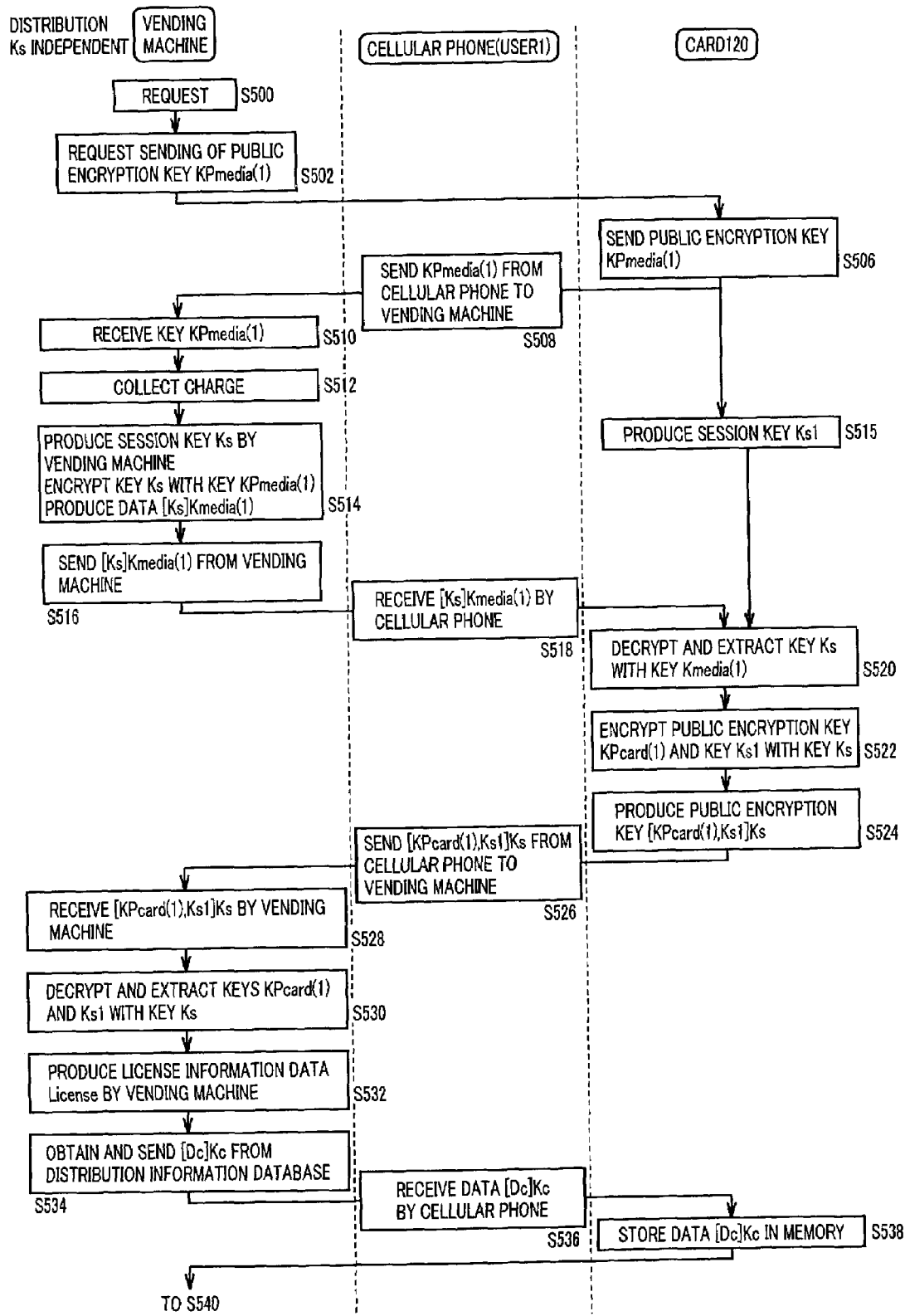
FIG. 28 is a first flowchart showing a distribution mode in the data distribution system shown in FIG. 27.
Figure 29:
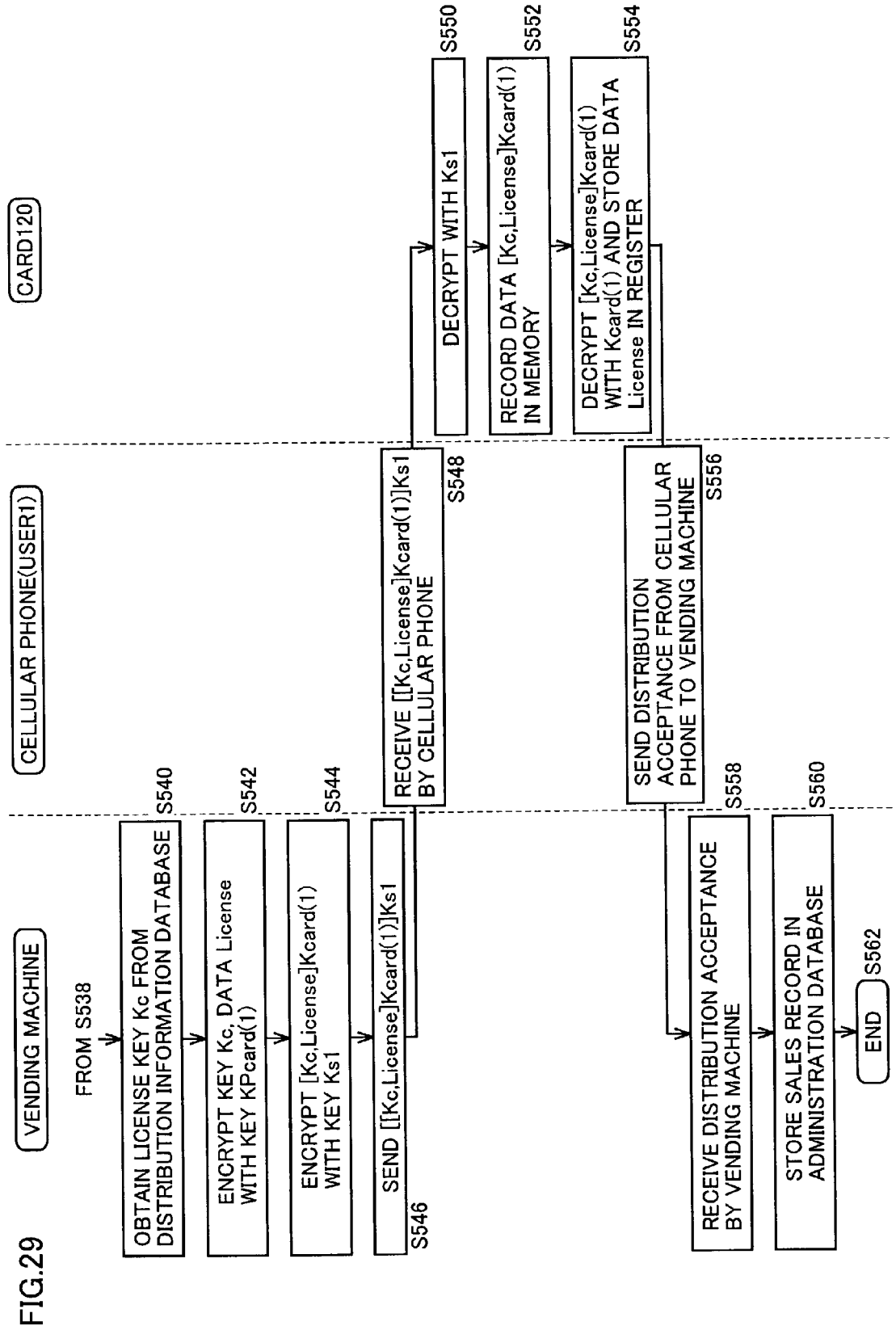
FIG. 29 is a second flowchart showing a distribution mode in the data distribution system shown in FIG. 27.

FIGS. 28 and 29 are first and second flowcharts representing the distribution mode of the data distribution system shown in FIG. 27.

FIGS. 28 and 29 represent operations, in which user 1 uses memory card 120 for receiving music data distributed from content data vending machine 3000.

First, the user enters the distribution request, e.g., by operating keys or buttons on keyboard 2004 of content data vending machine 3000 (step S500). Content data vending machine 3000 outputs a request for sending public encryption key KPmedia(1) to memory card 110 (step S502).

In memory card 120, KPmedia(1) holding unit 1401 sends public encryption key KPmedia(1) to content data vending machine 3000 in response to this request for sending public encryption key KPmedia(1) (step S506). Further, in memory card 120, Ks1 generating unit 1432 produces session key Ks1 (step S515).

Cellular phone 101 sends public encryption key KPmedia (1) to content data vending machine 3000 (step S508), and content data vending machine 3000 receives public encryption key KPmedia(1) transferred from memory card 120 (step S510). Thereby, display 2002 displays a message or the like requesting coin dropping, and the charge is collected (step S512). Then, session key generating unit 314 in content data vending machine 3000 produces session key Ks. In content data vending machine 3000, encryption processing unit 316 encrypts session key Ks with received public encryption key KPmedia(1) to produce encrypted session key [Ks]Kmedia(1) (step S514).

Then, content data vending machine 2000 applies encrypted session key [Ks]Kmedia(1) to data bus BS1, and outputs it from connector 2010 (step S516). Cellular phone 100 receives encrypted session key [Ks]Kmedia(1), and transfers it to memory card 110 (step S418).

In memory card 120, decryption processing unit 1404 decrypts encrypted session key [Ks]Kmedia(1), which is applied via interface 1200 to data bus BS3, with private decryption key Kmedia(1) to extract session key Ks in the decrypted form (step S520).

Encryption processing unit 1406 then encrypts public encryption key KPcard(1) applied from KPcard(1) holding unit 1405 and session key Ks1 applied from Ks1 generating unit 1432 with session key Ks (step S522) to produce data [KPcard(1), Ks1]Ks (step S524).

Cellular phone 101 sends data [KPcard(1), Ks1]Ks encrypted by encryption processing unit 1406 to content data vending machine 3000 (step S526).

In content data vending machine 3000, data [KPcard(1), Ks1]Ks is received via connector 2010 (step S528), and decryption processing unit 318 decrypts data [KPcard(1), Ks1]Ks applied to data bus BS1 with session key Ks to extract public encryption key KPcard(1) and session key Ks1 in the decrypted form (step S530).

Then, distribution control unit 312 produces license information data License containing license ID data and others based on the data held in distribution information database 304 and others (step S532).

Content data vending machine 3000 obtains encrypted content data [Dc]Kc from distribution information database 304, and sends it to cellular phone 101 via connector 2010 (step S534).

When cellular phone 101 receives encrypted content data [Dc]Kc (step S536), memory card 120 stores encrypted content data [Dc]Kc thus received in memory 1412 as it is (step S538).

Content data vending machine 3000 obtains license key Kc from distribution information database 304 (step S540), and encryption processing unit 320 encrypts license key Kc and license information data License sent from distribution control unit 312 with public encryption key KPcard(1) applied from decryption processing unit 318 (step S542).

Encryption processing unit 322 receives data [Kc, License]Kcard(1) encrypted by encryption processing unit 320, and further encrypts it with session key Ks1 to apply data [[Kc, License]Kcard(1)]Ks1 to data bus BS1 so that data [[Kc, License]Kcard(1)]Ks1 thus encrypted by encryption processing unit 322 is sent to cellular phone 101 (step S546).

When cellular phone 101 receives data [[Kc, License] Kcard(1)]Ks1 (step S548), decryption processing unit 1410 in memory card 120 decrypts it with session key Ks1 to extract and store data [Kc, License]Kcard(1) in memory 1412 (step S552).

The processing after the above is substantially the same as that in the third embodiment shown in FIGS. 22 and 23, and therefore description thereof is not repeated.

Owing to the above structure, the user can receive the encrypted and distributed content data such as music data more easily.

Further, the encryption key of data transmitted on the data bus and others is unique to every session and every instrument or device. This can further improve the security of data transmission.

Modification of the Fourth Embodiment

In the data distribution system of the fourth embodiment, memory card 120 is configured to receive the encrypted content data distributed by content data vending machine 3000 via cellular phone 101.

In the structure of content data vending machine 3000 shown in FIG. 27, however, connector 2010 may be replaced with a memory slot for interface to memory card 120, as is done in the modification of the third embodiment. Thereby, the data can be directly transmitted between memory card 120 and content data vending machine 3000 without interposing cellular phone 101 therebetween.

A structure of content data vending machine 3001 of such a modification of the fourth embodiment is substantially the same as the structure of the modification of the third embodiment shown in FIG. 24 except for the structure of data processing unit 2100.

More specifically, the structure of content data vending machine 3001 of the modification of the fourth embodiment differs from the structure of content data vending machine 3000 of the fourth embodiment shown in FIG. 27 in that card slot 2030 for receiving a memory card is employed instead of external connector 2010, and the card in card slot 2030 can transmit data to and from data bus BS1 via interface portion 2012.

Figure 30:
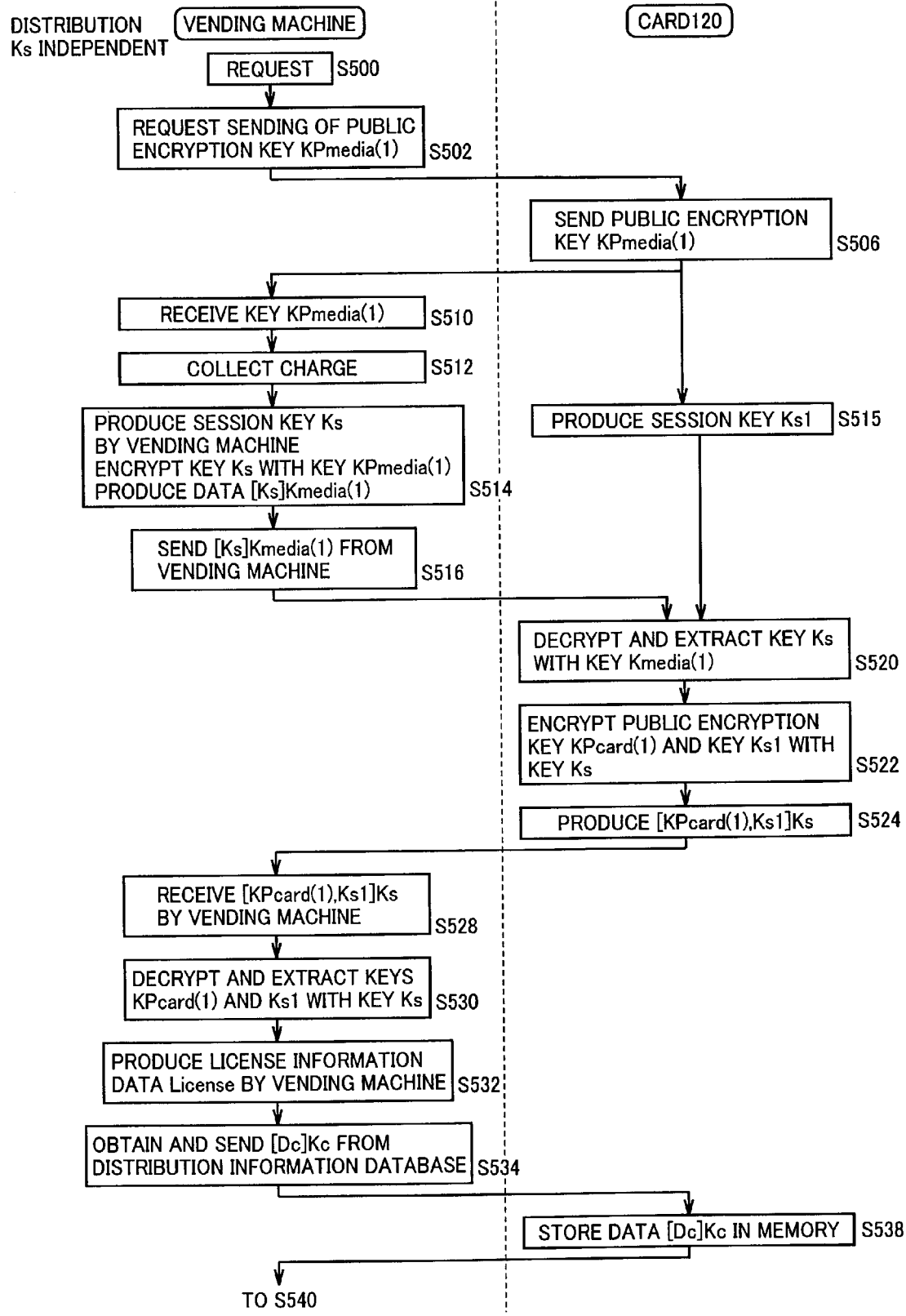
FIG. 30 is a first flowchart showing a distribution mode of a data distribution system in a modification of the fourth embodiment.
Figure 31:
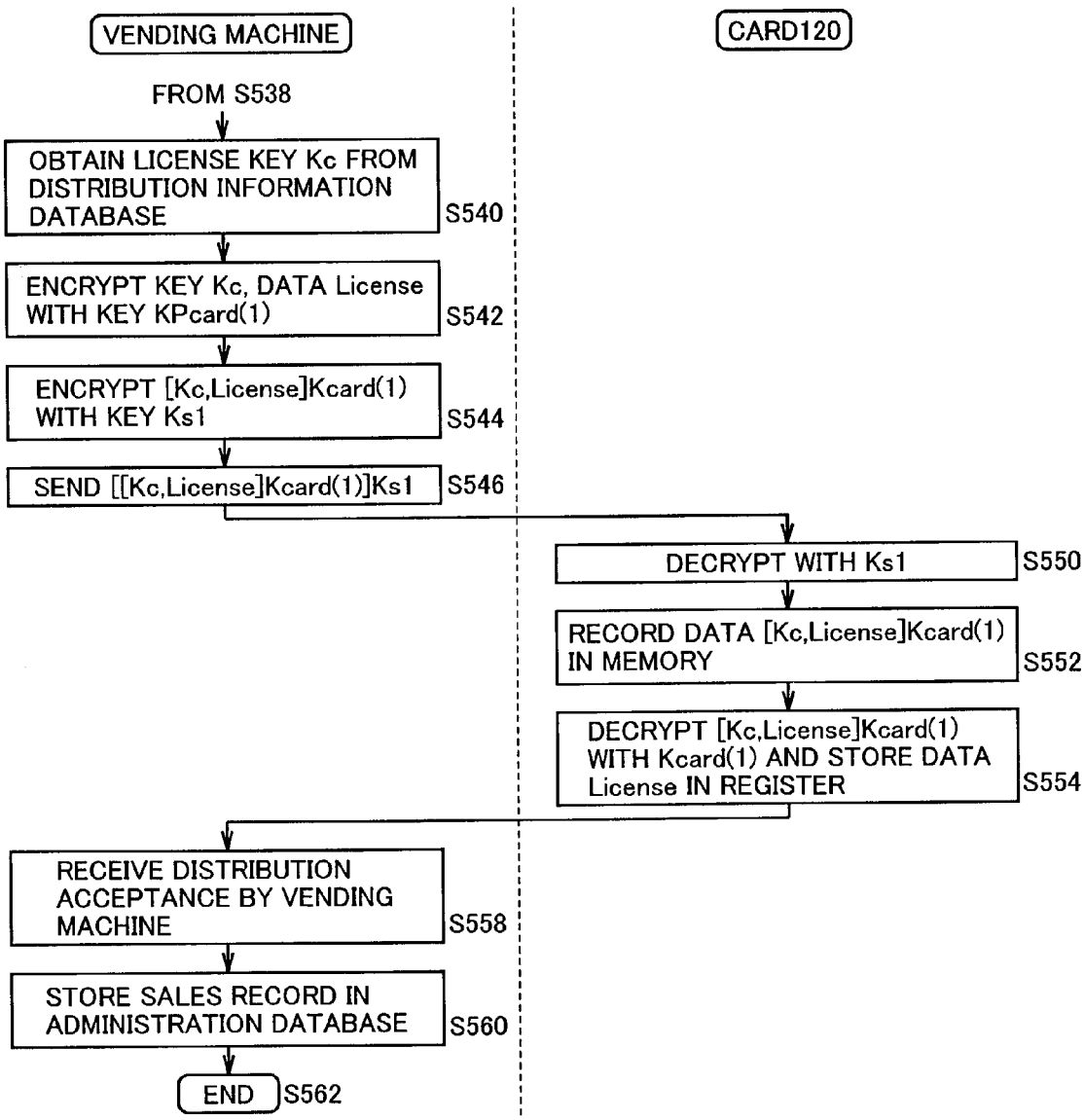
FIG. 31 is a second flowchart showing a distribution mode of the data distribution system in the modification of the fourth embodiment.

FIGS. 30 and 31 are first and second flowcharts representing the distribution mode in the data distribution system of the modification of the fourth embodiment.

The processing in the distribution mode shown in FIGS. 28 and 29 are the same as that in the distribution mode of the fourth embodiment shown in FIGS. 28 and 29 except for that data transmission is performed between memory card 120 and content data vending machine 3001. Therefore, the same steps and operations bear the same reference characters, and description thereof is not repeated.

Owing to the above structures and operations, the user can receive more easily the encrypted music data and others distributed thereto.

Further, the memory card can operate independently to receive and store the distributed content data in the encrypted form. This increases a range, from which a circuit or a unit for content data reproduction is selected, and therefore further improves the convenience of users.

Fifth Embodiment

A distribution server 12, a cellular phone 105 and a memory card 140 in a fifth embodiment differs from distribution server 11, cellular phone 101 and memory card 120 of the second embodiment in the following points.

Cellular phone 105 of the fifth embodiment has structures for recording and holding public encryption key KPp and certificate data Crtf, which are assigned to this cellular phone 105, in a form encrypted with a public decryption key (public authentication key) KPmaster when this cellular phone 105 is registered, in advance, in an administration department of an authentication mechanism or the like in the distribution system.

A memory card 140 of the fifth embodiment likewise has structures for recording and holding public encryption key KPmedia and certificate data Crtf, which are assigned to this memory card, in a form encrypted with public decryption key (public authentication key) KPmaster when this memory card 140 is registered, in advance, in the administration department of the authentication mechanism or the like in the distribution system.

Memory card 140 and distribution server 12 in the fifth embodiment have structures for recording and holding public decryption key (public authentication key) KPmaster. Public decryption key (public authentication key) KPmaster is common to the system, and is used by all the devices performing data output operations in the system, and more specifically is used in the operations of transmitting the session keys for certificating the fact the device is authorized to perform mutual transmission of data and for obtaining the encryption key used for sending the session key to the other party.

Structures of cellular phone 105, memory card 140 and distribution server 12 of the fifth embodiment will now be described in greater detail.

Figure 32:
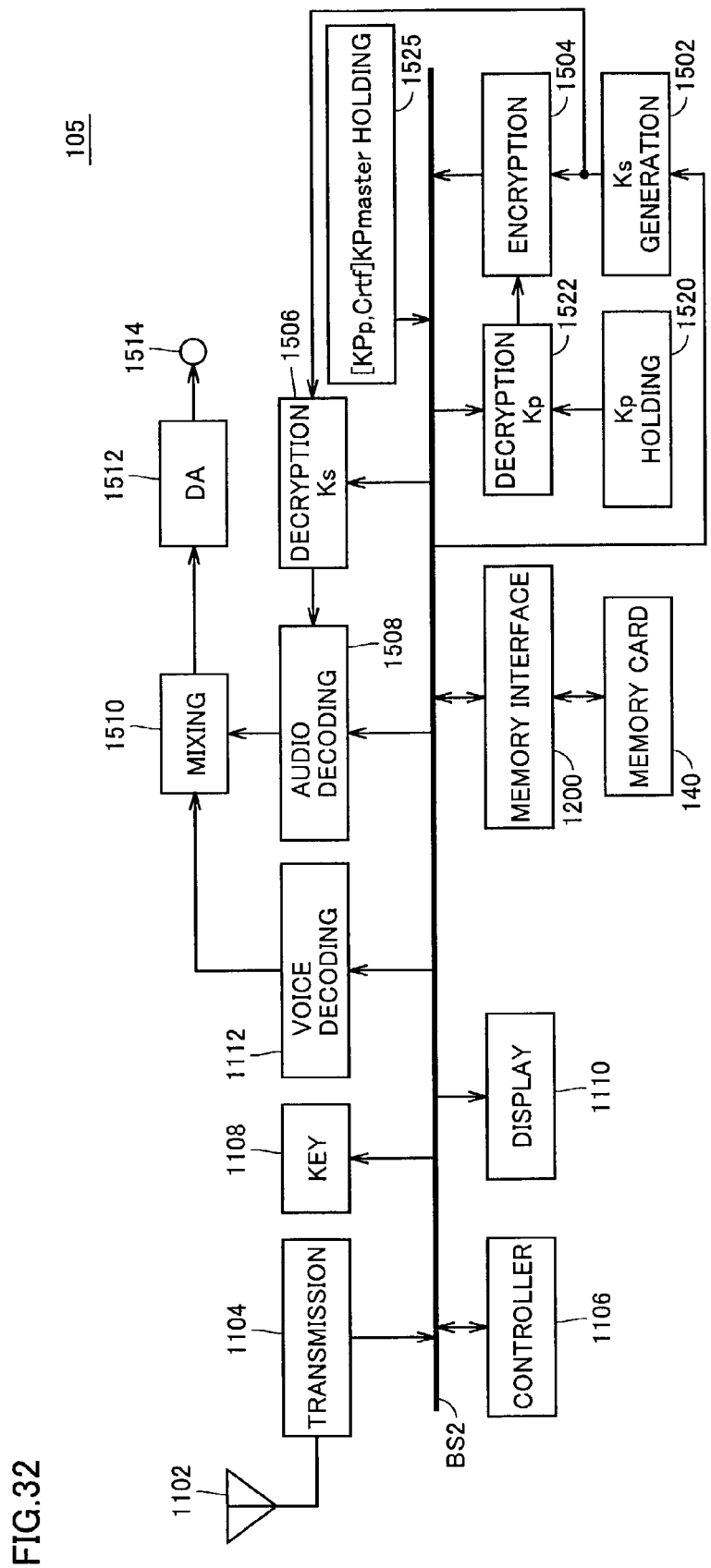
FIG. 32 is a schematic block diagram showing a structure of a cellular phone 105 in a fifth embodiment.

FIG. 32 is a schematic block diagram showing the structure of cellular phone 105 in the fifth embodiment.

Cellular phone 105 differs from cellular phone 101 of the second embodiment shown in FIG. 12 in that a [KPp, Crtf]KPmaster holding unit 1525 for holding public encryption key KPp and certificate data Crtf, which are encrypted with public decryption key (public authentication key) KPmaster, is used instead of KPp holding unit 1524.

Structures of cellular phone 105 other than the above are substantially the same as those of cellular phone 101 of the second embodiment shown in FIG. 12. The same portions bear the same reference numbers, and description thereof is not repeated.

Figure 33:
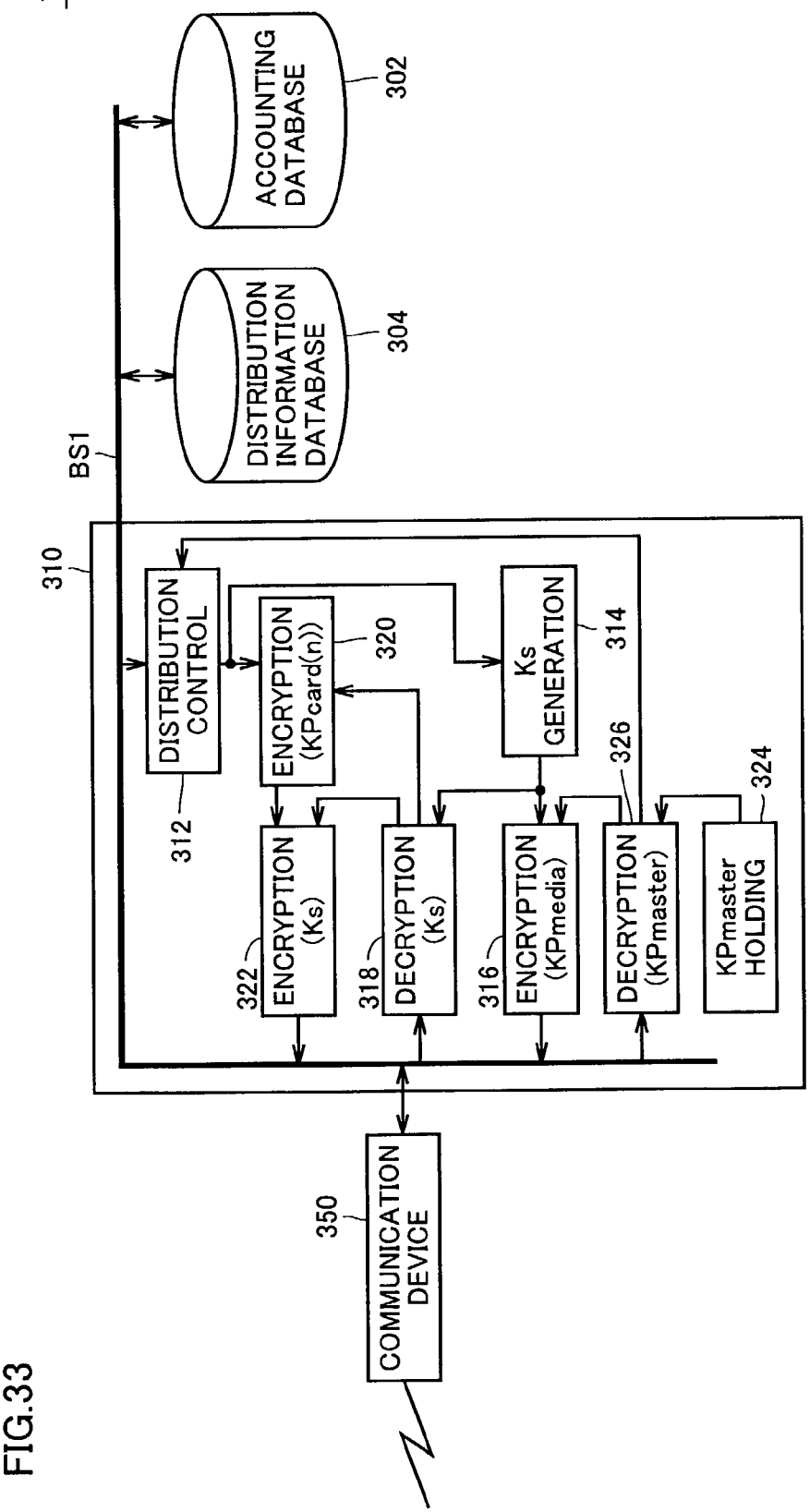
FIG. 33 is a schematic block diagram showing a structure of a distribution server 12 corresponding to a memory card 140 in the fifth embodiment.

FIG. 33 is a schematic block diagram showing a structure of distribution server 12 corresponding to memory card 140 of the fifth embodiment. Distribution server 12 in FIG. 33 differs from distribution server 11 of the second embodiment shown in FIG. 11 in that data processing unit 310 further includes a KPmaster holding unit 324 for holding public decryption key KPmaster, and a decryption processing unit 326 for decrypting the data, which is applied over the communication network to data bus BS1 via communication device 350, based on public decryption key KPmaster output from KPmaster holding unit 324. Encryption processing unit 316 encrypts session key Ks generated by Ks generating unit 314 with public encryption key KPmedia extracted by the decrypting processing of decryption processing unit 326. Distribution control unit 312 determines whether the memory card and the cellular phone requesting for the distribution are regular or not, based on certificate data Crtf extracted by decrypting processing of decryption processing unit 326.

Structures of distribution server 12 other than the above are substantially the same as those shown in FIG. 12. The same portions bear the same reference numbers, and description thereof is not repeated.

Figure 34:
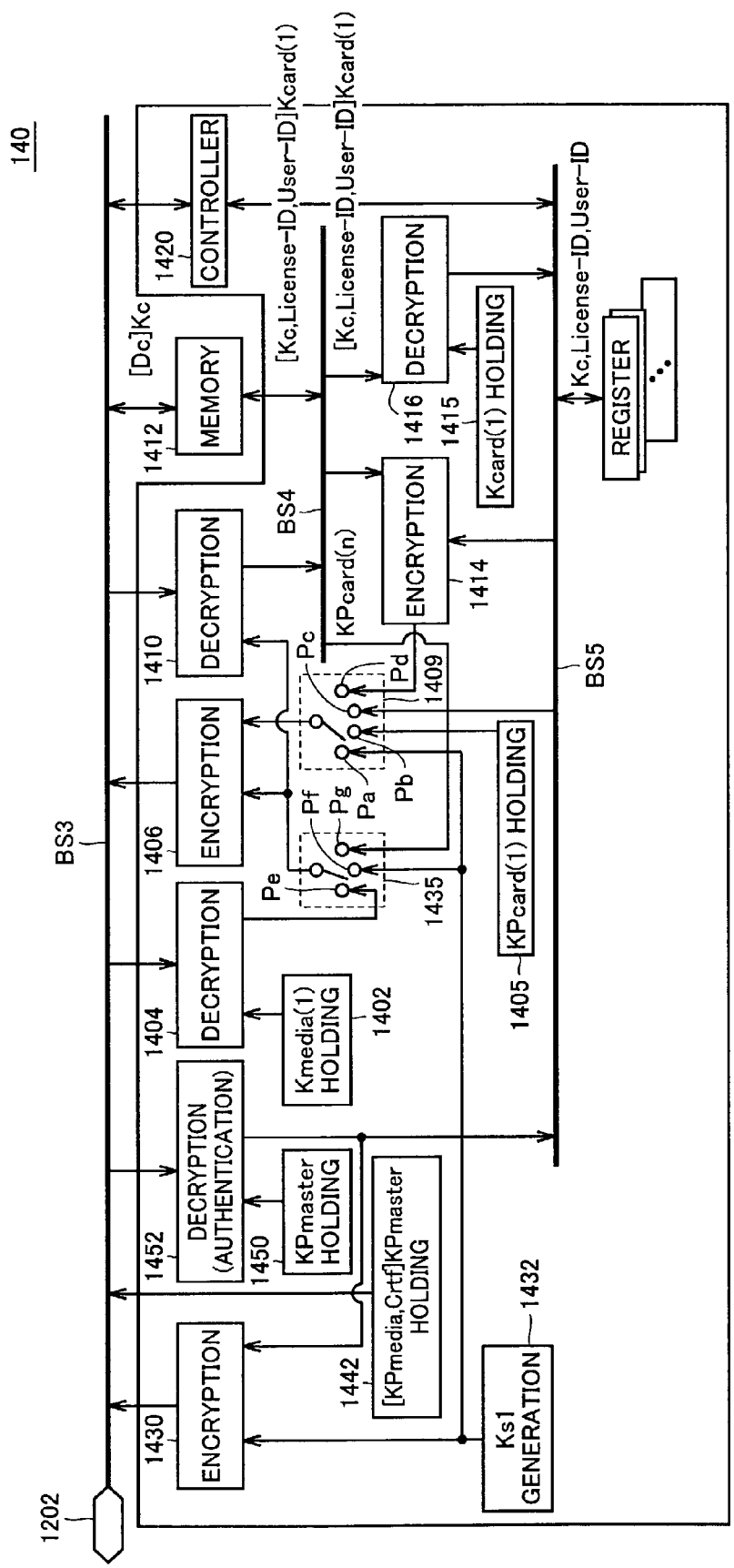
FIG. 34 is a schematic block diagram showing a structure of memory card 140 in the fifth embodiment.

FIG. 34 is a schematic block diagram showing a structure of a memory card 140 of the fifth embodiment, and corresponds to FIG. 13 showing the second embodiment.

The structure of memory card 140 of the fifth embodiment differs from the structure of memory card 120 of the second embodiment in that memory card 140 includes a [KPmedia, Crtf]KPmaster holding unit 1442 for holding public encryption key KPmedia and certificate data Crtf in a form encrypted with public decryption key (public authentication key) KPmaster. Further, selector switch 1436 is not employed, and the output of [KPmedia, Crtf]KPmaster holding unit 1442 is directly applied to data bus BS3.

Additionally, memory card 140 includes KPmaster holding unit 1450 for recording and holding public decryption key KPmaster, and a decryption processing unit 1452 for decrypting data on data bus BS3 based on public decryption key KPmaster output from KPmaster holding unit 1450.

Public encryption key KPmedia, which is decrypted and extracted by decryption processing unit 1452, is applied to encryption processing unit 1430. Certificate data Crtf, which is likewise decrypted and extracted by decryption processing unit 1452, is applied to controller 1420 via data bus BS5.

Structures of memory card 140 other than the above are substantially the same as those of memory card 120 shown in FIG. 13. The same portions bear the same reference numbers, and description thereof is not repeated.

[Distribution Mode]

Figure 35:
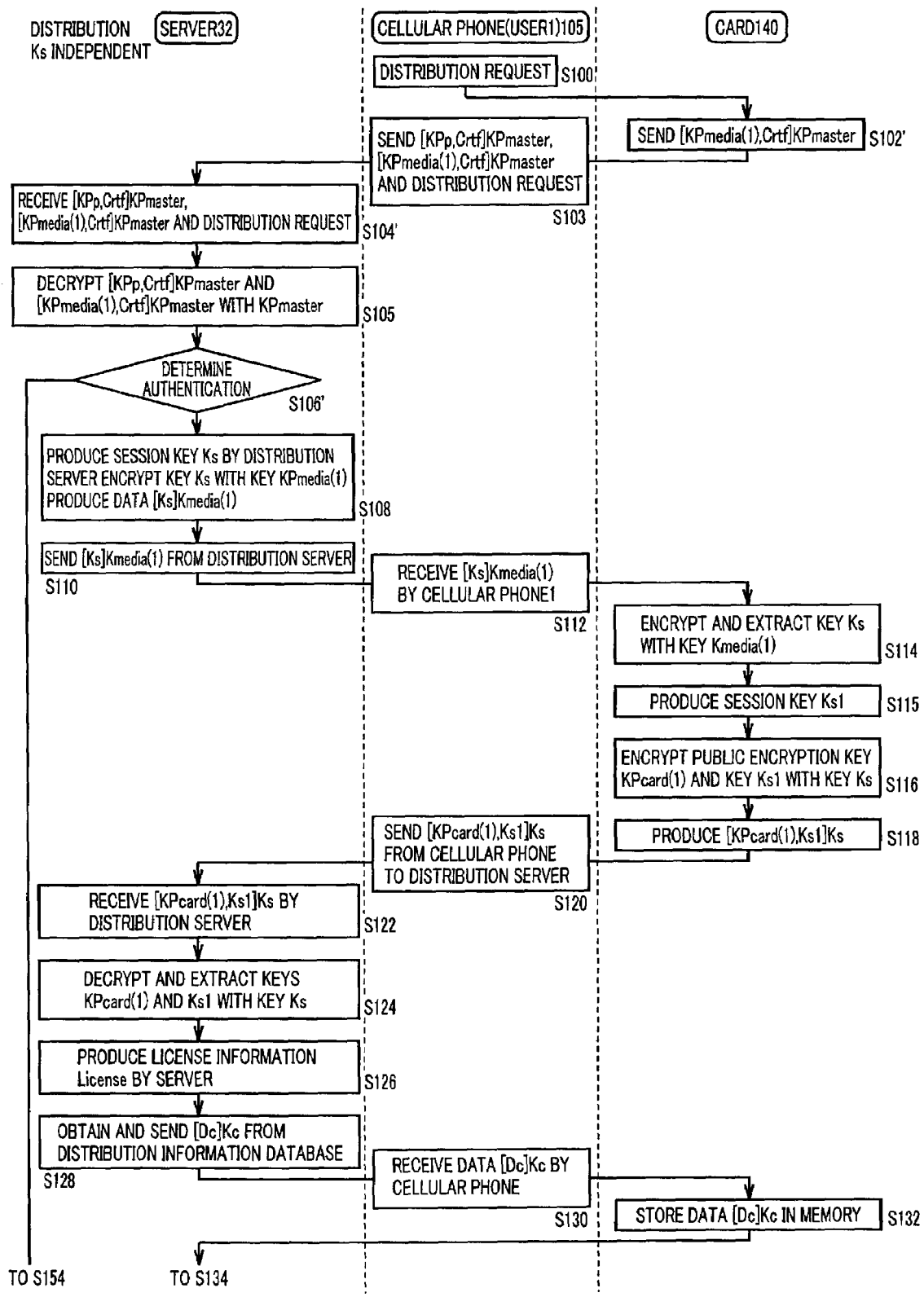
FIG. 35 is a first flowchart representing a distribution mode using memory card 140.
Figure 36:
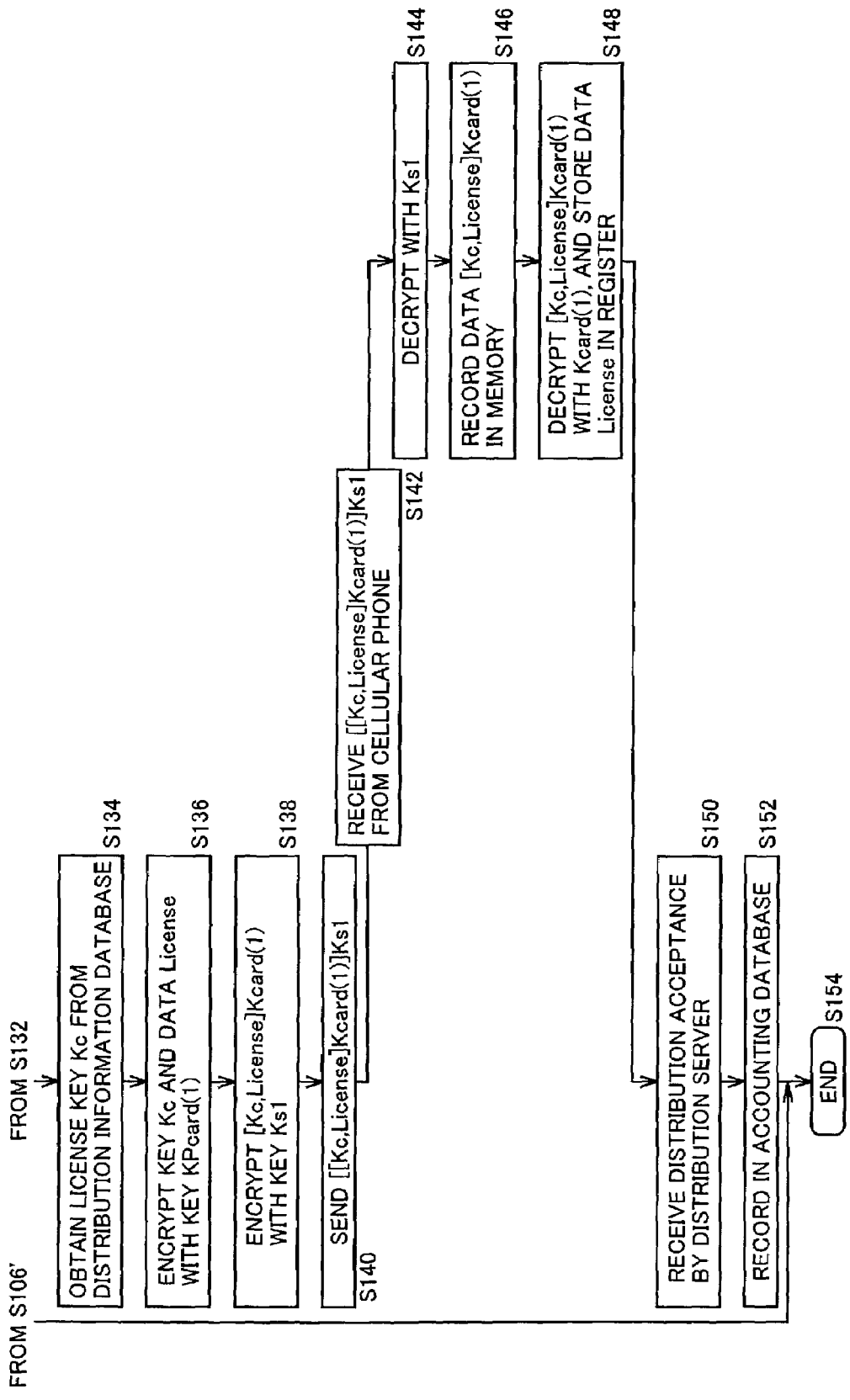
FIG. 36 is a second flowchart representing a distribution mode using memory card 140.

FIGS. 35 and 36 are first and second flowcharts representing the distribution mode using memory card 140 shown in FIG. 34, respectively.

In the operations shown in FIGS. 35 and 36, user 1 uses cellular phone 105 provided with memory card 140 for receiving the content data distributed from distribution server 12.

First, user 1 requests the distribution via cellular phone 105, e.g., by operating keys or buttons on touch key unit 1108 (step S100).

The public encryption key held in memory card 140 is represented as public encryption key KPmedia(1) for distinguishing it from public encryption key KPmedia in another memory card. Further, certificate data in memory card 140 and cellular phone 105 are indicated by Crtf(1) and Crtf(p), respectively.

In memory card 140, [KPmedia, Crtf]KPmaster holding unit 1442 responds to this distribution request by outputting data [KPmedia(1), Crtf(1)]KPmaster prepared by encrypting public encryption key KPmedia(1) and certificate data Crtf (1) (step S102').

Cellular phone 105 outputs data [KPmedia(1), Crtf(1)] KPmaster applied from memory card 140 as well as data [KPp, Crtf(p)]KPmaster applied from [KPp, Crtf]KPmaster holding unit 1525 and the distribution request to distribution server 12 (step S103).

When distribution server 12 receives the distribution request as well as data [KPp, Crtf(p)]KPmaster and [KPmedia(1), Crtf(1)]KPmaster transferred from memory card 140 (step S104'), decryption processing unit 326 decrypts them with public decryption key KPmaster to extract certificate data Crtf(1) and Crtf(p) as well as public encryption key KPp and public encryption key KPmedia(1) (step S105).

Based on certificate data Crtf(1) and Crtf(p) thus decrypted, distribution control unit 312 makes an inquiry to distribution server 12. When both certificate data Crtf(1) and Crtf(p) of the memory card and the cellular phone are regular certificate data (step S106'), the processing moves to the next step. When at least one of them is not regular data, the processing ends (step S154).

When it is determined from the inquiry that the data is regular certificate data, distribution server 12 produces session key Ks from session key generating unit 314. Further, encryption processing unit 316 in distribution server 12 encrypts session key Ks to produce encrypted session key [Ks]Kmedia(1) (step S108).

Then, distribution server 12 applies encrypted session key [Ks]Kmedia(1) to data bus BS1. Communication device 350 sends encrypted session key [Ks]Kmedia(1), which is applied from encryption processing unit 316, over the communication network to memory card 140 of cellular phone 105 (step S110).

When cellular phone 105 receives encrypted session key [Ks]Kmedia(1) (step S112), decryption processing unit 1404 in memory card 140 decrypts the data applied to data bus BS3 via memory interface 1200 with private decryption key Kmedia(1) so that session key Ks is decrypted and extracted (step S114).

In memory card 1400, Ks1 generating unit 1432 produces session key Ks1 (step S115).

In the distribution mode, since selector switch 1409 selects the state for successively closing contacts Pa and Pb, encryption processing unit 1406 encrypts session key Ks1 applied from session key generating unit 1432 via contact Pa and public encryption key KPcard(1) (public encryption key for memory card 140) applied from KPcard(1) holding unit 1405 via contact Pb with session key Ks (step S116) to produce data [KPcard(1), Ks1]Ks (step S118).

Cellular phone 105 sends data [KPcard(1), Ks1]Ks encrypted by encryption processing unit 1406 to distribution server 12 (step S120).

In distribution server 12, communication device 350 receives data [KPcard(1), Ks1]Ks (step S122), and decryption processing unit 318 decrypts data [KPcard(1), Ks1]Ks applied to data bus BS1 with session key Ks to decrypt and extract public encryption key KPcard(1) and session key Ks1 (step S124).

Then, distribution control unit 312 produces license information data License including license ID data and others based on the data held in distribution information database 304 and others (step S126).

Distribution server 12 obtains encrypted content data [Dc]Kc from distribution information database 304, and sends it to memory card via communication device 350 (step S128).

When cellular phone 105 receives encrypted content data [Dc]Kc (step S130), memory card 140 stores encrypted content data [Dc]Kc thus received in memory card 1412 as it is (step S132).

Distribution server 12 obtains license key Kc from distribution information database 304 (step S134), and encryption processing unit 320 encrypts license key Kc and license information data License applied from distribution control unit 312 with public encryption key KPcard(1) applied from decryption processing unit 318 (step S136).

Encryption processing unit 322 receives data [Kc, License]Kcard(1) encrypted by encryption processing unit 320, and encrypts it with session key Ks1, which is applied from memory card 140, for outputting the further encrypted data to data bus BS1. Communication device 350 sends data [[Kc, License]Kcard(1)]Ks1 encrypted by encryption processing unit 322 to memory card 140.

When cellular phone 105 receives data [[Kc, License] Kcard(1)]Ks1 (step S142), decryption processing unit 1410 in memory card 140 decrypts it with session key Ks1 applied from Ks1 generating unit 1432 via contact Pf so that data [Kc, License]Kcard(1) is extracted and stored in memory 1412 (step S146).

In memory card 140, decryption processing unit 1416 decrypts data [Kc, License]Kcard(1) stored in memory 1412 under the control of controller 1420, and stores decrypted license information data License in register 1500 (step S148).

Through the above described, memory card 140 can receive the distributed data after memory card 140 itself sends public encryption key KPmedia(1) and session key Ks1 to the sender side (distribution server 12) of the encrypted content data, and thereby memory card 140 can enter the state, in which the music information can be reproduced.

Further, memory card 140 sends a notification of distribution acceptance to distribution server 12. When distribution server 12 receives this distribution acceptance notification (step S150), accounting database 302 stores accounting data of user 1 (step S152), and the processing ends (step S154).

In the distribution mode described above, the content data is distributed after the authentication of the memory card and cellular phone. Therefore, security of the system and the copyright protection are further enhanced.

[Reproduction Mode]

Figure 37:
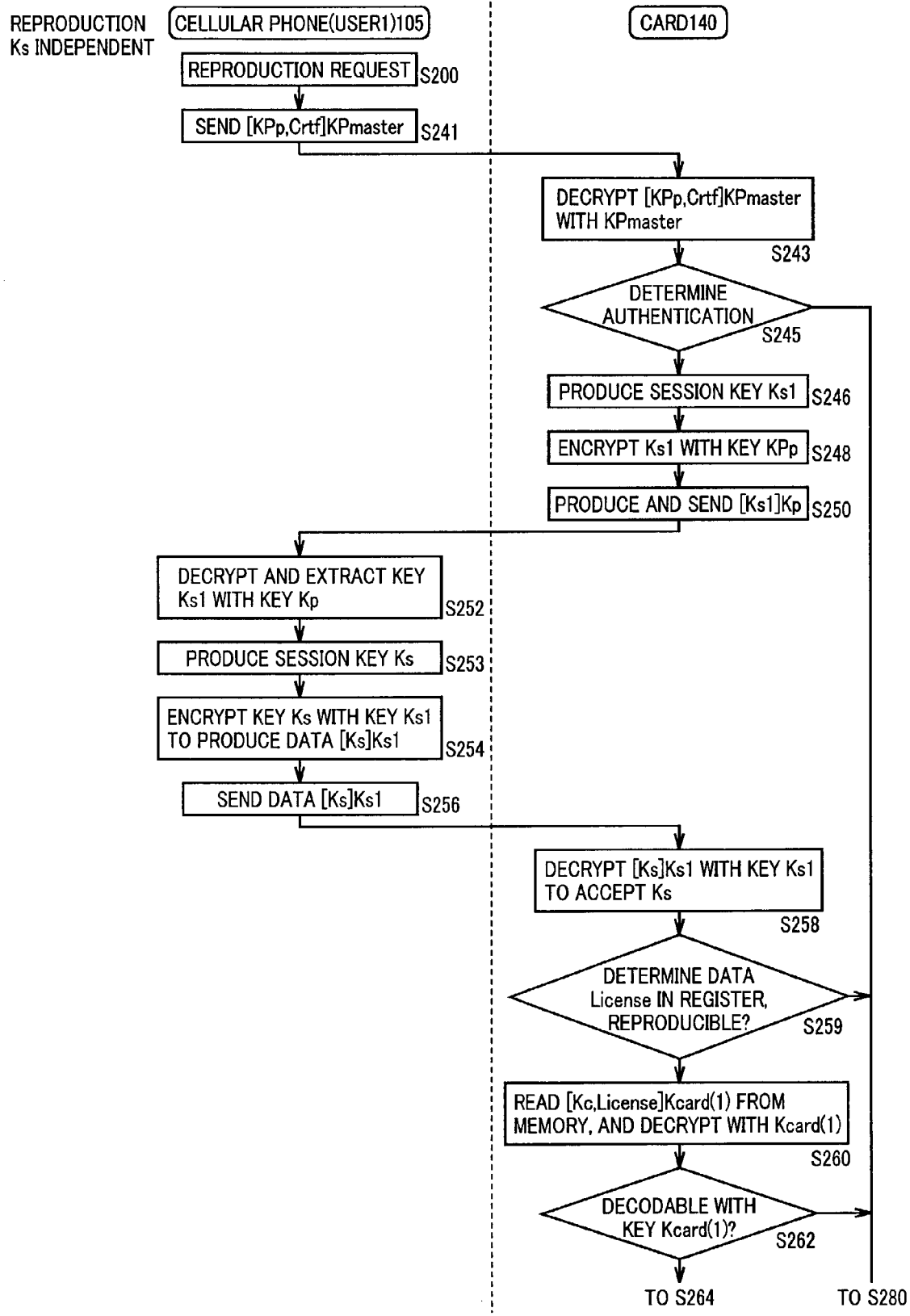
FIG. 37 is a first flowchart representing reproducing processing of reproducing encrypted content data held in memory card 140 for externally outputting it as music.
Figure 38:
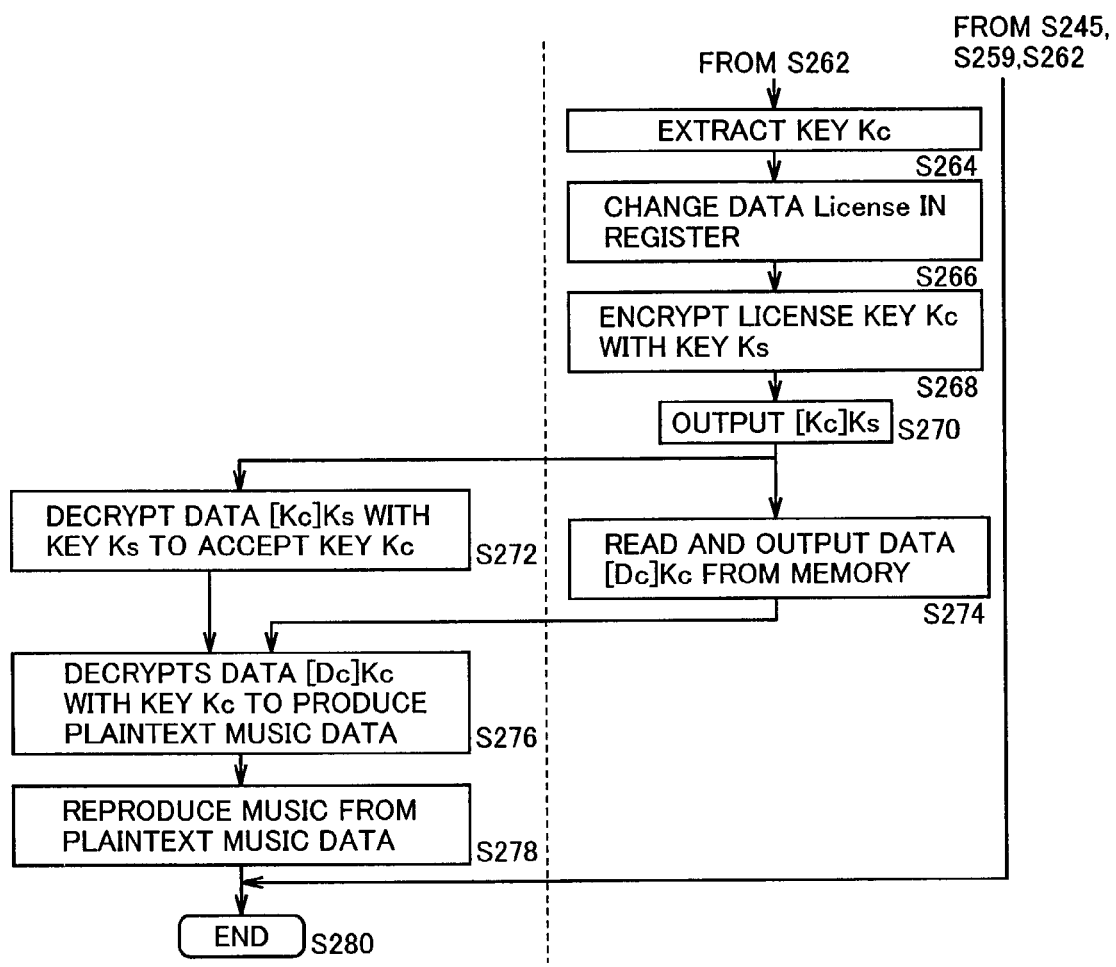
FIG. 38 is a second flowchart representing the reproducing processing of reproducing the encrypted content data held in memory card 140 for externally outputting it as music.

FIGS. 37 and 38 are first and second flowcharts representing the reproducing processing performed in cellular phone 105 for decrypting the encrypted content data held in memory card 140 to produce music signals and output externally the same as music.

Referring to FIGS. 37 and 38, user 1 applies a reproduction request to cellular phone 105 via touch key unit 1108 or the like of cellular phone 105 (step S200).

In response to this, cellular phone 105 sends data [KPp, Crtf(p)]KPmaster to memory card 140 (step S241).

When memory card 140 receives data [KPp, Crtf(p)]KPmaster, decryption processing unit 1452 performs the decryption to extract public encryption key KPp and data Crtf (step S243).

Based on extracted certificate data Crtf, controller 1420 determines whether cellular phone 105 is a regular device or not (step S245). When it is a regular device, the processing moves to a next step S246. When it is not regular, the processing ends (step S280).

When it is determined that cellular phone 105 is a regular device, memory card 140 produces session key Ks1 (step S246). Memory card 140 further encrypts session key Ks1 with extracted public encryption key KPp (step S248), and sends encrypted session key [Ks1]Kp thus produced to cellular phone 105 (step S250).

When cellular phone 105 receives encrypted session key [Ks1]Kp from memory card 140, decryption processing unit 1522 decrypts it with private decryption key Kp to extract session key Ks1 produced by memory card 140 (step S252). Then, Ks generating unit 1502 produces session key Ks (step S253), and encryption processing unit 1504 in cellular phone 105 encrypts session key Ks produced by cellular phone 105 with session key Ks1 to produce encrypted session key [Ks]Ks1 (step S254) and send it to memory card 140 (step S256).

Memory card 140 receives session key Ks, which was produced and encrypted by cellular phone 105, via data bus BS2, and decrypts it with session key Ks1 to extract session key Ks, which was produced by cellular phone 105 (step S258).

Subsequently, controller 1420 in memory card 140 determines the reproducibility based on license information data License held by register 1500 (step S259). When it is reproducible, the processing moves to the next step. When it is not reproducible, the processing ends (step S280).

In memory card 140, encrypted data [Kc, License]Kcard(1) is read out from memory 1412, and is decrypted by decryption processing unit 1416 (step S260).

When the data read from memory 1412 is decodable with private decryption key Kcard(1) (step S262), license key Kc is extracted (step S264). When it is not decodable, the processing ends (step S280).

When data read from memory 1412 is decodable, processing is performed to change the data, which is contained in license information data License in register 1500, and is related to the reproduction times (step S266).

In memory card 140, encryption processing unit 1406 then encrypts license key Kc with extracted session key Ks (step S268), and applies encrypted license key [Kc]Ks to data bus BS2 (step S270).

Decryption processing unit 1506 in cellular phone 105 performs the decryption with session key Ks to obtain license key Kc (step S272).

Then, memory card 140 reads out encrypted content data [Dc]Kc from memory 1412, and applies it to data bus BS2 (step S274).

Audio decoding unit 1508 in cellular phone 105 decrypts encrypted content data [Dc]Kc with extracted license key Kc to produce plaintext content data (step S276), and reproduces music signals from the content data for applying them to mixing unit 1510 (step S276). Digital-to-analog converter 1512 converts the data received from mixing unit 1510, and externally outputs the reproduced music. Then, the processing ends (step S232).

Owing to the above structures, the memory card itself and the cellular phone itself produce session keys Ks1 and Ks, respectively, and the reproduction can be performed after the encrypted data is transmitted using these keys.

Further, the reproduction is performed after memory card 140 authenticates cellular phone 105. This improves the security of the system and the copyright protection.

[Transfer Mode or Duplication Mode]

Figure 39:
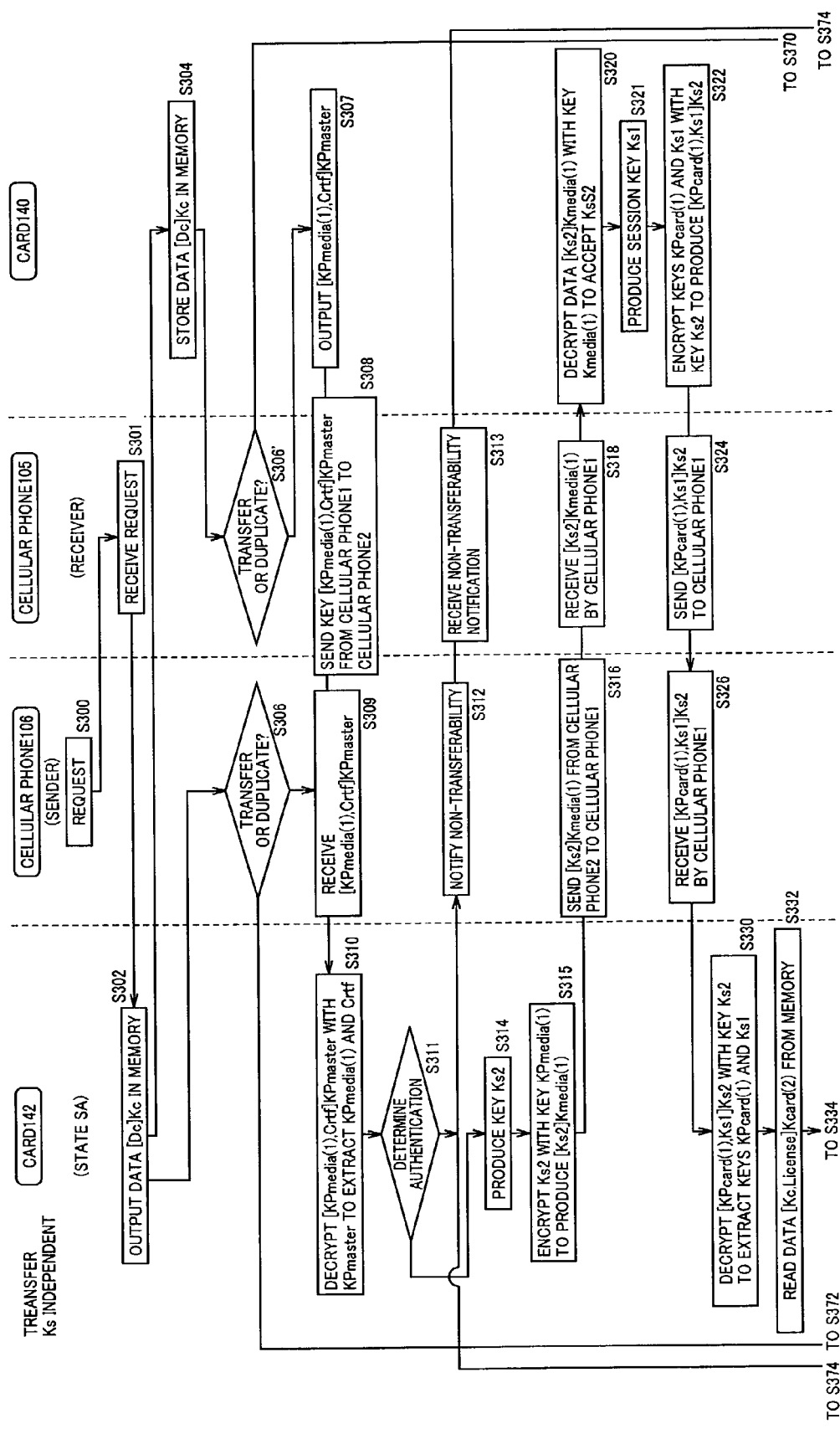
FIG. 39 is a first flowchart representing processing of transferring or duplicating content data, key data and others between two memory cards.
Figure 40:
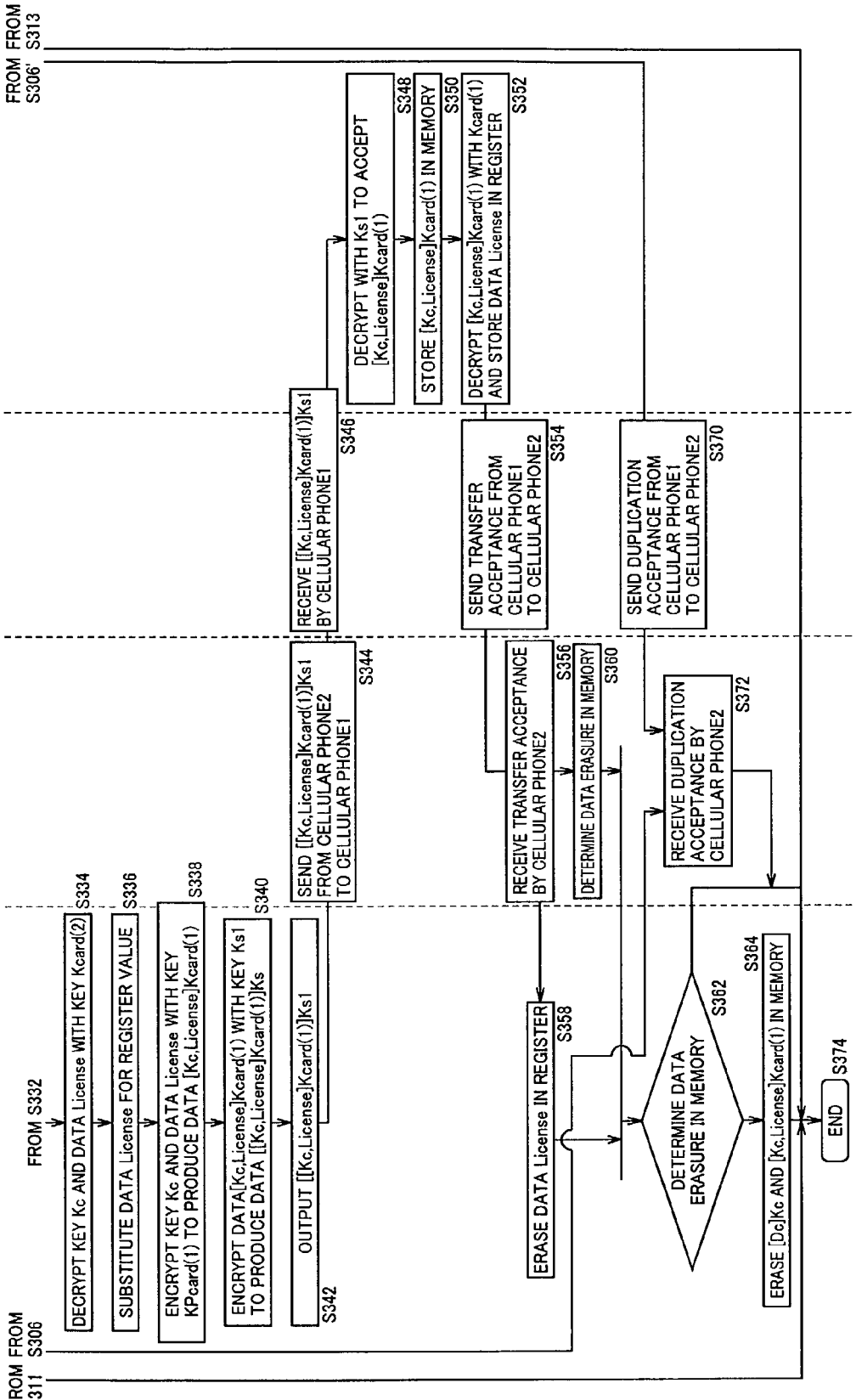
FIG. 40 is a second flowchart representing processing of transferring or duplicating content data, key data and others between two memory cards.

FIGS. 39 and 40 are first and second flowcharts representing the transfer or duplication of the content data, key data and others between two memory cards.

It is assumed that a cellular phone 106 having substantially the same structure as cellular phone 105 is on the sender side, and cellular phone 105 is on the receiver side. A memory card 142 having substantially the same structure as memory card 140 is attached to cellular phone 106.

Cellular phone 106 first outputs a transfer request or a duplication request to cellular phone 105 (step S300).

When cellular phone 105 receives this request (step S301), memory card 142 reads out encrypted content data [Dc]Kc corresponding to this request from memory 1412, and outputs it to memory card 140 (step S302). Memory card 140 stores encrypted content data [Dc]Kc in memory 1412 (step S304).

In cellular phones 106 and 105, it is then determined whether the request applied in step S300 is a "transfer request" or a "duplication request" (steps S306 and S306'). When it is a "transfer request", memory card 140 responds to this transfer request by outputting data [KPmedia(1), Crtf(1)]KPmaster, which is prepared by encrypting public encryption key KPmedia(1) and certificate data Crtf(1), from [KPmedia, Crtf]KPmaster holding unit 1442 to cellular phone 105 (step S307).

Cellular phone 105 sends data [KPmedia(1), Crtf(1)]KPmaster received from memory card 140 to cellular phone 106 (step S308).

In cellular phone 106, when data [KPmedia(1), Crtf(1)]KPmaster transferred from memory card 140 is received (step S309), decryption processing unit 1452 in memory card 142 decrypts it to extract certificate data Crtf(1) and public encryption key KPmedia(1) (step S310).

Based on decrypted certificate data Crtf(1), controller 1420 performs the authentication. When it is determined that the access is made from a regular memory card (step S311), the processing moves to a next step. When it is not a regular card, cellular phone 106 notifies that the transfer is not allowed, and memory card 142 ends the processing (step S374). When cellular phone 105 receives the notification that the transfer is not allowed (step S313), memory card 140 ends the processing (step S374).

When it is determined in step S311 that the access is made from the regular memory card, Ks2 generating unit 1432 of memory card 142 produces session key Ks2 (step S314), and encryption processing unit 1430 encrypts session key Ks2 with public encryption key KPmedia(1) (step S315).

Cellular phone 106 sends encrypted session key [Ks2]KPmedia(1) to cellular phone 105 (step S316). Cellular phone 105 receives encrypted session key [Ks2]KPmedia(1)

(step S318), and transmits it to memory card 140. Memory card 140 decrypts it by decryption processing unit 1404, and accepts session key Ks2 (step S320). Further, session key Ks1 is produced in memory card 140 (step S321).

In memory card 140, public encryption key KPcard(1) and session key Ks1 of memory card 140 are encrypted with session key Ks2 (step S322), and encrypted data [KPcard(1), Ks1]Ks2 is sent from cellular phone 105 to cellular phone 106 (step S324). Cellular phone 106 receives data [KPcard(1), Ks1]Ks2 (step S326), and transfers it to memory card 142.

In memory card 142, decryption processing unit 1410 decrypts encrypted data [KPcard(1), Ks1]Ks2 sent from memory card 140 with session key Ks2 to extract public encryption key KPcard(1) and session key Ks1 of memory card 140 in the decrypted form (step S330).

In memory card 142, data [Kc, License]Kcard(2) corresponding to license key Kc and license information data License, which are encrypted with public encryption key KPcard(2) of memory card 142, is read out from memory 1412 (step S332).

Then, decryption processing unit 1416 decrypts license key Kc and license information data License with private decryption key Kcard(2) (step S334).

Controller 1420 of memory card 142 substitutes a value of license information data License thus decrypted for a data value in register 1500 (step S336).

Further, encryption processing unit 1414 of memory card 142 encrypts license key Kc and license information data License with public encryption key KPcard(1) of memory card 140 extracted by decryption processing unit 1410 (step S338).

The data encrypted by encryption processing unit 1414 in memory card 142 is further applied to encryption processing unit 1406 via selector switch 1409 having contact Pd in the closed position, and encryption processing unit 1406 of memory card 142 encrypts data [Kc, License]Kcard(1) with session key Ks1 to produce data [[Kc, License]Kcard(1)]Ks1 (step S340).

Then, memory card 142 outputs data [[Kc, License]Kcard(1)]Ks1 to cellular phone 106 (step S342), and cellular phone 106 sends data [[Kc, License]Kcard(1)]Ks1 to cellular phone 105 (step S344).

Cellular phone 105 receives data [[Kc, License]Kcard(1)]Ks1 (step S346), and transmits it to memory card 140. Decryption processing unit 1410 of memory card 140 decrypts encrypted data [[Kc, License]Kcard(1)]Ks1 to accept data [Kc, License]Kcard(1) (step S348).

In memory card 140, data [Kc, License]Kcard(1) decrypted by decryption processing unit 1410 based on session key Ks1 is stored in memory 1412 (step S350). In memory card 140, decryption processing unit 1416 decrypts data [Kc, License]Kcard(1) based on private decryption key Kcard(1), and decrypted license information data License is stored in register 1500 (step S352).

After the above processing, the processing in the transfer mode as well as the processing of memory cards 140 and 142 in the duplication mode are performed similarly to those of memory cards 120 and 122 of the second embodiment, which are already described with reference to FIGS. 18 and 19. Therefore, description thereof is not repeated.

Owing to the above structure, each of the memory cards of the sender and the receiver produces the session key by itself, and thereby the transfer operation and the duplication operation are allowed.

Accordingly, the encryption key of the data transmitted on the data bus and others is unique to every session and every device so that the security of data transmission is further improved.

Owing to the above structure, data transfer from memory card 142 to memory card 140 can be performed without using the cellular phone terminal having session key generating circuit 1502 described above, but with the interface device, which can connects the memory cards to each other. This further improves the convenience of the user.

In the transfer mode, the license information data, which is contained in the reproduction information for restricting the times of reproduction, is updated by changing the license information data recorded in memory 1412 into the license information data recording the times of reproduction, which were corrected upon every reproduction by register 1500. In this manner, even when the content data moves between the memory cards, such a control can be performed that the times of reproduction of the content data, of which reproduction is allowed only restricted times, do not exceed the reproduction times determined at the time of distribution.

Further, the transfer operation is performed after memory card 142 authenticates memory card 140 so that the system security and the copy right protection are improved.

Sixth Embodiment

Figure 41:
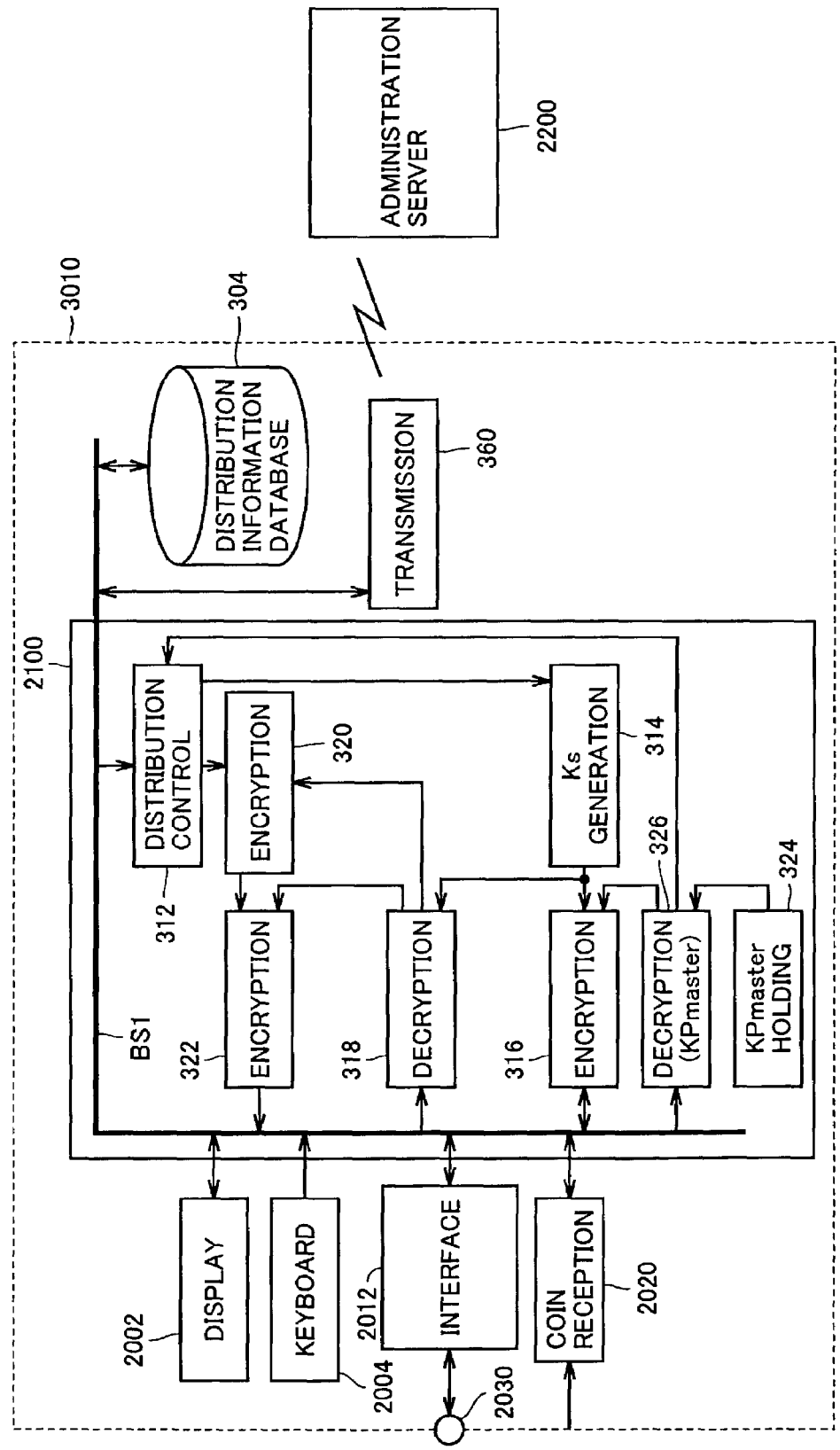
FIG. 41 is a schematic block diagram showing a structure of a content data vending machine 3010 in a sixth embodiment of the invention.

FIG. 41 is a schematic block diagram showing a structure of content data vending machine 3010 of a sixth embodiment of the invention, and corresponds to FIG. 27 showing the fourth embodiment.

In the following description, a memory slot 2030 for interface to memory card 140 already described in connection with the fifth embodiment is employed, and memory card 140 and content data vending machine 3010 can directly transmit the data to and from each other without interposing cellular phone 105 therebetween, as can be done in the modification of the fourth embodiment.

Naturally, such a structure may be employed that connector 2010 is used for transmitting the data between memory card 140 and content data vending machine 3010 via cellular phone 105.

Accordingly, the structure of content data vending machine 3010 differs from the structure of content data vending machine 3000 of the fourth embodiment in that memory slot 2030 is employed instead of connector 2010, and data processing unit 2100 further includes a KPmaster holding unit 324 for holding public decryption key KPmaster and decryption processing unit 326 for decrypting the data, which is applied to data bus BS1 via communication device 350 and the communication network, based on public decryption key KPmaster output from KPmaster holding unit 324. Encryption processing unit 316 encrypts session key Ks generated by Ks generating unit 314 with public encryption key KPmedia, which is extracted by the decrypting processing of decryption processing unit 326. Based on certificate data Crtf extracted by the decrypting processing of decryption processing unit 326, distribution control unit 312 determines whether the memory card requesting the distribution is a regular memory card or not.

Structures of content data vending machine 3010 other than the above are substantially the same as those of content data vending machine 3000 shown in FIG. 27. The same portions bear the same reference numbers, and description thereof is not repeated.

[Distribution Mode]

Figure 42:
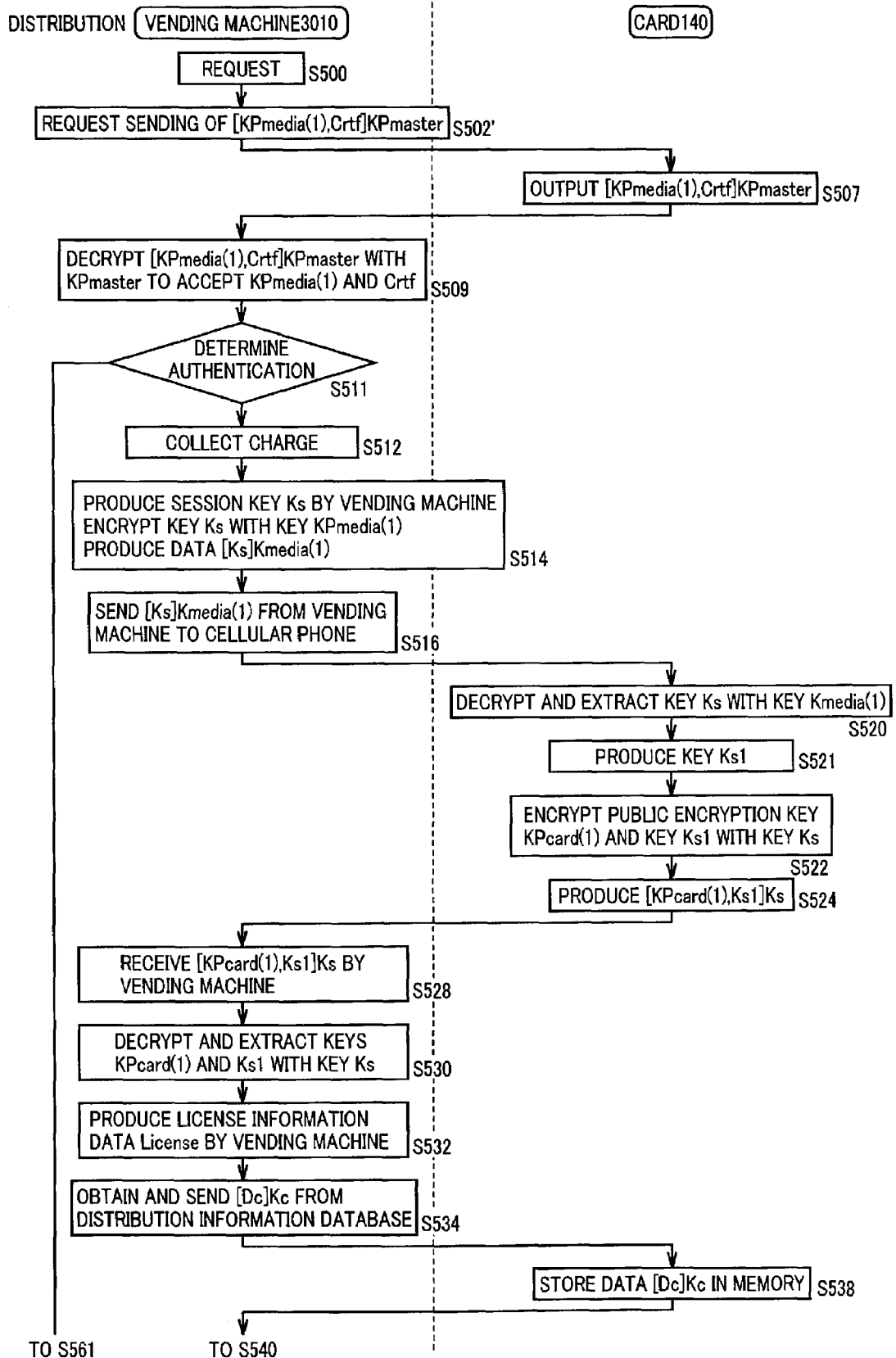
FIG. 42 is a first flowchart representing a distribution mode of a data distribution system using content data vending machine 3010.
Figure 43:
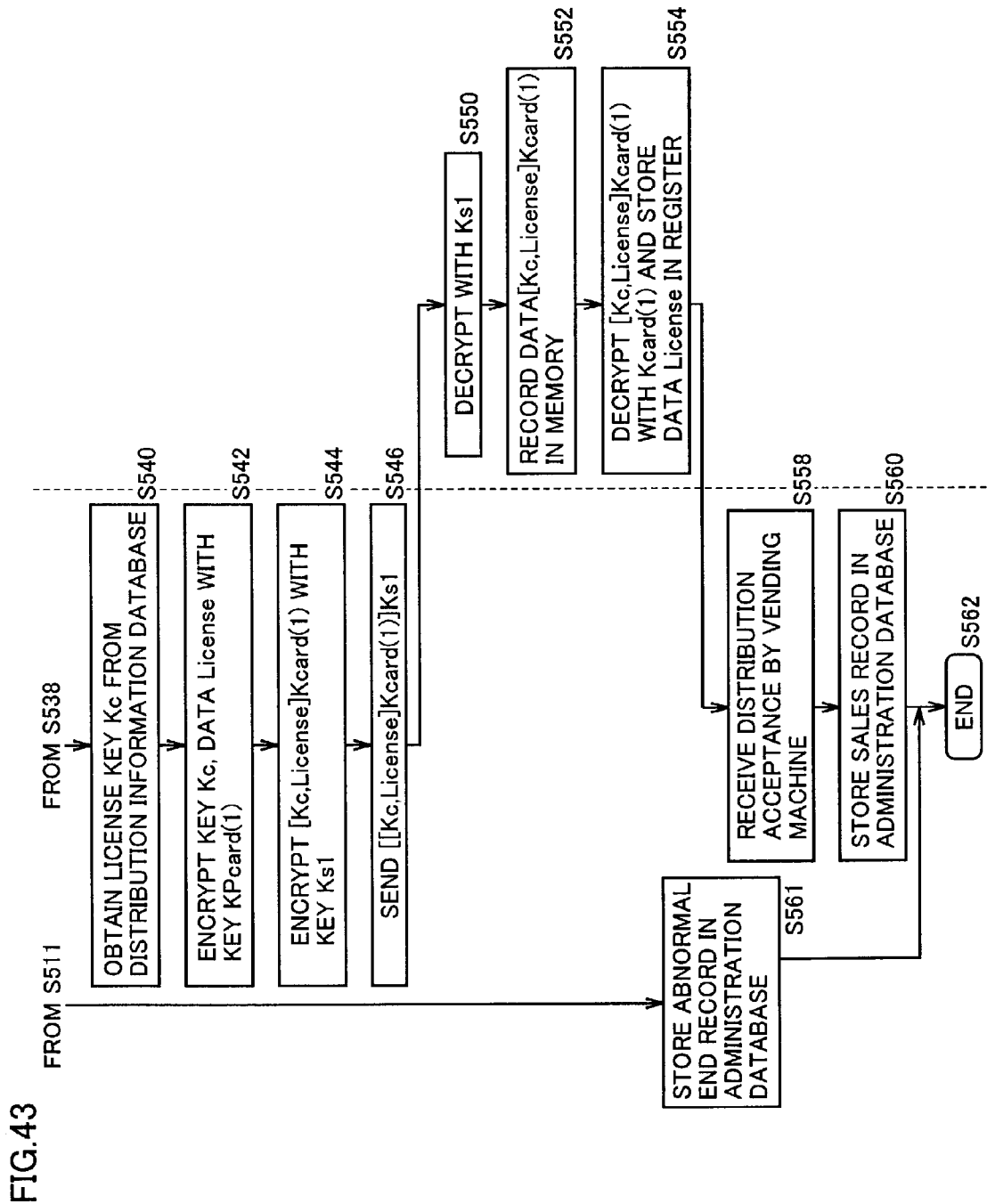
FIG. 43 is a second flowchart representing the distribution mode of the data distribution system using content data vending machine 3010.

FIGS. 42 and 43 are first and second flowcharts representing the distribution operation in the data distribution system using content data vending machine 3010 already described with reference to FIG. 41.

FIGS. 42 and 43 represent operations, in which user 1 uses memory card 140 for receiving the content data (music data) distributed from content data vending machine 3010.

First, the user applies the distribution request, e.g., by operating keys or buttons on keyboard 2004 of content data vending machine 3010 (step S500).

Content data vending machine 3010 outputs a request for sending data [KPmedia, Crtf]KPmaster for authentication to memory card 140 (step S502').

In response to this request for sending, [KPmedia, Crtf] KPmaster holding unit 1442 in memory card 140 outputs data [KPmedia(1), Crtf(1)]KPmaster, which is prepared by encrypting public encryption key KPmedia(1) and certificate data Crtf(1), to content data vending machine 3010 (step S507).

When content data vending machine 3010 receives data [KPmedia(1), Crtf(1)]KPmaster transferred from memory card 140, decryption processing unit 326 decrypts it with public decryption key KPmaster to extract certificate data Crtf(1), public encryption key KPp and public encryption key KPmedia(1) (step S509).

Based on decoded certificate data Crtf(1), distribution control unit 312 determines whether the access is made by a regular memory card or not. When the regular card is used (step S511), the processing moves to the next step. When the regular memory card is not used, record of abnormal ending is stored in the administration database of administration server 2200 (step S561), and the processing ends (step S562).

When content data vending machine 3010 determines in step S511 that the regular card is used, display 2002 displays a message or the like requesting coin dropping, and the charge is collected (step S512).

Then, session key generating unit 314 in content data vending machine 3010 produces session key Ks. In content data vending machine 3010, encryption processing unit 316 encrypts session key Ks with received public encryption key KPmedia(1) to produce encrypted session key [Ks]Kmedia (1) (step S514).

Then, content data vending machine 3000 applies encrypted session key [Ks]Kmedia(1) to data bus BS1, and outputs it from card slot 2030 (step S516).

In memory card 140, decryption processing unit 1404 decrypts encrypted session key [Ks]Kmedia(1), which is applied via interface 1200 to data bus BS3, with private decryption key Kmedia(1) to extract session key Ks in the decrypted form (step S520). Further, session key Ks1 is produced in memory card 140 (step S521).

In the distribution mode, selector switch 1408 is in the state closing contact Pa so that encryption processing unit 1406 encrypts public encryption key KPcard(1) applied from KPcard(1) holding unit 1405 via contact Pa with session key Ks (step S522) to produce data [KPcard(1)]Ks (step S524).

In content data vending machine 3010, data [KPcard(1)] Ks is received via card slot 2030 (step S528), and decryption processing unit 318 decrypts data [KPcard(1)]Ks applied to data bus BS1 with session key Ks to extract public encryption key KPcard(1) in the decrypted form (step S530).

Then, distribution control unit 312 produces license information data License containing license ID data and others based on the data held in distribution information database 304 and others (step S532).

Content data vending machine 3010 obtains encrypted content data [Dc]Kc from distribution information database 304, and sends it to memory card 140 via card slot 2030 (step S534).

Memory card 140 receives and stores encrypted content data [Dc]Kc in memory 1412 as it is (step S538).

Content data vending machine 3010 obtains license key Kc from distribution information database 304 (step S540), and encryption processing unit 320 encrypts license key Kc and license information data License sent from distribution control unit 312 with public encryption key KPcard(1) applied from decryption processing unit 318 (step S542).

Encryption processing unit 322 receives data [Kc, License]Kcard(1) encrypted by encryption processing unit 320, and further encrypts it with session key Ks1 to apply data [[Kc, License]Kcard(1)]Ks1 to data bus BS1 so that data [[Kc, License]Kcard(1)]Ks1 thus encrypted by encryption processing unit 322 is sent to memory card 140 (step S546).

In memory card 1410, decryption processing unit 1410 decrypts data [[Kc, License]Kcard(1)]Ks1 with session key Ks1 to extract and store data [Kc, License]Kcard(1) in memory 1412 (step S552).

Further, in memory card 140, decryption processing unit 1416 controlled by controller 1420 decrypts data [Kc, License]Kcard(1) stored in memory 1412, and stores decrypted license information data License in register 1500 (step S554).

By the operations described above, memory card 140 enters the state, in which the music can be produced from the content data.

Further, memory card 140 sends a notification of distribution acceptance to content data vending machine 3010 (step S558). When content data vending machine 3010 receives the distribution acceptance, a sales record is sent to the administration database in administration server 2200 (step S560), and the processing ends (step S562).

Owing to the structures described above, the user can receive more easily the distributed content data such as music data in the encrypted form. Further, the content data is distributed after the authentication of the memory card. Therefore, the system security and the copyright protection are further enhanced.

Seventh Embodiment

Figure 44:
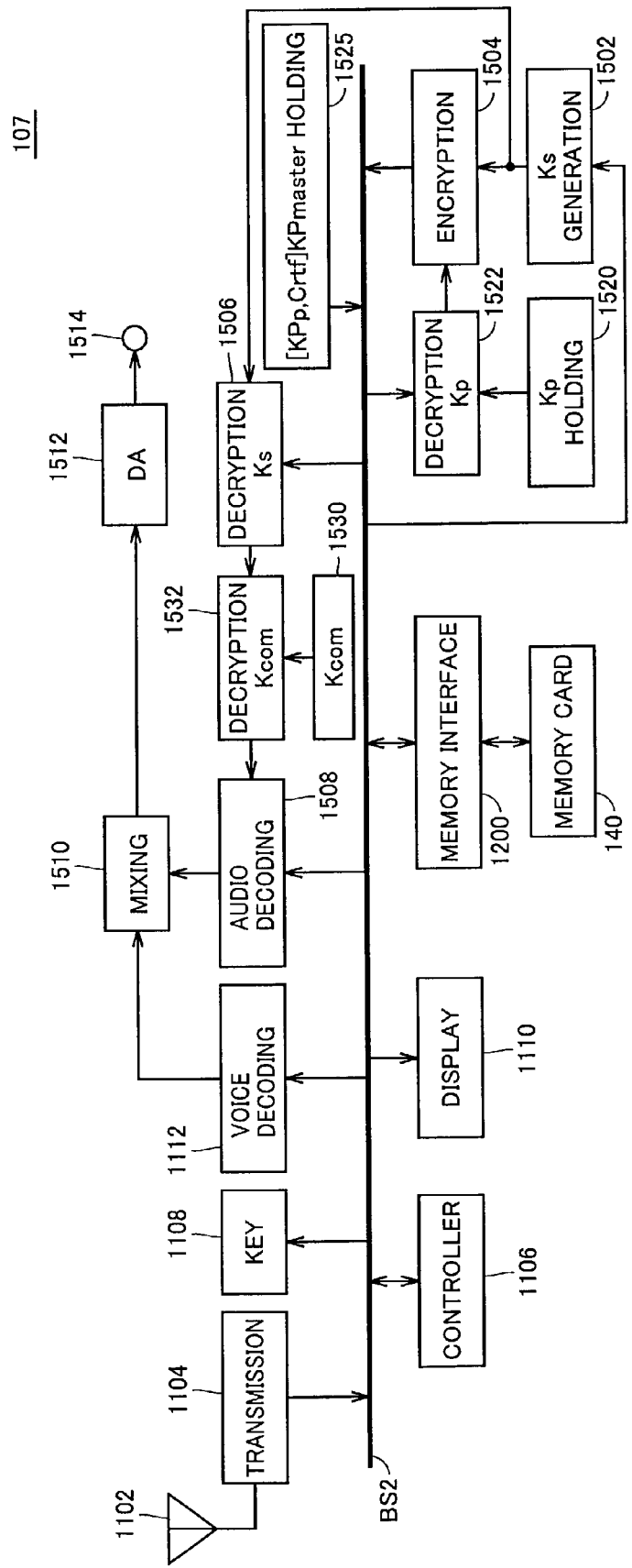
FIG. 44 is a schematic block diagram showing a structure of a cellular phone 107 in a seventh embodiment.

FIG. 44 is a schematic block diagram showing a structure of a cellular phone 107 of the seventh embodiment.

Cellular phone 107 in FIG. 44 differs from cellular phone 105 of the fifth embodiment shown in FIG. 32 in that cellular phone 107 includes a Kcom holding unit 1530 for holding a decryption key Kcom common to reproduction devices (i.e., cellular phones), and a decryption processing unit 1532, which receives the output of decryption processing unit 1506, performs the decryption with decryption key Kcom, and applies license key Kc to audio decoding unit 1508.

Structures of cellular phone 107 other than the above are substantially the same as those of cellular phone 105 of the fifth embodiment shown in FIG. 32. The same portions bear the same reference numbers, and description thereof is not repeated. Memory card 140 has substantially the same structure.

Thus, the structures in the seventh embodiment are substantially the same as those of the fifth embodiment except for that license key Kc transmitted between the devices forming the system takes the further encrypted form of [Kc]Kcom before license key Kc is finally applied to audio decoding unit 1508 in the seventh embodiment.

In the following description, it is assumed that decryption key Kcom is a common key. However, the invention is not restricted to this. For example, such a structure may be employed that encryption is performed with public key KPcom, and decryption is performed with private decryption key Kcom asymmetrical to public encryption key KPcom.

Figure 45:
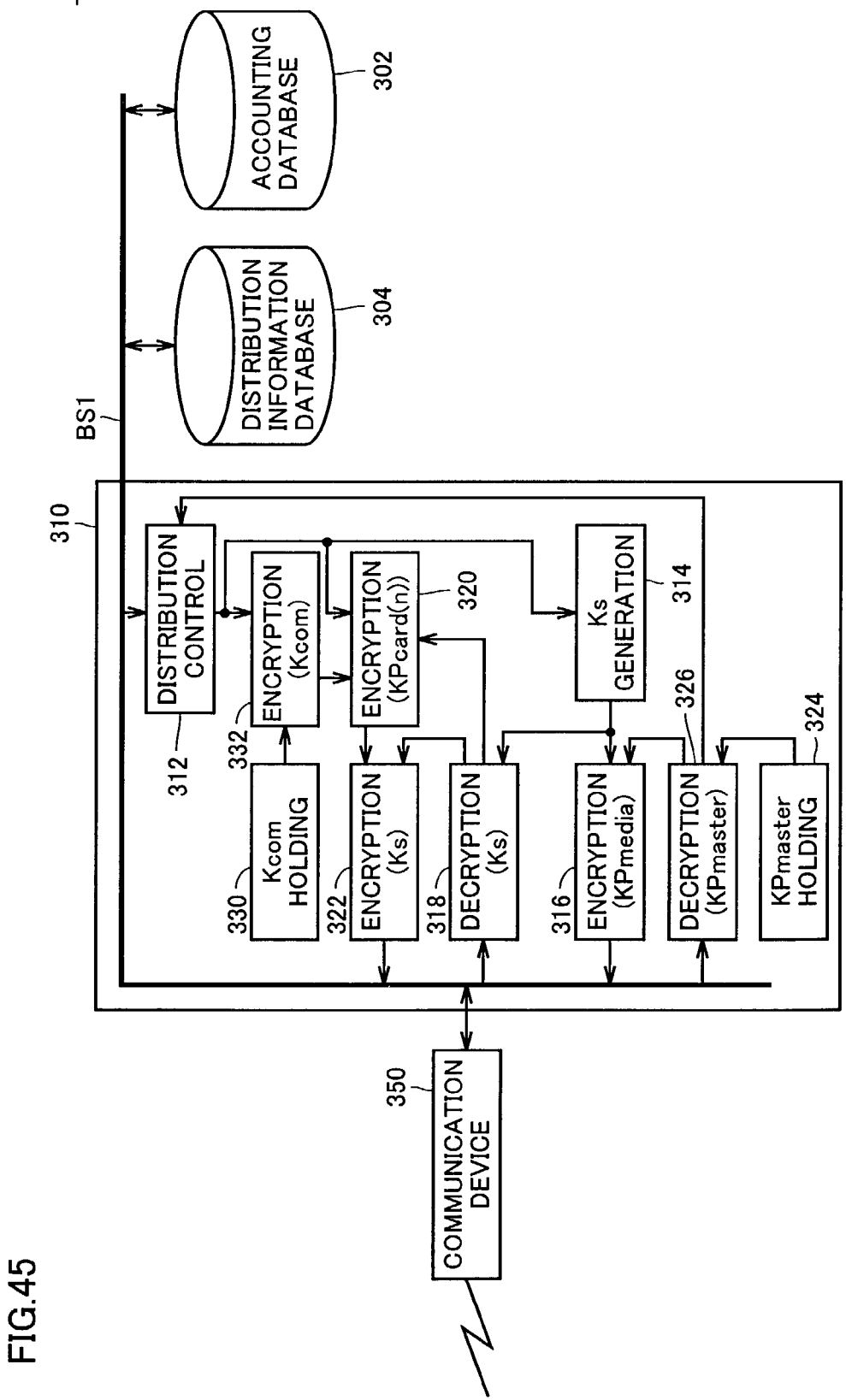
FIG. 45 is a schematic block diagram showing a structure of a distribution server 13 corresponding to cellular phone 107 in the seventh embodiment.

FIG. 45 is a schematic block diagram showing a structure of a distribution server 13 corresponding to cellular phone 107 in the seventh embodiment. The structure of distribution server 13 differs from the structure of distribution server 12 of the fifth embodiment shown in FIG. 33 in that data processing unit 310 further includes a Kcom holding unit 330 holding decryption key Kcom, and an encryption processing unit 332, which decrypts license key Kc applied from distribution information database 304 via distribution control unit 312 with decryption key Kcom to produce and apply an encrypted license key [Kc]Kcom to encryption processing unit 320.

Structures of distribution server 13 other than the above are substantially the same as those of distribution server 12 of the fifth embodiment shown in FIG. 33. The same portions bear the same reference numbers, and description thereof is not repeated.

[Distribution Mode]

Figure 46:
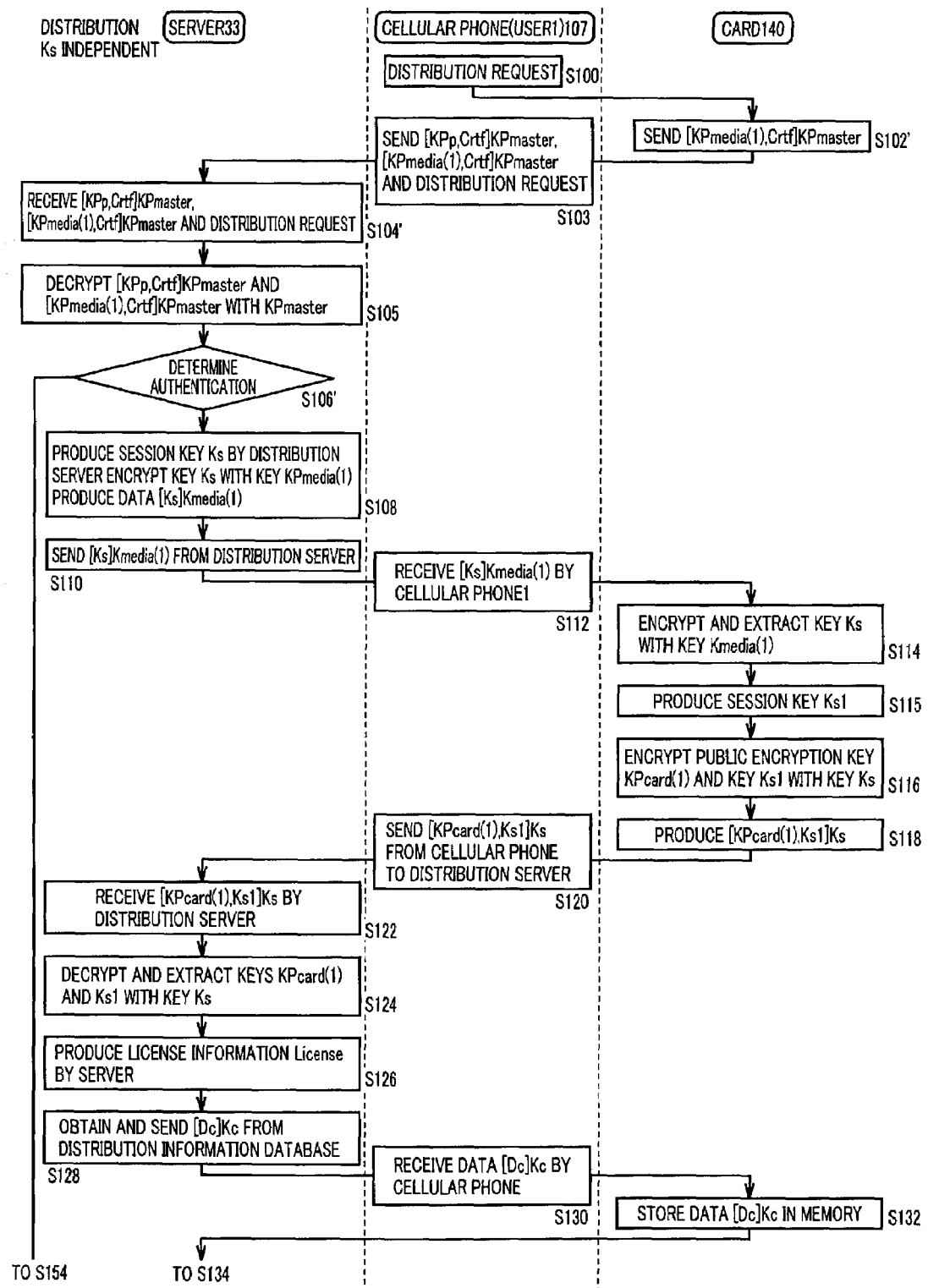
FIG. 46 is a first flowchart representing a distribution mode using a distribution server 12 and cellular phone 107.
Figure 47:
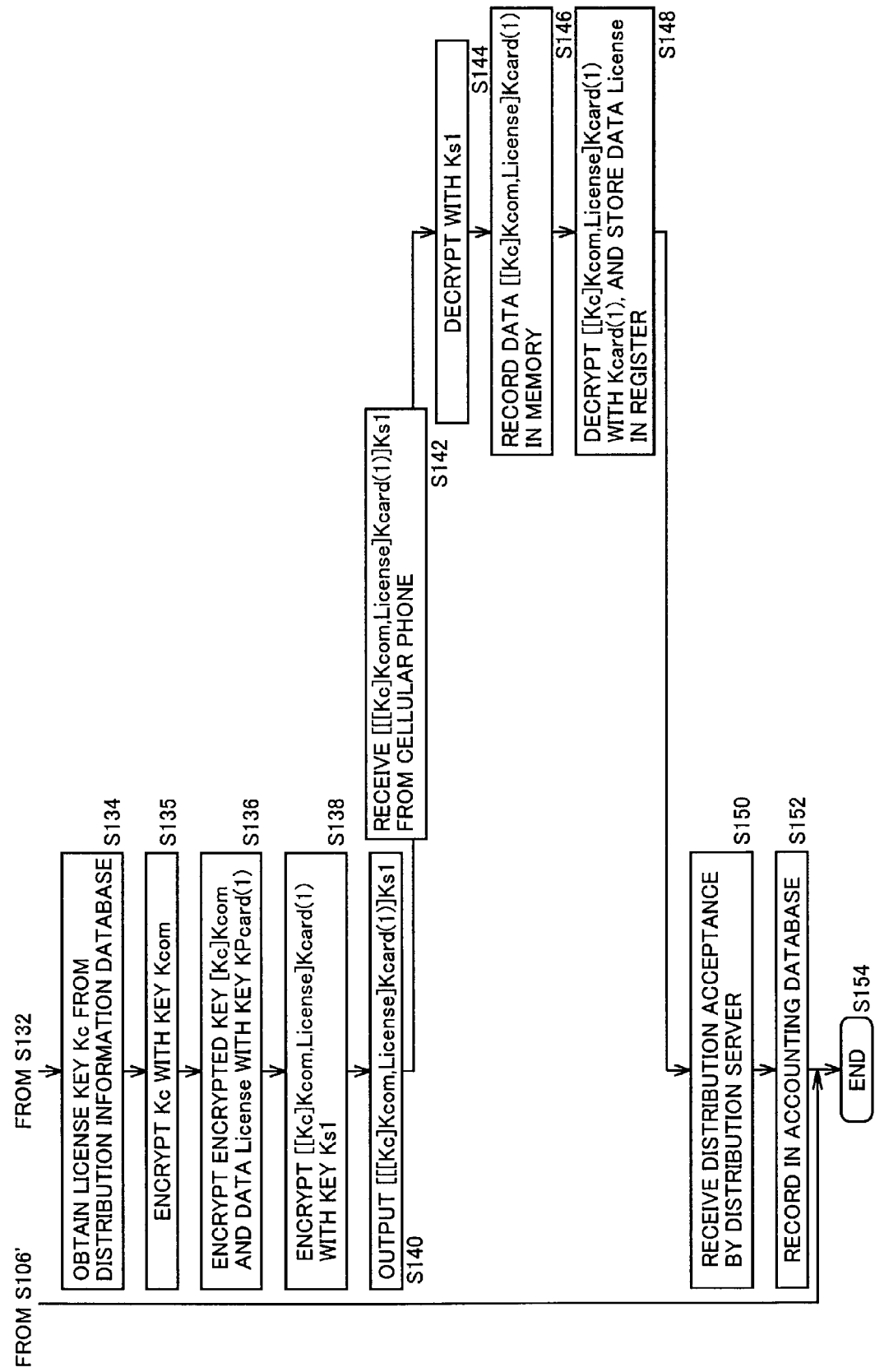
FIG. 47 is a second flowchart showing the distribution mode using distribution server 12 and cellular phone 107.

FIGS. 46 and 47 are first and second flowcharts representing the distribution mode using distribution server 13 and cellular phone 107 already described with reference to FIGS. 44 and 45.

FIGS. 46 and 47 likewise represent operations, in which user 1 uses memory card 140 for receiving the content data (music data) distributed from distribution server 13.

However, the processing shown in FIGS. 46 and 47 is substantially the same as the processing in the distribution mode of the fifth embodiment shown in FIGS. 35 and 36 except for that distribution server 13 obtains license key Kc from distribution information database 304 in step S314, and then key Kc is encrypted by encryption processing unit 322 (step S135), and will be transmitted as encrypted license key [Kc]Kcom. Therefore, description thereof is not repeated.

The distribution mode described above further enhances the system security, as compared with the fifth embodiment.

[Reproducing Operation]

Figure 48:
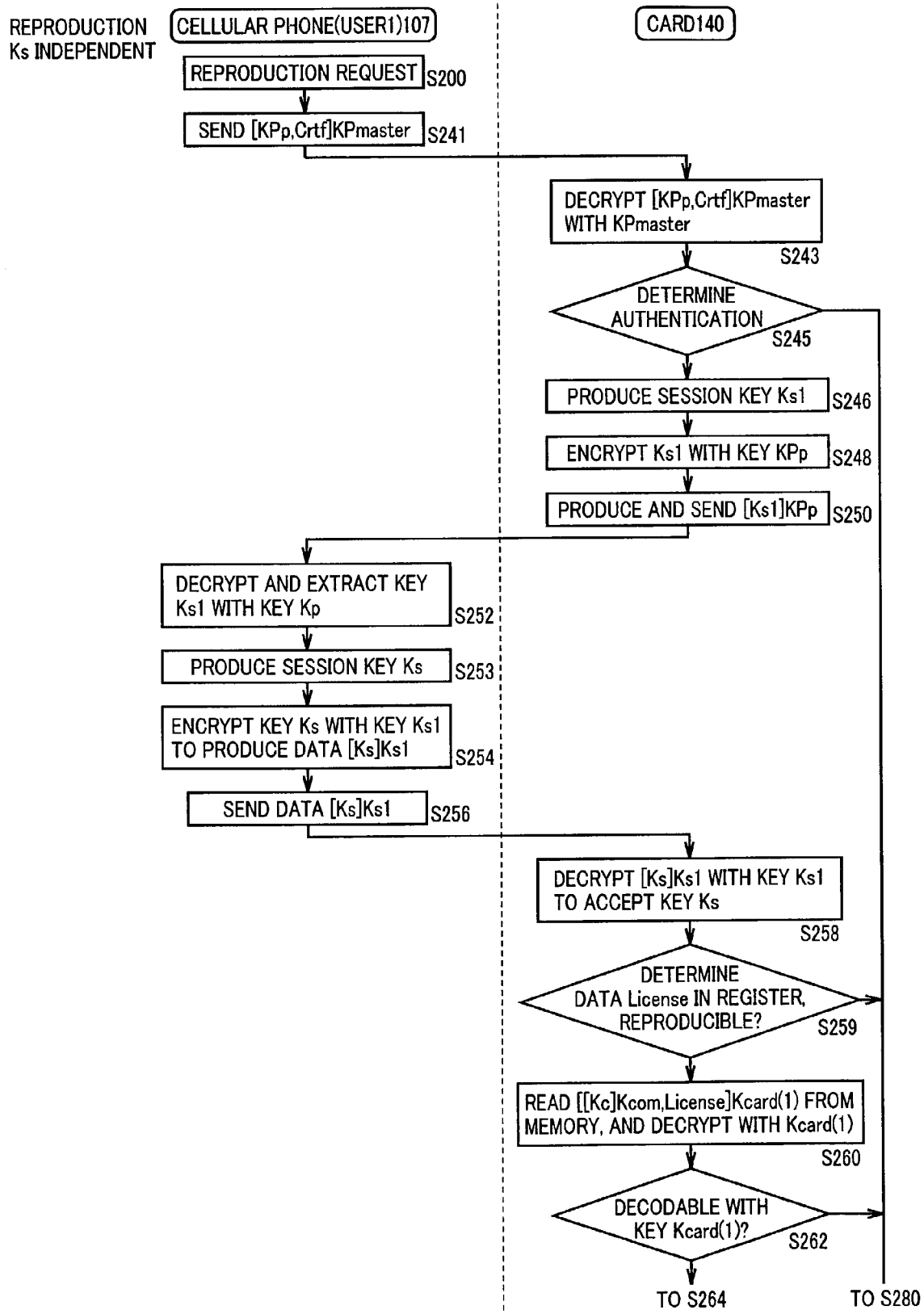
FIG. 48 is a first flowchart representing reproducing processing of reproducing encrypted content data held in memory card 140 for externally outputting it as music.
Figure 49:
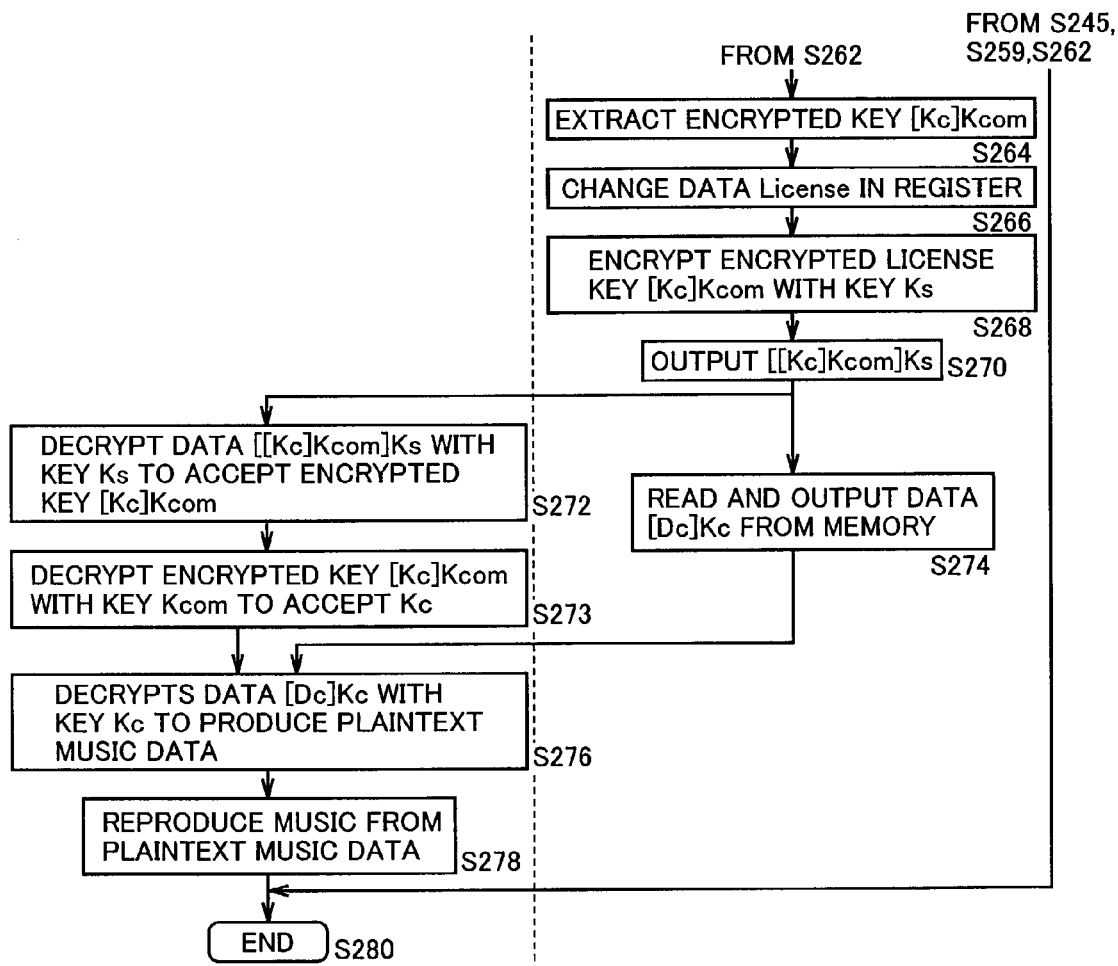
FIG. 49 is a second flowchart representing the reproducing processing of reproducing the encrypted content data held in memory card 140 for externally outputting it as music.

FIGS. 48 and 49 are first and second flowcharts representing the reproducing operation, in which music signals are reproduced from encrypted content data held in memory card 140 of cellular phone 107, and are externally output as music.

However, the reproducing operations shown in FIGS. 48 and 49 are the same as the reproducing operations of the fifth embodiment shown in FIGS. 37 and 38 in that the key read in step S264 from memory 1412 of memory card 140 is encrypted license key [Kc]Kcom, and is transmitted as encrypted license key [Kc]Kcom to cellular phone 107, and decryption processing unit 1532 in cellular phone 107 decrypts key [Kc]Kcom in step S273 to produce and output license key Kc to audio decoding unit 1508. Therefore, description of the same operations is not repeated.

Owing to the above structure, the system security and the copyright protection are further improved in the reproduction mode.

[Transfer or Duplication Mode]

Figure 50:
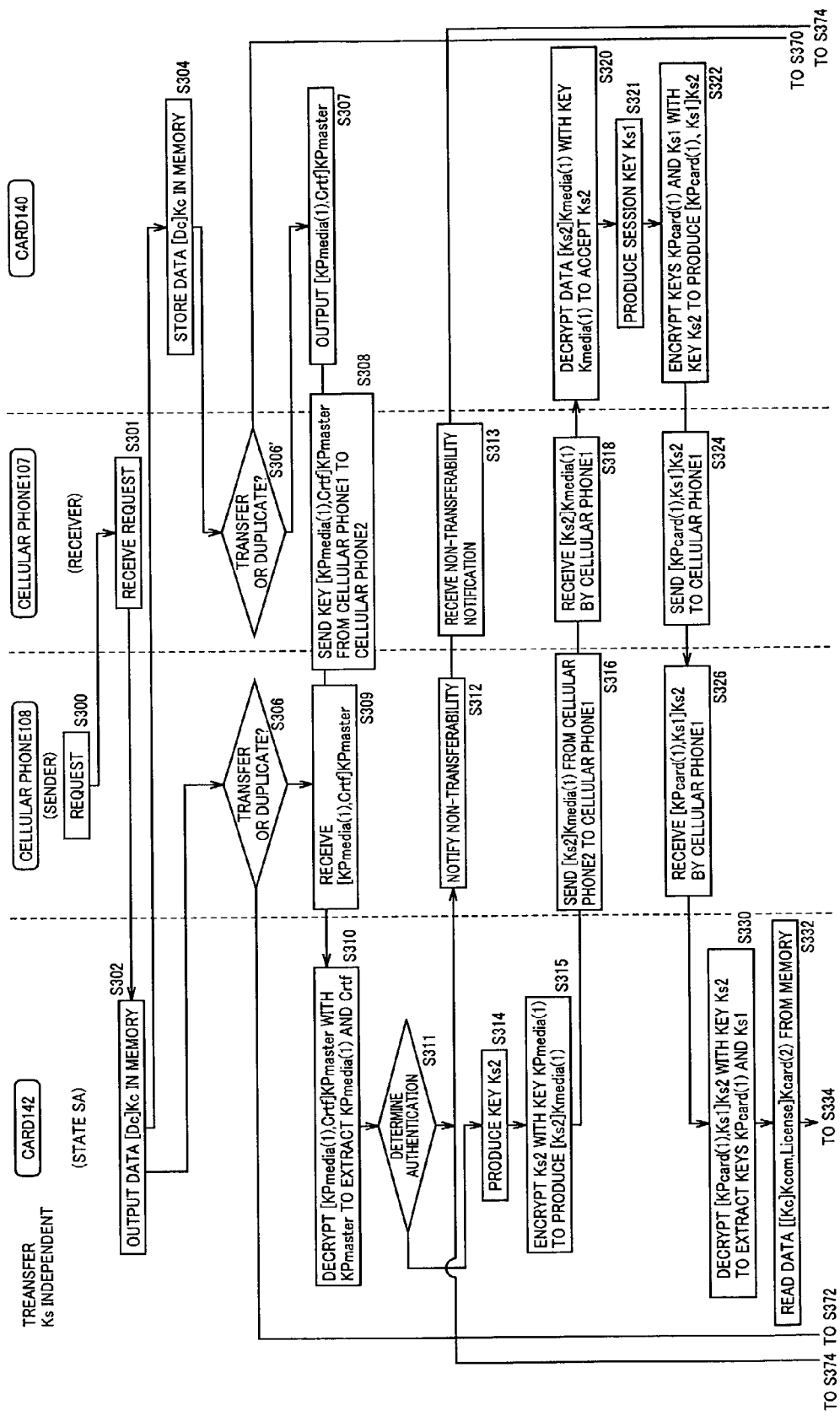
FIG. 50 is a first flowchart representing processing of transferring or duplicating content data, key data and others between two memory cards in the seventh embodiment.
Figure 51:
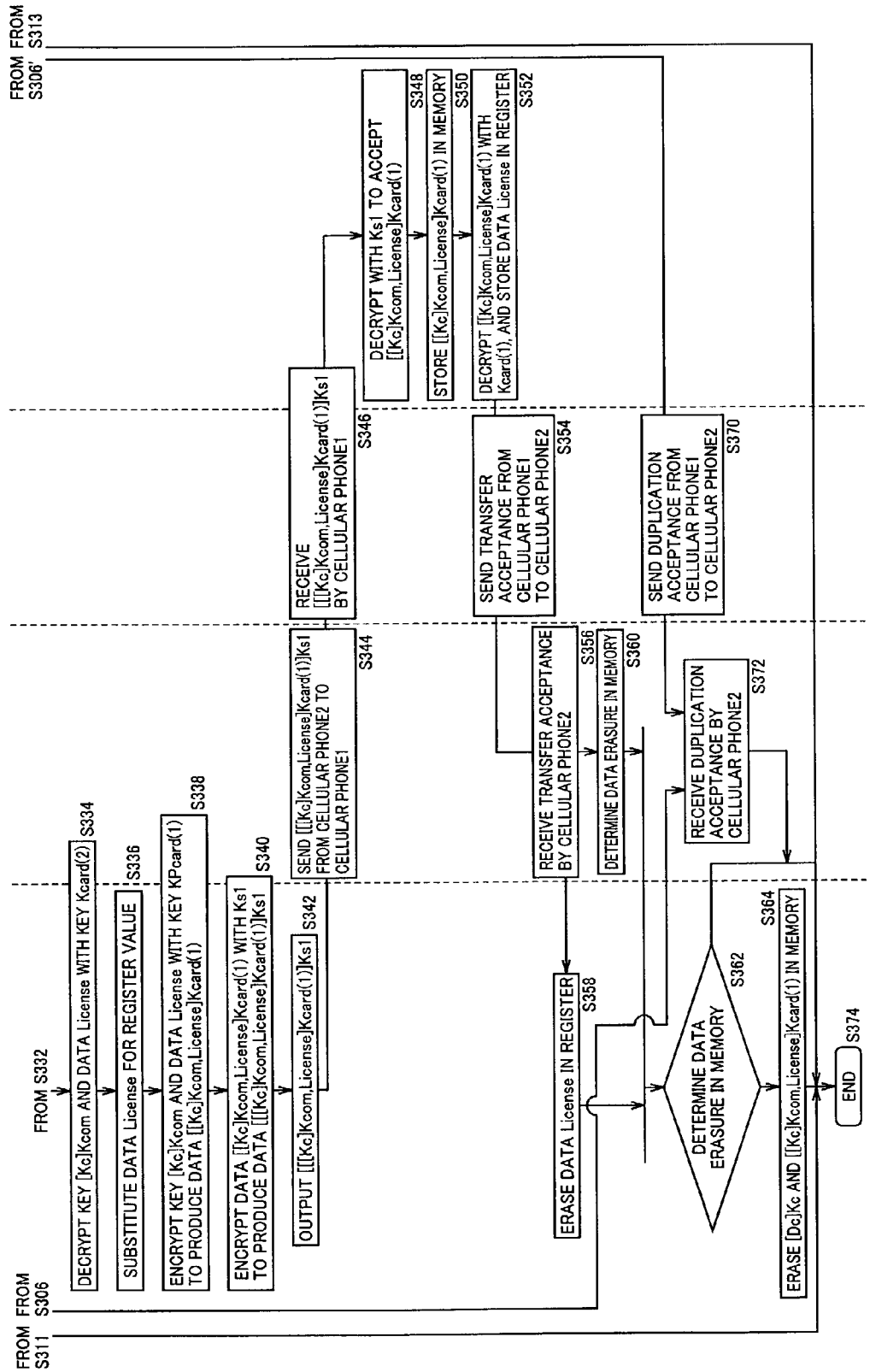
FIG. 51 is a second flowchart representing processing of transferring or duplicating content data, key data and others between two memory cards in the seventh embodiment.

FIGS. 50 and 51 are first and second flowcharts representing the processing of transferring or duplicating the content data, key data and others between two memory cards in the seventh embodiment.

The operations in FIGS. 50 and 51 are substantially the same as those in the transfer or duplication mode of the fifth embodiment already described with reference to FIGS. 39 and 40 except for that license key Kc is transmitted as encrypted license key [Kc]Kcom. Therefore, description thereof is not repeated.

The above structure further improves the system security and copyright protection in the transfer and duplication mode.

Eighth Embodiment

Figure 52:
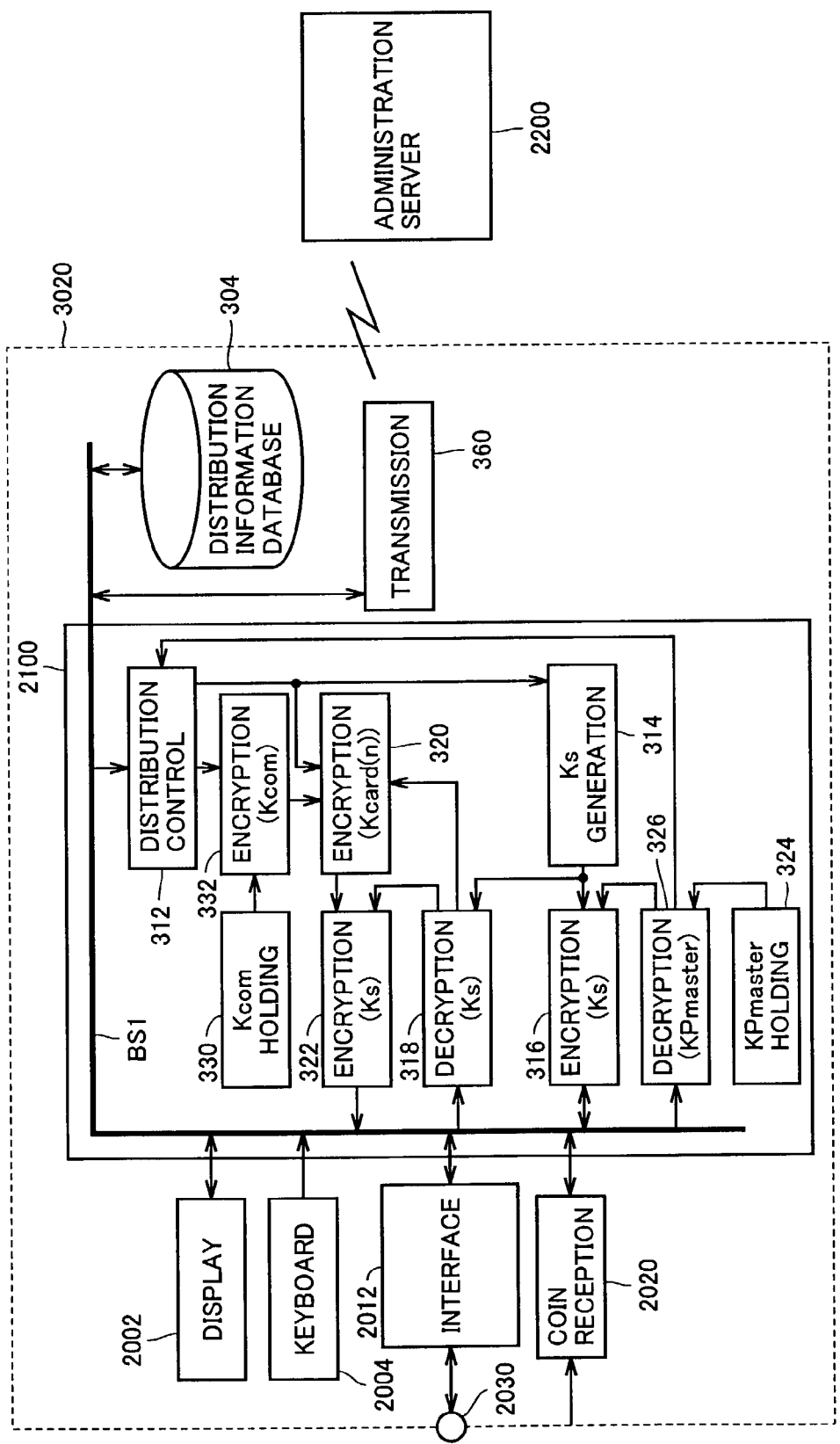
FIG. 52 is a schematic block diagram showing a structure of a content data vending machine of an eighth embodiment of the invention.

FIG. 52 is a schematic block diagram showing a structure of a content data vending machine 3020 of an eighth embodiment of the invention, and corresponds to FIG. 41 showing the sixth embodiment.

The structure of content data vending machine 3020 differs from the structure of content data vending machine 3010 of the sixth embodiment in that data processing unit 2100 further includes Kcom holding unit 330 holding decryption key Kcom, and encryption processing unit 332, which encrypts license key Kc applied from distribution information database 304 via distribution control unit 312 with decryption key Kcom, and applies encrypted license key [Kc]Kcom to encryption processing unit 320.

Structures of content data vending machine 3020 other than the above are substantially the same as those of content data vending machine 3010 of the sixth embodiment shown in FIG. 41. The same portions bear the same reference numbers, and description thereof is not repeated.

Naturally, the eighth embodiment can employ the structure, in which connector 2010 is used for transmitting data between memory card 140 and content data vending machine 3020 via cellular phone 107.

[Distribution Mode]

Figure 53:
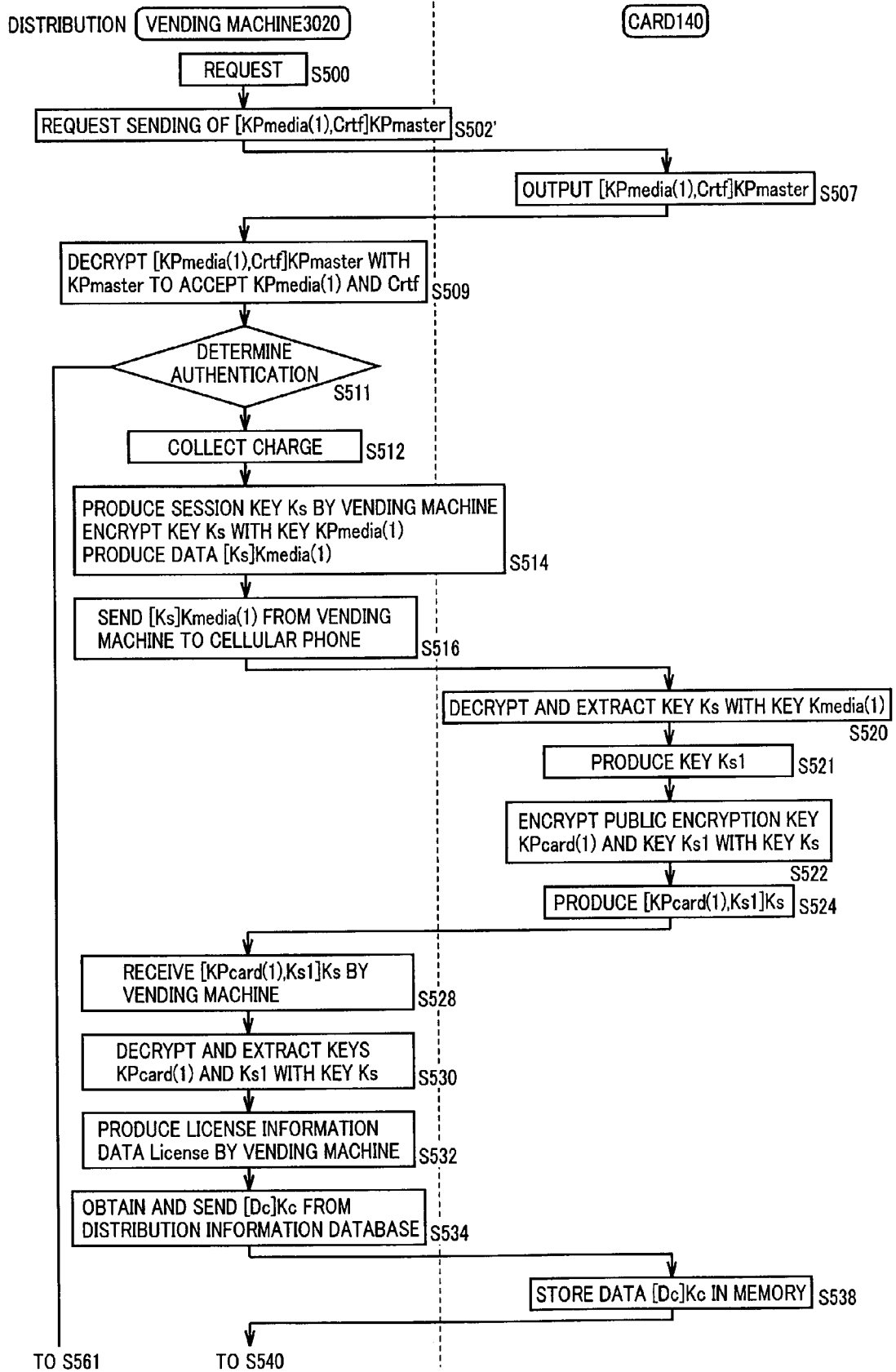
FIG. 53 is a first flowchart showing a distribution mode of a data distribution system using content data vending machine 3020.
Figure 54:
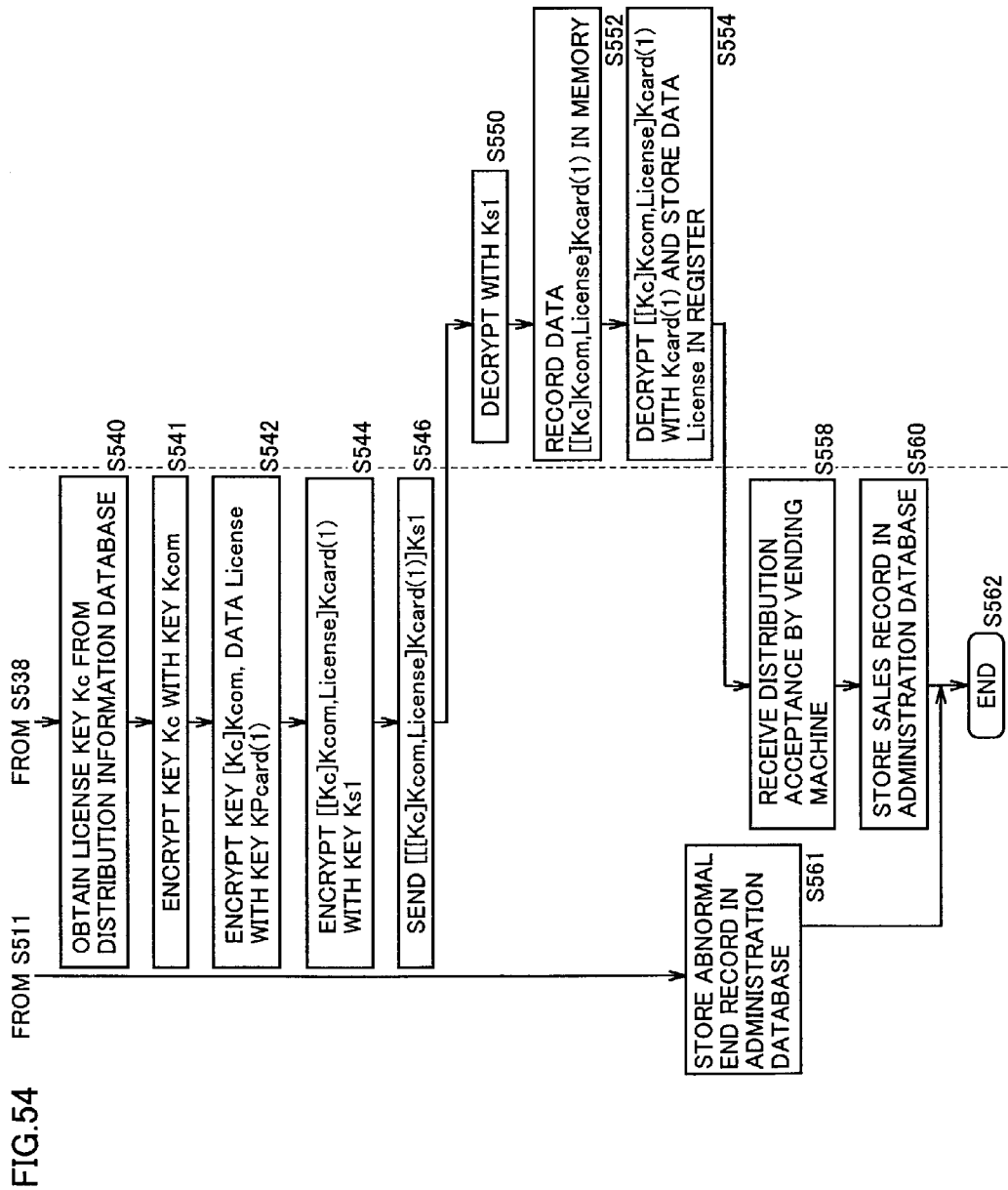
FIG. 54 is a second flowchart showing the distribution mode of the data distribution system using content data vending machine 3020.

FIGS. 53 and 54 are first and second flowcharts representing the distribution mode in the data distribution system, which uses content data vending machine 3020 already described with reference to FIG. 52.

FIGS. 53 and 54 represent operations, in which user 1 uses memory card 140 for receiving the content data (music data) distributed from content data vending machine 3020.

However, the processing shown in FIGS. 53 and 54 is substantially the same as the processing in the distribution mode of the fifth embodiment shown in FIGS. 42 and 43 except for that content data vending machine 3020 obtains license key Kc from distribution information database 304 in step S540, and then encryption processing unit 322 encrypts license key Kc (step S541) for transmitting it as encrypted license key [Kc]Kcom thereafter. Therefore, description thereof is not repeated.

The distribution mode described above further enhances the system security, as compared with the sixth embodiment.

In the above description, the encrypted content data is distributed and stored in memory 1412 of memory card 110, 120 or 140, and then license key Kc and license information data License are received. In contrast to the above, such a manner may be employed that the encrypted content data is distributed and received after license key Kc and license information data License are distributed and stored in register 1500 of memory card 110, 120 or 140.

In the transfer mode, any one of the encrypted content data, license key Kc and license information data License can be transferred prior to the others, similarly to the distribution mode.

In the embodiments described above, additional data Di may be distributed as a part of the distributed data together with the encrypted content data. This additional data Di may be non-encrypted data appended to the content data, and may be, for example, copyright information related to the music data (content data) such as title of a tune of the music data and names of a performer (e.g., singer or player), a composer and/or a lyric writer, and/or information for accessing distribution server 10 or 11, or content data vending machine 3000 or 3001. Additional data Di is stored in memory 1412 such that additional data Di can be processed together with the content data in the distribution, transfer and duplication operations, and is separated from the content data for allowing independent access in the reproducing operation.

Ninth Embodiment

Figure 55:
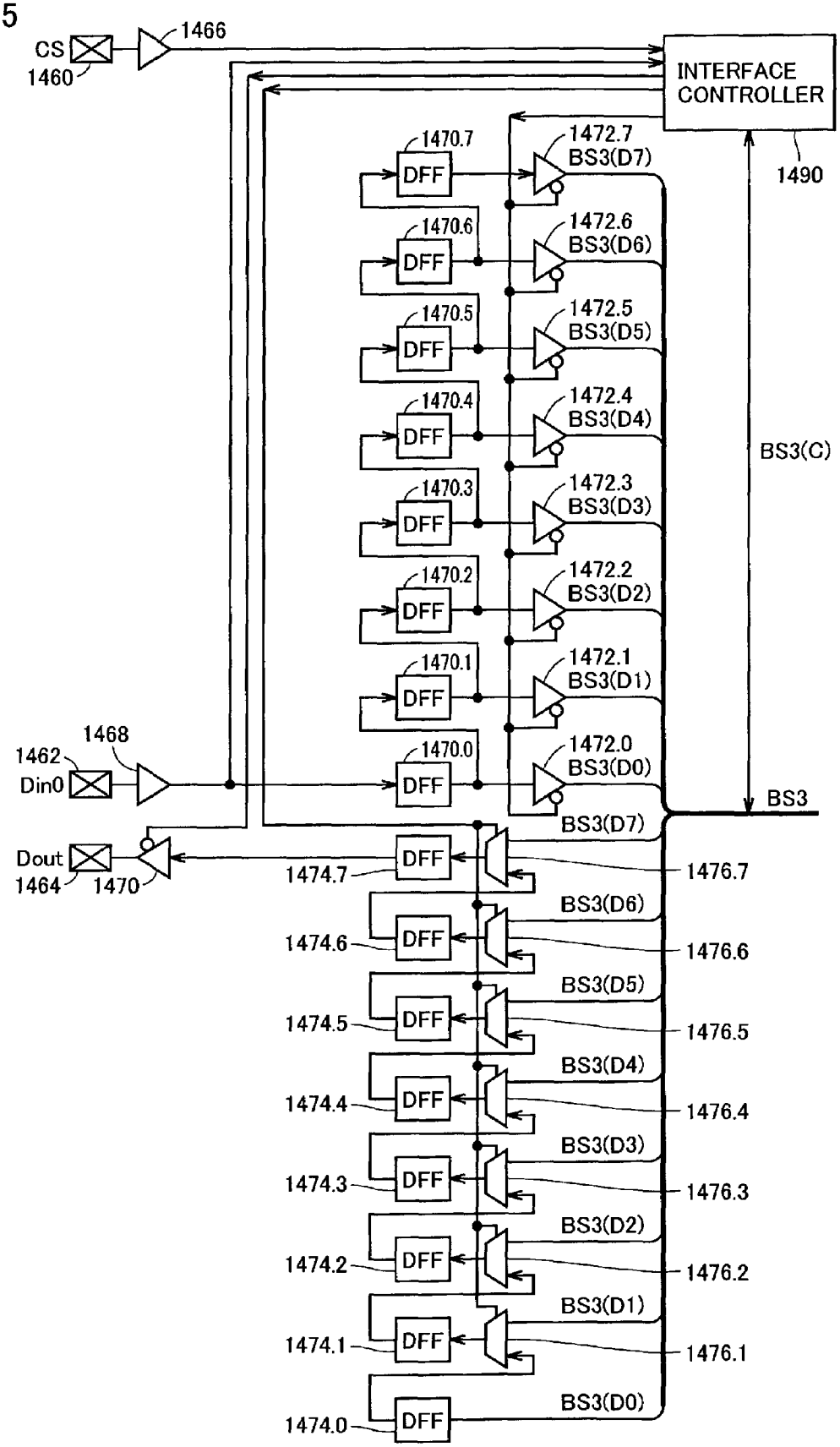
FIG. 55 is a schematic block diagram showing a structure including a terminal 1202 in memory card 140.

FIG. 55 is a schematic block diagram showing a structure of terminal 1202 of memory card 110, 120, 140 or the like described above.

It is assumed that the structure of terminal 1202 in FIG. 55 is employed in memory card 140.

Memory card 140 is serially supplied with data and commands from terminal 1202. In contrast to this, it is assumed that the data and commands are transmitted in parallel to data bus BS3 in memory card 140.

FIG. 55 is a schematic block diagram showing a structure for performing serial-to-parallel conversion of data for input to memory card 140 and parallel-to-serial conversion of data for output.

A data pin 1460 in terminal 1202 is supplied with a signal CS, which is a signal for instructing timing of input and output of data. For example, data applied to a data input pin 1462 attains L-level when a predetermined period expires after signal CS becomes active (L-level), whereby the timing of data input is detected. Similarly, the data output to a data output pin 1464 attains L-level when a predetermined period expires after activation (L-level) of signal CS, whereby the timing of data output is detected. An interface controller 1490 controls external input of data via data bus BS3 to memory card 140, and also controls external output of data via data bus BS3 from memory card 140.

In the data input operation, data applied to data input pin 1462 is input via buffer 1468 to D-flip-flops 1470.0–1470.7 connected in tandem. When eight bits of data are input, data of all D-flip-flops 1470.0–1470.7 are updated. At this point in time, data are output in parallel to data bus BS3 from data buffers 1427.0–1427.7 under the control of interface controller 1490.

At the time of data output, data are given in parallel from data bus BS3 via multiplexers 1476.1–1476.7, and are stored in D-flip-flops 1474.0–1474.7. Thereafter, connection of multiplexers 1476.1–1476.7 is changed under the control of interface controller 1490 to connect D-flip-flops 1474.0–1474.7 in tandem. In this state, data stored in respective D-flip-flops 1474.0–1474.7 is serially output from data output pin 1464 via an output buffer 1470 controlled by interface controller 1490.

Modification of the Ninth Embodiment

Figure 56:
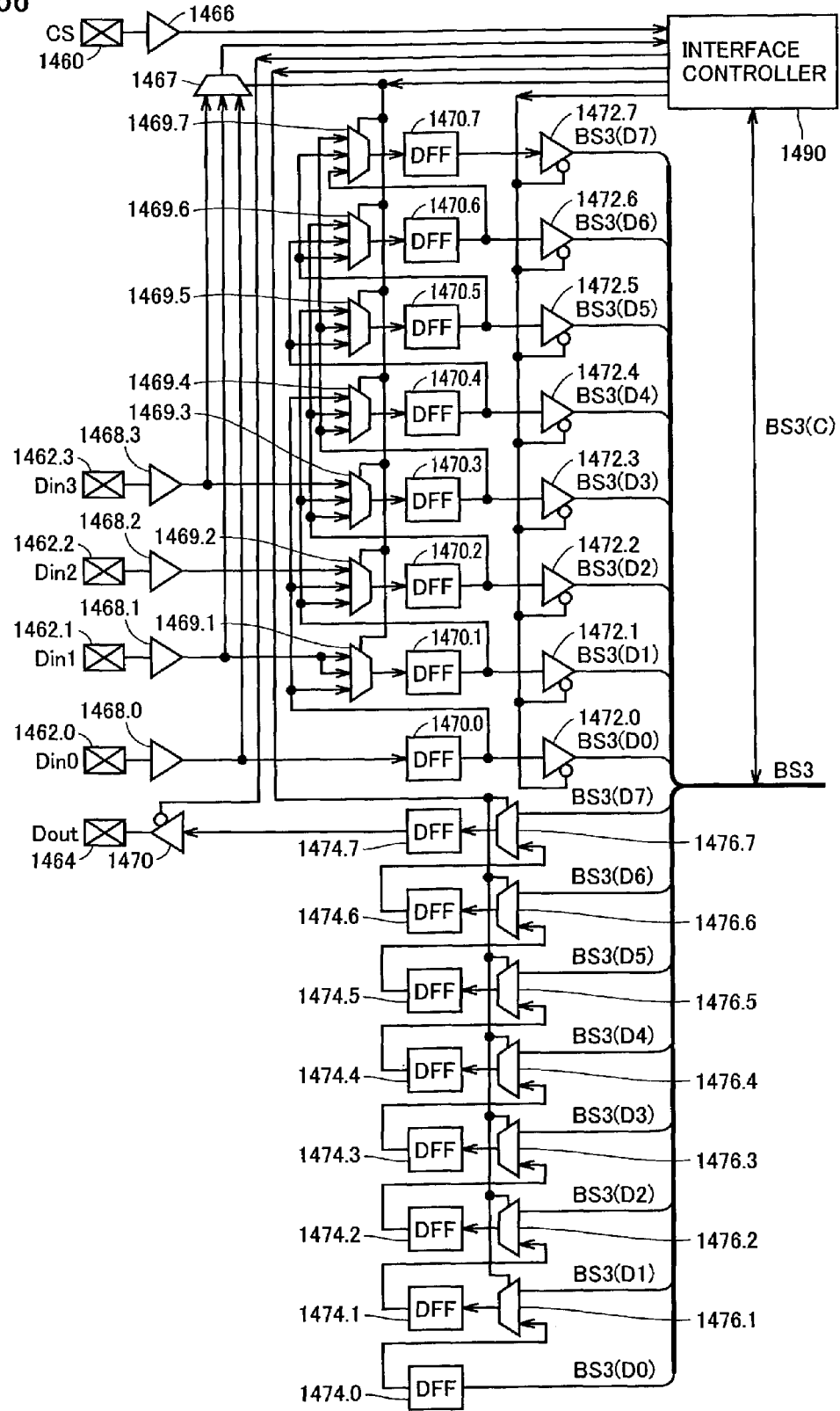
FIG. 56 shows a modification of the structure including terminal 1202 in memory card 140.

FIG. 56 is a schematic block diagram showing a modification of the structure of terminal 1202 of memory card 140, and particularly showing a structure, in which the data input pin(s) can be changed in number from one to two or four for improving the data input speed.

The structure of this modification differs from the structure shown in FIG. 55 in that the structure in FIG. 56 includes four data input pins 1462.0–1462.3 as well as corresponding input buffers 1468.0–1468.3. Further, the structure in FIG. 56 includes a multiplexer 1467 for transmitting commands, which are applied to data input pins 1462.0–1462.3, from input buffers 1468.0–1468.3 to interface controller 1490, and multiplexers 1469.1–1469.7 for selectively applying data or commands, which are applied to data input pins 1462.0–1462.3, from input buffers 1468.0–1468.3 to D-flip-flops 1470.0–1470.7.

Operations will now be described briefly.

After the power-on, memory card 140 first enters the state for receiving data only from one data input pin 1462.0.

In the following description, it is assumed that interface controller 1490 controls multiplexers 1469.1–1469.7 in accordance with a command, which is externally applied via data input pins 1462.0–1462.3 and multiplexer 1467 to interface controller 1490, and thereby the operation mode changes into a mode for receiving data in parallel via four data input pins 1462.0–1462.3.

Data applied to four data input pins 1462.0–1462.3 in accordance with first timing is applied to D-flip-flops 1470.0–1470.3 via multiplexers 1469.1–1469.3, respectively.

In accordance with second timing, connection of multiplexers 1469.1–1469.7 changes so that the outputs of D-flip-flops 1470.0–1470.3 are applied to D-flip-flops 1470.4–1470.7 for storing. In accordance with third timing, data applied to four data input pins 1462.0–1462.3 is applied via multiplexers 1469.1–1469.3 to D-flip-flops 1470.0–1470.3.

By the above operations, eight bits of data are completely stored in D-flip-flops 1470.0–1470.7. Thereafter, eight bits of data are applied in parallel to data bus BS3, similarly to the operations shown in FIG. 55.

Operations for data output are performed similarly to that of the structure shown in FIG. 55.

Owing to the structure described above, it is possible to reduce a time required for data distribution, and particularly for operations of distributing data to memory card 140 for purchasing content data from content data vending machine 2000 or the like.

For some of the embodiments described above, description has been given on the processing of transferring content data between two memory cards, which are attached to two cellular phones, respectively, by utilizing, e.g., a transceiver mode of PHSs. In these embodiments utilizing the transceiver mode or the like, structures are not restricted to those already described, and two memory cards may be simultaneously attached to one cellular phone, if allowed, for transferring the content data between the two memory cards on the same cellular phone. The transfer of the content data in this case can be performed substantially in the same manner as those in the various embodiments already described except for the transmission between the two cellular phones is eliminated.

In the respective embodiments already described, memory 1412 stores license key Kc in the encrypted form. However, register 1500 may store license key Kc in a decrypted plaintext form. This is allowed because register 1500 is arranged within the TRM region, and license key Kc cannot be read out from an external region.

In the respective embodiments already described, encrypted content data [Dc]Kc and license key Kc are stored in the memory card releasably attached to cellular phone 100 or the like. However, a circuit having a function similar to that of the memory card may be incorporated into a cellular phone. In this case, the keys are not defined corresponding to the respective types of memory cards and the respective memory cards, but are defined corresponding to the respective types of the incorporated circuits and corresponding to the respective incorporated circuits.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A data distribution system for distributing at least a license key for decrypting encrypted content data between said license key and said encrypted content data to each of terminals of a plurality of users from a content data supply device, comprising:
   a first interface unit for externally transmitting data;
   a first session key generating unit for producing a first symmetric key to be updated in response to every transmission of said license key;
   a session key encryption processing unit for encrypting said first symmetric key with a first public encryption key, and applying the encrypted first symmetric key to said first interface unit;
   a session key decrypting unit for decrypting a second symmetric key and a second public encryption key returned after being encrypted with said first symmetric key based on said first symmetric key to extract said second symmetric key and said second public encryption key;
   a first license data encryption processing unit for encrypting said license key with said second public encryption key extracted by said session key decrypting unit; and
   a second license data encryption processing unit for further encrypting the output of said first license data encryption processing unit with said second symmetric key extracted by said session key decrypting unit, and supplying the encrypted output to said first interface unit, wherein
   each of said terminals includes:
   a second interface unit for externally transmitting the data, and
   a data storing unit for receiving and storing at least said license key from said content data supply device;
   said first public encryption key is predetermined for said data storing unit; and
   said data storing unit includes:
   a first key holding unit for holding a first private decryption key for decrypting the data encrypted with said first public encryption key,
   a first decryption processing unit for receiving and decrypting said first symmetric key encrypted with said first public encryption key,
   a second key holding unit for holding said second public encryption key,
   a second session key generating unit for producing said second symmetric key,
   a first encryption processing unit for encrypting said second public encryption key and said second symmetric key based on said first symmetric key, and outputting the encrypted keys to said second interface unit,
   a second decryption processing unit for receiving said license key encrypted with said second symmetric key, further encrypted with said second public encryption key and applied from said second license data encryption processing unit, and decrypting the received license key based on said second symmetric key,
   a third key holding unit for holding a second private decryption key used for decrypting the data encrypted with said second public encryption key and being unique to said data storing unit,
   a third decryption processing unit for receiving said license key encrypted with said second public encryption key, and decrypting the received license key with said second private decryption key for extraction, and
   a memory unit for storing said encrypted content data and said license key.

2. The data distribution system according to claim 1, wherein
   each of said terminals further includes a content reproducing unit;
   said content reproducing unit includes:
   a fourth key holding unit for holding a third private decryption key used for decrypting the data encrypted with said third public encryption key,
   a fourth decryption processing unit for decrypting and extracting said second symmetric key encrypted with said third public encryption key in said data storing unit,
   a third session key generating unit for producing a third symmetric key,
   a second encryption processing unit for encrypting said third symmetric key based on said second symmetric key decrypted and extracted by said fourth decryption processing unit, and outputting the encrypted third symmetric key,
   a fifth decryption processing unit for decrypting and extracting said license key encrypted based on said third symmetric key in said data storing unit, and
   a data reproducing unit for receiving said encrypted content data recorded in said memory unit from said data storing unit, and decrypting said encrypted content data with said extracted license key for reproduction;
   said data storing unit further includes:
   a third encryption processing unit for encrypting said second symmetric key produced by said second session key generating unit based on said third public encryption key; and
   said data storing unit sends instructions to receive by said content reproducing unit said third symmetric key encrypted with said second symmetric key, to encrypt by said first encryption processing unit said license key stored in said memory unit with said third symmetric key decrypted and extracted based on said second symmetric key by said second decryption processing unit, and to output the encrypted license key to said content reproducing unit.

3. The data distribution system according to claim 1, wherein
   said data storing unit further includes:
   a third encryption processing unit for encrypting said second symmetric key with said first public encryption key of a different data storing unit in a transfer processing for transferring at least said license key to said different data storing unit, and a fourth encryption processing unit for performing the encrypting processing with the second public encryption key of said different data storing unit;

said second session key generating unit generates said second symmetric key in accordance with said transfer processing;

said second decryption processing unit decrypts and extracts a fourth symmetric key applied from said different data storing unit after being encrypted with said second symmetric key and the second public encryption key of said different data storing unit in accordance with said transfer processing;

said fourth encryption processing unit encrypts said license key stored in said memory unit with the second public encryption key of said different data storing unit in accordance with said transfer processing; and said first encryption processing unit encrypts the output of said fourth encryption processing unit with said fourth symmetric key, and outputs the encrypted output to said different data storing unit in accordance with said transfer processing.

4. The data distribution system according to claim 3, wherein transfer accepting processing of said data storing unit for receiving said license key transferred from said different data storing unit in accordance with transfer processing of said different data storing unit is performed such that:

said first decryption processing unit decrypts and extracts said second symmetric key encrypted with said first public encryption key and generated by said different data storing unit in said transfer acceptance processing, said second session key generating unit generates said fourth symmetric key in accordance with said transfer acceptance processing, said first encryption processing unit encrypts said second public encryption key and said fourth symmetric key with said second symmetric key for output the encrypted keys in accordance with said transfer acceptance processing, and said second decryption processing unit decrypts with said fourth symmetric key the license key encrypted with said second public encryption key of said different data storing unit, and further encrypted with said fourth symmetric key.

5. The data distribution system according to claim 1, wherein said memory unit receives the output of said second decryption processing unit, and stores said license key encrypted with said second public encryption key, and said third decryption processing unit decrypts said license key encrypted with said second public encryption key stored in said memory unit with said second private decryption key.

6. The data distribution system according to claim 1, wherein said third decryption processing unit receives the output of said second decryption processing unit, and decrypts said license key encrypted with said second public encryption key with said second private decryption key, and said memory unit receives the output of said third decryption processing unit, and stores said license key.

7. A data supply device for supplying at least a license key for decrypting encrypted content data between said license key and said encrypted content data to each of a plurality of user terminals provided with a data storing unit capable of storing at least said license key, comprising:

an interface unit for externally transmitting data;

a session key generating unit for producing a first symmetric key to be updated in response to every transmission of said license key;

a session key encryption processing unit for encrypting said first symmetric key with a first public encryption key predetermined corresponding to said data storing unit of said user terminal, and applying the encrypted first symmetric key to said interface unit;

a session key decrypting unit for decrypting and extracting a second symmetric key and a second public encryption key returned after being encrypted with said first symmetric key;

a first license data encryption processing unit for encrypting said license key for decrypting said encrypted content data with said second public encryption key decrypted by said session key decrypting unit; and a second license encryption processing unit for further encrypting the output of said first license data encryption processing unit with said second symmetric key, and applying the encrypted output to said interface unit for supply to each of said terminals.

8. The data supply device according to claim 7, wherein said first public encryption key is applied from said terminal via said interface unit, and said session key encryption processing unit encrypts said first symmetric key with said applied first public encryption key.

9. The data supply device according to claim 7, wherein said data supply device further includes:

an authentication key holding unit for holding an authentication key, an authentication decryption processing unit for decrypting and extracting authentication data being decodable with said authentication key, obtained from said terminal via said interface unit and predetermined for said data storing unit of said terminal, and a control unit for performing authentication processing based on said authentication data extracted by said authentication decryption processing unit, and determining whether at least the license key is to be supplied to the terminal providing said obtained authentication data or not.

10. The data supply device according to claim 9, wherein said first public encryption key is obtained from each of said terminals via said interface unit after being encrypted together with said authentication data into a form decodable with said authentication key, and said authentication data decryption processing unit decrypts with said authentication key said authentication data and said first public encryption key obtained via said interface unit and encrypted into a form decodable with said authentication key, extracts said authentication data and said first public encryption key, and outputs said extracted authentication data and said extracted first public encryption key to said control unit and said session key encryption processing unit, respectively.

11. The data supply device according to claim 7, wherein said data supply device includes:

an encryption key holding unit for holding a terminal common encryption key for performing encryption allowing decryption in each of said terminals, and a third license encryption processing unit for encrypting said license key with said terminal common encryption key held in said encryption key holding unit, and outputting the encrypted license key to said first license encryption processing unit.

12. A data supply device for supplying at least a license key for decrypting encrypted content data between said license key and said encrypted content data to a plurality of recording devices, comprising:
   an interface unit for transmitting data to and from said recording device;
   a connecting unit for connecting said interface unit and said recording device for supply of the data;
   a first session key generating unit for producing a first symmetric key to be updated in response to every supply of said license key;
   a session key encryption processing unit for encrypting said first symmetric key with a first public encryption key predetermined corresponding to said recording device, and applying the encrypted first symmetric key to said interface unit;
   a session key decrypting unit for decrypting and extracting a second symmetric key and a second public encryption key applied from the recording device connected to said connecting unit after being encrypted with said first symmetric key;
   a first license data encryption processing unit for encrypting said license key for decrypting said encrypted content data with said second public encryption key decrypted by said session key decrypting unit; and
   a second license encryption processing unit for further encrypting the output of said first license data encryption processing unit with said second symmetric key, and applying the encrypted output to said interface unit for supply to said recording device connected to the connecting unit.

13. The data supply device according to claim 12, wherein each of said recording devices is a memory card, and
   said recording device can be directly connected to said memory card.

14. The data supply device according to claim 12, wherein said first public encryption key is applied from each of said recording devices via said interface unit, and
   said session key encryption processing unit encrypts said first symmetric key with said applied first public encryption key.

15. The data supply device according to claim 12, further comprising:
   an authentication decryption processing unit for decrypting and extracting authentication data being decodable with an authentication key, and obtained from said recording device via said interface unit, and
   a control unit for performing authentication processing based on said authentication data extracted by said authentication decryption processing unit, and determining whether at least the license key is to be output to said recording device or not.

16. The data supply device according to claim 15, wherein said first public encryption key is obtained from said recording devices via said interface unit after being encrypted together with said authentication data into a form decodable with said authentication key, and
   said authentication data decryption processing unit decrypts with said authentication key said authentication data and said first public encryption key obtained via said interface unit and encrypted into a form decodable with said authentication key, extracts said authentication data and said first public encryption key, and outputs said extracted authentication data and said extracted first public encryption key to said control unit and said session key encryption processing unit, respectively.

17. The data supply device according to claim 12, wherein said data supply device includes:
   an encryption key holding unit attached to said recording device for obtaining said license key and said encrypted content data stored in said recording device, and holding a terminal common encryption key for performing encryption allowing decryption by a plurality of terminals decrypting said encrypted content data to obtain the content data, and
   a third license encryption processing unit for encrypting said license key based on said terminal common encryption key held in said encryption key holding unit, and outputting the encrypted license key to said first license encryption processing unit.

18. The data supply device according to claim 12, wherein said recording device includes means for changing the number of terminals connected to said interface unit for externally receiving the data, and performing switching between a serial mode for performing data communication on a bit-by-bit basis and a parallel mode for performing data communication by multiple bits at a time;
   said data supply device supplies said encrypted content data together with said license key to said recording device via said interface unit; and
   said interface unit instructs the parallel mode to said recording device when at least said encrypted content data is to be input to said recording device.

19. A terminal device for receiving at least a license key for decrypting encrypted content data between said license key and said encrypted content data distributed from a data supply device, comprising:
   a first interface unit for externally transmitting data; and
   a data storing unit for receiving and storing said license key, wherein
   said data storing unit includes:
   a first key holding unit for holding a first private decryption key for decrypting the data encrypted with a first public encryption key,
   a first decryption processing unit for receiving and decrypting a first symmetric key encrypted with said first public encryption key and externally input,
   a second key holding unit for holding a second public encryption key unique to said data storing unit,
   a second session key generating unit for producing a second symmetric key,
   a first encryption processing unit for encrypting said second public encryption key and said second symmetric key based on said first symmetric key, and outputting the encrypted keys to said first interface unit,
   a second decryption processing unit for receiving the license key encrypted with said second public encryption key and further encrypted with said second symmetric key, and decrypting the received license key based on said second symmetric key,
   a third key holding unit for holding a second private decryption key used for decrypting the data encrypted with said second public encryption key and being unique to said data storing unit,
   a memory unit for receiving the output of said second decryption processing unit, and storing said license key encrypted with said second public encryption key, and a third decryption processing unit for receiving the license key encrypted with said second public encryption key stored in said memory unit, and decrypting the received license key with said second private decryption key.

20. The terminal device according to claim 19, wherein said data storing unit is a recording device releasably attached to said terminal device.

21. The terminal device according to claim 19, wherein said data storing unit further includes a fourth key holding unit holding said first public encryption key and being capable of externally outputting said first public encryption key.

22. The terminal device according to claim 19, wherein said data storing unit further includes a first data holding unit for encrypting and holding said first public encryption key and first authentication data unique to said data storing unit and determined uniquely to said first public encryption key in a form allowing decryption with a predetermined authentication key.

23. The terminal device according to claim 19, wherein said terminal device further includes a content reproducing unit;
said content reproducing unit includes:
a fifth key holding unit for holding a third private decryption key used for decrypting the data encrypted with a third public encryption key unique to said content reproducing unit,
a fourth decryption processing unit for decrypting and extracting said second symmetric key encrypted with said third public encryption key in said data storing unit,
a third session key generating unit for producing a third symmetric key,
a second encryption processing unit for encrypting said third symmetric key based on said second symmetric key decrypted and extracted by said fourth decryption processing unit, and outputting the encrypted third symmetric key,
a fifth decryption processing unit for decrypting and extracting the license key encrypted with said third symmetric key in said data storing unit, and
a data reproducing unit for decrypting the encrypted content data recorded in said recording unit with said extracted license key to reproduce the content data;
said data storing unit further includes a third encryption processing unit for encrypting said second symmetric key produced by said second session key generating unit based on said third public encryption key;
said second decryption processing unit further receives said third symmetric key encrypted with said second symmetric key in said content reproducing unit, and decrypts said encrypted third symmetric key based on said second symmetric key to extract said third symmetric key;
said third decryption processing unit decrypts said license key encrypted with said second public encryption key stored in said memory unit based on said second private decryption key, and extracts said license key; and
said first encryption processing unit further encrypts said license key extracted by said third decryption processing unit based on said third symmetric key extracted by said second decryption processing unit, and applies the encrypted license key to said content reproducing unit.

24. The terminal device according to claim 23, wherein said content reproducing unit further includes a sixth key holding unit for holding said third public encryption key, and being capable of externally outputting said third public encryption key.

25. The terminal device according to claim 23, wherein said content reproducing unit includes a second data holding unit for encrypting and holding said third public encryption key and second authentication data being unique to said data storing unit and determined uniquely with respect to the third public encryption key such that said third public encryption key and said second authentication data can be decrypted with a predetermined authentication key;
said data storing unit further includes:
an authentication key holding unit for holding said authentication key,
an authentication data decryption processing unit for decrypting said second authentication data applied from said data storing unit based on said authentication key to extract said third public encryption key and said first authentication data, and
a control unit for performing authentication based on said second authentication data, and determining whether at least the license key is to be output to said content reproducing unit or not; and
said authentication data decryption processing unit applies said extracted third public encryption key and said extracted second authentication data to said third encryption processing unit and said control unit, respectively.

26. The terminal device according to claim 23, wherein said license key is stored in the memory unit after being encrypted into a form allowing decryption with a terminal common decryption key common to said plurality of terminals;
said content reproducing unit further includes:
a decryption key holding unit for holding said terminal common decryption key, and
a sixth decryption processing unit for decrypting the output of said fifth decryption processing unit based on said terminal common decryption key to extract said license key.

27. The terminal device according to claim 19, wherein said data storing unit further includes:
a third encryption processing unit for encrypting said second symmetric key with said first public encryption key of a different data storing unit in accordance with a transfer processing for transferring at least said license key to said different data storing unit, and
a fourth encryption processing unit for performing the encrypting processing with the second public encryption key of said different data storing unit;
said second session key generating unit generates said second symmetric key in accordance with said transfer processing;
said second decryption processing unit decrypts and extracts a fourth symmetric key applied from said different data storing unit after being encrypted with said second symmetric key and the second public encryption key of said different data storing unit in accordance with said transfer processing;
said third decryption processing unit decrypts the data encrypted with said second public encryption key stored in said memory unit based on said second private decryption key in accordance with said transfer processing to extract said license key;
said fourth encryption processing unit encrypts said extracted license key based on the second public encryption key of said different data storing unit in accordance with said transfer processing; and said first encryption processing unit encrypts the output of said fourth encryption processing unit with said extracted fourth symmetric key, and outputs the encrypted output to said different data storing unit in accordance with said transfer processing.

28. The terminal device according to claim 21, wherein said data storing unit further includes:

a third encryption processing unit for encrypting said second symmetric key with said first public encryption key applied from a different data storing unit in accordance with a transfer processing for transferring at least said license key to said different data storing unit, and a fourth encryption processing unit for performing the encrypting processing with the second public encryption key of said different data storing unit;

said second session key generating unit generates said second symmetric key in accordance with said transfer processing;

said second decryption processing unit decrypts and extracts a fourth symmetric key applied from said different data storing unit after being encrypted with said second symmetric key and the second public encryption key of said different data storing unit in accordance with said transfer processing;

said third decryption processing unit decrypts the data encrypted with said second public encryption key stored in said memory unit based on said second private decryption key in accordance with said transfer processing to extract said license key;

said fourth encryption processing unit encrypts said extracted license key based on the second public encryption key of said different data storing unit in accordance with said transfer processing; and said first encryption processing unit encrypts the output of said fourth encryption processing unit with said extracted fourth symmetric key, and outputs the encrypted output to said different data storing unit in accordance with said transfer processing.

29. The terminal device according to claim 20, wherein said data storing unit further includes:

an authentication key holding unit for holding said authentication key, an authentication data decryption processing unit for decrypting said first authentication data applied from a different data storing unit based on said authentication key to extract said first public encryption key and said first authentication data in accordance with transfer processing for transferring at least said license key to said different data storing unit, a control unit for performing authentication based on said first authentication data and in accordance with said transfer processing, and determining whether at least the license key is to be output to said different data storing unit or not, a third encryption processing unit for encrypting said second symmetric key with said first public encryption key output from said different data storing unit in accordance with said transfer processing, and a fourth encryption processing unit for performing the encrypting processing with the second public encryption key of said different data storing unit;

said second session key generating unit generates said second symmetric key in accordance with said transfer processing;

said second decryption processing unit decrypts and extracts a fourth symmetric key applied from said different data storing unit after being encrypted with said second symmetric key and the second public encryption key of said different data storing unit in accordance with said transfer processing;

said third decryption processing unit decrypts the data encrypted with said second public encryption key stored in said memory unit based on said second private decryption key in accordance with said transfer processing to extract said license key;

said fourth encryption processing unit encrypts said extracted license key based on the second public encryption key of said different data storing unit in accordance with said transfer processing; and said first encryption processing unit encrypts the output of said fourth encryption processing unit with said extracted fourth symmetric key, and outputs the encrypted output to said different data storing unit in accordance with said transfer processing.

30. A terminal device for receiving at least a license key for decrypting encrypted content data between said license key and said encrypted content data distributed from a data supply device, comprising:

a first interface unit for externally transmitting data; and a data storing unit for receiving and storing said license key, wherein said data storing unit includes:

a first key holding unit for holding a first private decryption key for decrypting the data encrypted with a first public encryption key, a first decryption processing unit for receiving and decrypting a first symmetric key encrypted with said first public encryption key and externally input, a second key holding unit for holding a second public encryption key unique to said data storing unit, a second session key generating unit for producing a second symmetric key, a first encryption processing unit for encrypting said second public encryption key and said second symmetric key based on said first symmetric key, and outputting the encrypted keys to said first interface unit, a second decryption processing unit for receiving the license key encrypted with said second public encryption key and further encrypted with said second symmetric key, and decrypting the received license key based on said second symmetric key, a third key holding unit for holding a second private decryption key used for decrypting the data encrypted with said second public encryption key and being unique to said data storing unit, a third decryption processing unit for receiving said license key encrypted with said second public encryption key, and decrypting the received license key with said second private decryption key, and a memory unit for receiving the output of said third decryption processing unit, and storing said license key.

31. The terminal device according to claim 30, wherein said data storing unit is a recording device releasably attached to said terminal device.

32. The terminal device according to claim 30, wherein said data storing unit further includes a fourth key holding unit holding said first public encryption key and being capable of externally outputting said first public encryption key.

33. The terminal device according to claim 30, wherein
said data storing unit further includes a first data holding
unit for encrypting and holding said first public encryption key and first authentication data unique to said data storing unit and determined uniquely to said first public encryption key in a form allowing decryption with a predetermined authentication key.

34. The terminal device according to claim 21, wherein
said terminal device further includes a content reproducing unit;
said content reproducing unit includes:
a fifth key holding unit for holding a third private decryption key used for decrypting the data encrypted with a third public encryption key predetermined for said content reproducing unit,
a fourth decryption processing unit for decrypting and extracting said second symmetric key encrypted with said third public encryption key in said data storing unit,
a third session key generating unit for producing a third symmetric key,
a second encryption processing unit for encrypting said third symmetric key based on said second symmetric key decrypted and extracted by said fourth decryption processing unit, and outputting the encrypted third symmetric key,
a fifth decryption processing unit for decrypting and extracting the license key encrypted with said third symmetric key in said data storing unit, and
a data reproducing unit for decrypting the encrypted content data recorded in said recording unit with said extracted license key to reproduce the content data;
said data storing unit further includes a third encryption processing unit for encrypting said second symmetric key produced by said second session key generating unit based on said third public encryption key;
said second decryption processing unit further receives said third symmetric key encrypted with said second symmetric key in said content reproducing unit, and decrypts said encrypted third symmetric key based on said second symmetric key to extract said third symmetric key; and
said first encryption processing unit further encrypts said license key stored in said memory unit based on said third symmetric key extracted by said second decryption processing unit, and applies the encrypted license key to said content reproducing unit.

35. The terminal device according to claim 34, wherein
said content reproducing unit further includes a sixth key holding unit for holding said third public encryption key, and being capable of externally outputting said third public encryption key.

36. The terminal device according to claim 34, wherein
said content reproducing unit includes a second data holding unit for encrypting and holding said third public encryption key and second authentication data being unique to said data storing unit and determined uniquely with respect to the third public encryption key such that said third public encryption key and said second authentication data can be decrypted with a predetermined authentication key;
said data storing unit further includes:
an authentication key holding unit for holding said authentication key,
an authentication data decryption processing unit for decrypting said second authentication data applied from said data storing unit based on said authentication key to extract said third public encryption key and said first authentication data, and
a control unit for performing authentication based on said second authentication data, and determining whether at least the license key is to be output to said content reproducing unit or not; and
said authentication data decryption processing unit applies said extracted third public encryption key and said extracted second authentication data to said third encryption processing unit and said control unit, respectively.

37. The terminal device according to claim 34, wherein
said license key is stored in the memory unit after being encrypted into a form allowing decryption with a terminal common decryption key common to said plurality of terminals;
said content reproducing unit further includes:
a decryption key holding unit for holding said terminal common decryption key, and
a sixth decryption processing unit for decrypting the output of said fifth decryption processing unit based on said terminal common decryption key to extract said license key.

38. The terminal device according to claim 30, wherein
said data storing unit further includes:
a third encryption processing unit for encrypting said second symmetric key with said first public encryption key of a different data storing unit in accordance with a transfer processing for transferring at least said license key to said different data storing unit, and
a fourth encryption processing unit for performing the encrypting processing with the second public encryption key of said different data storing unit;
said second session key generating unit generates said second symmetric key in accordance with said transfer processing;
said second decryption processing unit decrypts and extracts a fourth symmetric key applied from said different data storing unit after being encrypted with said second symmetric key and the second public encryption key of said different data storing unit in accordance with said transfer processing;
said fourth encryption processing unit encrypts said extracted license key stored in said memory unit based on the second public encryption key of said different data storing unit in accordance with said transfer processing; and
said first encryption processing unit encrypts the output of said fourth encryption processing unit with said extracted fourth symmetric key, and outputs the encrypted output to said different data storing unit in accordance with said transfer processing.

39. The terminal device according to claim 38, wherein
said data storing unit further includes a fourth key holding unit holding said first public encryption key and being capable of externally outputting said first public encryption key, and
said third encryption processing unit performs encryption based on said first public encryption key applied from said different data storing unit in accordance with said transfer processing.

40. The terminal device according to claim 32, wherein
said data storing unit further includes:
a third encryption processing unit for encrypting said second symmetric key with said first public encryption key output from a different data storing unit in accordance with a transfer processing for transferring at least said license key to said different data storing unit, and a fourth encryption processing unit for performing the encrypting processing with the second public encryption key of said different data storing unit;

said second session key generating unit generates said second symmetric key in accordance with said transfer processing;

said second decryption processing unit decrypts and extracts a fourth symmetric key applied from said different data storing unit after being encrypted with said second symmetric key and the second public encryption key of said different data storing unit in accordance with said transfer processing;

said third decryption processing unit decrypts the data encrypted with said second public encryption key stored in said memory unit based on said second private decryption key in accordance with said transfer processing to extract said license key;

said fourth encryption processing unit encrypts said extracted license key based on the second public encryption key of said different data storing unit in accordance with said transfer processing; and said first encryption processing unit encrypts the output of said fourth encryption processing unit with said extracted fourth symmetric key, and outputs the encrypted output to said different data storing unit in accordance with said transfer processing.

41. The terminal device according to claim 33, wherein said data storing unit further includes:

an authentication key holding unit for holding said authentication key, an authentication data decryption processing unit for decrypting said first authentication data applied from a different data storing unit based on said authentication key to extract said first public encryption key and said first authentication data in accordance with transfer processing for transferring at least said license key to said different data storing unit, a control unit for performing authentication based on said first authentication data and in accordance with said transfer processing, and determining whether at least the license key is to be output to said different data storing unit or not, a third encryption processing unit for encrypting said second symmetric key with said first public encryption key output from said different data storing unit in accordance with said transfer processing, and a fourth encryption processing unit for performing the encrypting processing with the second public encryption key of said different data storing unit;

said second session key generating unit generates said second symmetric key in accordance with said transfer processing;

said second decryption processing unit decrypts and extracts a fourth symmetric key applied from said different data storing unit after being encrypted with said second symmetric key and the second public encryption key of said different data storing unit in accordance with said transfer processing;

said third decryption processing unit decrypts the data encrypted with said second public encryption key stored in said memory unit based on said second private decryption key in accordance with said transfer processing to extract said license key;

said fourth encryption processing unit encrypts said extracted license key based on the second public encryption key of said different data storing unit in accordance with said transfer processing; and said first encryption processing unit encrypts the output of said fourth encryption processing unit with said extracted fourth symmetric key, and outputs the encrypted output to said different data storing unit in accordance with said transfer processing.

42. A terminal device for receiving at least a license key for decrypting encrypted content data between said license key and said encrypted content data distributed from a data supply device, comprising:

a first interface unit for transmitting data to and from said data supply device;

a content reproducing unit; and a second interface unit for connection to a data storing unit releasably attached to said terminal device, wherein said content reproducing unit includes:

a fourth key holding unit for holding a third private decryption key used for decrypting the data encrypted with a third public encryption key, a fourth decryption processing unit for decrypting and extracting a second symmetric key encrypted with said third public encryption key in said data storing unit, a third session key generating unit for producing a third symmetric key, a second encryption processing unit for encrypting said third symmetric key based on said second symmetric key decrypted and extracted by said fourth decryption processing unit, and outputting the encrypted third symmetric key, a fifth decryption processing unit for decrypting and extracting the license key encrypted with said third symmetric key in said data storing unit, and a data reproducing unit for decrypting the encrypted content data recorded in said recording unit with the extracted license key to reproduce the content data.

43. The terminal device according to claim 42, further comprising:

a data holding unit for holding second authentication data and said third public encryption key in a form allowing decryption with an authentication key for external output.

44. A recording device for storing an encrypted content data and a license key for decrypting said encrypted content data, comprising:

an interface unit for externally transmitting data;

a memory unit for recording the data; and a parallel data bus having a width of m bits (m is a natural number larger than 1 (m>1)), and transmitting the data between said interface unit and said recording unit, wherein said interface unit includes:

a plurality of terminals, selecting means for selecting a predetermined terminal(s) of one or n in number (n is a natural satisfying ($1 < n \leq m$)) as a terminal(s) for externally receiving data in accordance with a switching instruction for a bit width of the externally applied input data, first converting means for operating in accordance with said switching instruction to convert serial data externally applied via said selected one terminal or parallel data of an n-bit width externally applied via said n terminals into parallel data of an m-bit width, and supply the converted parallel data to said parallel data bus, and second converting means for converting the parallel data of the m-bit width applied from said parallel data bus into serial data, and externally outputting the converted serial data via predetermined one terminal among said plurality of terminals;

a first key holding unit for holding a first private decryption key for decrypting data encrypted with a first public encryption key;

a first decryption processing unit for receiving a first symmetric key encrypted with said first public encryption key, and decrypting the received first symmetric key based on said first private decryption key;

a second key holding unit for holding a second public encryption key;

a session key generating unit for producing a second symmetric key;

a first encryption processing unit for encrypting said second public encryption key and said second symmetric key based on said first symmetric key, and outputting the encrypted keys to said interface unit via said parallel data bus;

a second encryption processing unit for receiving a license key encrypted with said second public encryption key, and further encrypted with said second symmetric key, and decrypting the received license key based on said second symmetric key;

a third key holding unit for holding a second private decryption key set uniquely to said recording device for decrypting the data encrypted with said second public encryption key; and a third decryption processing unit for receiving the license key encrypted with said second public encryption key, and decrypting the received license key based on said second private decryption key to extract said license key, wherein said recording unit stores said encrypted content data and said license key.

45. The recording device according to claim 44, further comprising:

an authentication data holding unit for holding an authentication data prepared by encrypting said first public encryption key and a certificate data corresponding to said first public encryption key in a form allowing external decryption with an authentication key for external output.

* * * * *